United States Patent
Fukagawa et al.

(10) Patent No.: US 9,040,129 B2
(45) Date of Patent: May 26, 2015

(54) PROTECTIVE FILM OF POLARIZER, POLARIZER AND METHOD FOR PRODUCING IT, AND LIQUID CRYSTAL DISPLAY DEVICE

(75) Inventors: Nobutaka Fukagawa, Kanagawa (JP); Yu Naito, Kanagawa (JP); Masato Nagura, Kanagawa (JP); Yoshio Ishii, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 614 days.

(21) Appl. No.: 13/064,927

(22) Filed: Apr. 26, 2011

(65) Prior Publication Data

US 2011/0273646 A1 Nov. 10, 2011

(30) Foreign Application Priority Data

| Apr. 26, 2010 | (JP) | 2010-101413 |
| Apr. 27, 2010 | (JP) | 2010-101717 |
| Jun. 4, 2010 | (JP) | 2010-128747 |

(51) Int. Cl.

| C09K 19/00 | (2006.01) |
| B32B 9/04 | (2006.01) |
| C08L 1/12 | (2006.01) |
| C08J 5/18 | (2006.01) |
| C08L 1/14 | (2006.01) |
| C08J 7/12 | (2006.01) |
| C08K 5/17 | (2006.01) |

(52) U.S. Cl.
CPC ............ *C08L 1/12* (2013.01); *B32B 2457/202* (2013.01); *C08J 5/18* (2013.01); *C08J 2301/12* (2013.01); *C08J 2301/14* (2013.01); *C08L 1/14* (2013.01); *C08J 7/123* (2013.01); *C08K 5/175* (2013.01)

(58) Field of Classification Search
None
See application file for complete search history.

(56) References Cited

U.S. PATENT DOCUMENTS

| 6,914,139 B2 | 7/2005 | Mukunoki et al. | |
| 7,671,947 B2 * | 3/2010 | Nimura et al. | 349/117 |
| 8,609,236 B2 | 12/2013 | Ikeda et al. | |
| 2003/0164115 A1 | 9/2003 | Mukunoki et al. | |
| 2008/0123189 A1 | 5/2008 | Ikeda et al. | |
| 2008/0198446 A1 * | 8/2008 | Asakura et al. | 359/352 |
| 2010/0055356 A1 * | 3/2010 | Takeda et al. | 428/1.31 |

(Continued)

FOREIGN PATENT DOCUMENTS

| JP | 06-254958 | 9/1994 |
| JP | 10-316701 | 12/1998 |

(Continued)

OTHER PUBLICATIONS

Japanese Office Action, issued by the Japanese Patent Office on Sep. 30, 2014 in the corresponding Japanese Patent Application No. 2011-087145.

(Continued)

*Primary Examiner* — Gwendolyn Blackwell
*Assistant Examiner* — Anthony J Frost
(74) *Attorney, Agent, or Firm* — Jean C. Edwards, Esq.; Edwards Neils PLLC

(57) ABSTRACT

A protective film to a polarizer including a cellulose acylate and satisfying the following requirement (1) or (2):
(1): The surface of the film has a pH of from 3.0 to 4.5.
(2): The surface of the film has a pH of more than 4.5 and at most 6.0, and the film has a moisture permeability of at least 2800 g/m²·day.

30 Claims, 1 Drawing Sheet

(56) References Cited

U.S. PATENT DOCUMENTS

| | | | |
|---|---|---|---|
| 2011/0223435 A1* | 9/2011 | Naito et al. | 428/461 |
| 2014/0060734 A1 | 3/2014 | Ikeda et al. | |

FOREIGN PATENT DOCUMENTS

| | | | |
|---|---|---|---|
| JP | 10316701 A * | 12/1998 | C08B 3/06 |
| JP | 2001-083329 | 3/2001 | |
| JP | 2002-146043 A | 5/2002 | |
| JP | 2003-165188 | 6/2003 | |
| JP | 2004-012578 | 1/2004 | |
| JP | 2004-240042 | 8/2004 | |
| JP | 2005-062458 | 3/2005 | |
| JP | 2005062458 A * | 3/2005 | G02B 5/30 |
| JP | 2005-105066 A | 4/2005 | |
| JP | 2006-208934 | 8/2006 | |
| JP | 3977064 | 6/2007 | |
| JP | 2007-226222 A | 9/2007 | |
| JP | 2008-015483 A | 1/2008 | |
| JP | 4136054 | 6/2008 | |
| JP | 2008-233530 A | 10/2008 | |
| JP | 2010-043158 A | 2/2010 | |
| JP | 2010-054720 A | 3/2010 | |
| WO | WO 2006/095815 A1 | 9/2006 | |

OTHER PUBLICATIONS

Japanese Office Action, issued by the Japanese Patent Office on Sep. 30, 2014 in the corresponding Japanese Patent Application No. 2011-091092.

Japanese Office Action, issued by the Japanese Patent Office on Oct. 21, 2014 in the corresponding Japanese Patent Application No. 2011-087144.

* cited by examiner

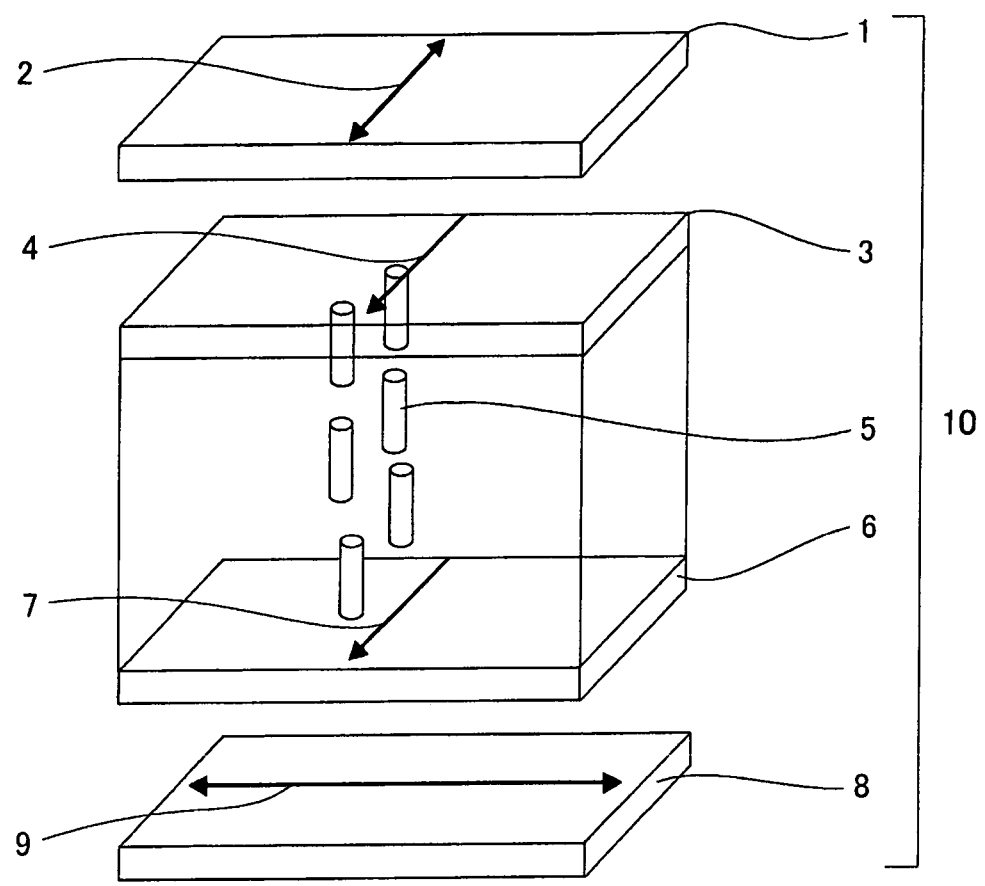

PROTECTIVE FILM OF POLARIZER, POLARIZER AND METHOD FOR PRODUCING IT, AND LIQUID CRYSTAL DISPLAY DEVICE

CROSS-REFERENCE TO RELATED APPLICATIONS

The present application claims the benefit of priority from Japanese Patent Application No. 101413/2010 filed on Mar. 26, 2010, Japanese Patent Application No.101717/2010 filed on Mar. 27, 2010, and Japanese Patent Application No.128747/2010 filed on Jun. 4, 2010, the contents of which are herein incorporated by reference in their entirety.

BACKGROUND OF THE INVENTION

1. Field of the Invention

The present invention relates to a protective film to a polarizer, to a polarizer, to a method for producing a polarizer and to a liquid crystal device produced.

2. Description of the Related Art

With the development of high-performance and large-panel liquid crystal display devices, the application of the devices is now expanding, and it is desired to favorably use the devices in higher temperature and higher humidity environments than before, for example, to use them outdoors.

Accordingly, a polarizer of which the polarizing element degrades little after aged in high-temperature and high-humidity environments and a protective film to a polarizer for use in the polarizer are desired.

SUMMARY OF THE INVENTION

The problem that the invention is to solve is to provide a polarizer of which the polarizing element degrades little after aged in high-temperature and high-humidity environments and a protective film to a polarizer for use in the polarizer.

The present inventors have found that the above-mentioned problem can be solved by the following constitution, and have completed the present invention.

[1] A protective film to a polarizer containing a cellulose acylate and satisfying the following requirement (1) or (2):
  (1): The surface of the film has a pH of from 3.0 to 4.5.
  (2): The surface of the film has a pH of more than 4.5 and at most 6.0, and the film has a moisture permeability of at least 2800 g/m²·day.
[2] The protective film to a polarizer of [1], of which the film surface pH is from 3.0 to 4.5.
[3] The protective film to a polarizer of [1] or [2], of which the film surface pH is from 3.0 to 6.0, and which has a moisture permeability of at least 2800 g/m²·day.
[4] The protective film to a polarizer of any one of [1] to [3], which has a water content of at least 4.0%.
[5] The protective film to a polarizer of any one of [1] to [4], comprising an organic acid represented by the following formula (1), wherein the ratio of the organic acid to the cellulose acylate is from 0.01 to 10% by, mass:

X-L-(R$^1$)$_n$     Formula (1)

wherein X represents an acid group wherein the acid dissociation constant is 5.5 or less; L represents a single bond, or a di- or more valent linking group; R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 when L is a single bond, or represents the number expressed by:

(the valent number of L)−1 when L is a di- or more valent linking group.
[6] The protective film to a polarizer of [5], wherein the organic acid represented by the formula (1) is a carboxylic acid derivative represented by the following formula (2):

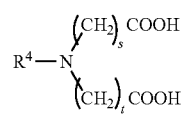

Formula (2)

wherein:
  s and t each independently represent 1, 2 or 3;
  R$^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that R$^4$ includes the moiety of R$^1$ in the formula (1).
[7] The protective film to a polarizer of any one of [1] to [6], wherein the total acyl substitution degree of the cellulose acylate is at least 1.0 and less than 2.6.
[8] The protective film to a polarizer of any one of [1] to [7], which was saponificated.
[9] A method for producing a polarizer, comprising alkali-saponifying the protective film to a polarizer of any one of [1] to [7], washing the alkali-saponified protective film to a polarizer with water, and laminating the washed protective film to a polarizer on at least one surface of a polarizing element.
[10] A polarizer produced by the method for producing a polarizer of [9].
[11] A polarizer comprising a polarizing element and at least one sheet of the protective film to a polarizer of any one of [1] to [8].
[12] A liquid crystal display device comprising at least one sheet of the protective film to a polarizer of any one of [1] to [8] or at least one of the polarizer of [10] or [11].
[13] A polarizer comprising a polarizing element and two protective films to a polarizer disposed on both sides of the polarizing element, wherein the pH of the aqueous solution of the polarizing element, as measured according to the following method (1), is from 4 to 7, and before and after aged at 60° C. and a relative humidity of 95% for 500 hours, the pH change in the aqueous solution of the polarizing element, as measured according to the following method (1), is less than 0.4.
  Method (1): 40 mg of the polarizing element is dipped in 15 ml of pure water and heated at 100° C. for 2 hours, and then the pH of the aqueous solution is measured.
[14] The polarizer of [13], wherein at least one protective film to a polarizer contains a resin and an organic acid having an octanol/water partition coefficient of at least 3.0 in an amount of from 0.1 to 20 parts by mass relative to 100 parts by mass of the resin.
[15] The polarizer of [14], wherein the organic acid is a compound represented by the following formula (1):

X-L-(R$^1$)$_n$     Formula (1)

wherein X represents an acid group wherein the acid dissociation constant is 5.5 or less; L represents a single bond, or a di- or more valent linking group; R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a,substituent; n represents 1 when L is a single bond, or represents the number expressed by:

(the valent number of L)−1 when L is a di- or more valent linking group.

[16] The polarizer of [15], wherein X in the formula (1) represents a carboxyl group, a sulfonic acid group, a sulfinic acid group, a phosphate group, a sulfonimide group or an ascorbic acid group.

[17] The polarizer of [15] or [16], wherein L in the formula (1) represents a single bond or a di- or more valent linking group selected from the following units, or a di- or more valent linking group formed by combining any of these units:

Unit: —O—, —CO—, —N($R^2$)— wherein $R^2$ represents an alkyl group having from 1 to 5 carbon atoms, —CH (OH)—, —$CH_2$—, —CH=CH—, —$SO_2$—.

[18] The polarizer of any one of [15] to [17], wherein the organic acid represented by the formula (1) comprising a structure in which one molecule of a fatty acid and one molecule of a poly carboxylic acid bond to one molecule of a polyalcohol by ester bond, and the structure has at least one unsubstituted carboxyl group derived from the poly carboxylic acid.

[19] The polarizer of any one of [15] to [18], wherein the organic acid represented by the formula (1) is a carboxylic acid derivative represented by the following formula (2):

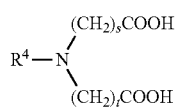

Formula (2)

wherein:
s and t each independently represent 1, 2 or 3;
$R^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that $R^4$ includes the moiety of $R^1$ in the formula (1).

[20] The polarizer of any one of [13] to [19], wherein the protective film to a polarizer comprising cellulose acylate.

[21] The polarizer of [20], wherein the total acyl substitution degree of the cellulose acylate is from 2.0 to 2.97.

[22] A method for producing a polarizer comprising laminating two protective films to a polarizer on both sides of a polarizing element, wherein at least one protective film to a polarizer is formed of a composition that contains a resin and an organic acid having an octanol/water partition coefficient of at least 3.0 in an amount of from 0.1 to 20 parts by mass relative to 100 parts by mass of the resin.

[23] The method for producing a polarizer of [22], wherein the organic acid is a compound represented by the following formula (1):

X-L-($R^1$)$_n$  Formula (1)

wherein X represents an acid group wherein the acid dissociation constant is 5.5 or less; L represents a single bond, or a di- or more valent linking group; $R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each,group may have a substituent; n represents 1 when L is a single bond, or represents the number expressed by:

(the valent number of L)−1 when L is a di- or more valent linking group.

[24] The method for producing a polarizer of [23], wherein X in the formula (1) represents a carboxyl group, a sulfonic acid group, a sulfinic acid group, a phosphate group, a sulfonimide group or an ascorbic acid group.

[25] The method for producing a polarizer of [23] or [24], wherein L in the formula (1) represents a single bond or a di- or more valent linking group selected from the following units, or a di- or more valent linking group formed by combining any of these units:

Unit: —O—, —CO—, —N($R^2$)— wherein $R^2$ represents an alkyl group having from 1 to 5 carbon atoms, —CH (OH)—, —$CH_2$—, —CH=CH—, —$SO_2$—.

[26] The method for producing a polarizer of any one of [23] to [25], wherein the organic acid represented by the formula (1) comprising a structure in which one molecule of a fatty acid and one molecule of a poly carboxylic acid bond to one molecule of a polyalcohol by ester bond, and the structure has at least one unsubstituted carboxyl group derived from the poly carboxylic acid.

[27] The method for producing a polarizer of any one of [23] to [26], wherein the organic acid represented by the formula (1) is a carboxylic acid derivative represented by the following formula (2):

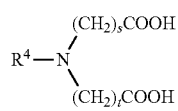

Formula (2)

wherein:
s and t each independently represent 1, 2 or 3;
$R^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that $R^4$ includes the moiety of $R^1$ in the formula (1).

[28] The method for producing a polarizer of any one of [22] to [27], wherein the resin comprising cellulose acylate.

[29] The method for producing a polarizer of [28], wherein the total acyl substitution degree of the cellulose acylate is from 2.0 to 2.97.

[30] A liquid crystal display device comprising at least one of the polarizer of any one of [13] to [21].

[31] A polarizer comprising a polarizing element and at least one protective film to a polarizer and having, between the polarizing element and the protective film to a polarizer, a layer containing an organic acid of the following formula (1) in an amount of from 0.01 to 10 g/m$^2$.

X-L-($R^1$)$_n$  Formula (1)

wherein X represents an acid group wherein the acid dissociation constant is 5.5 or less; L represents a single bond, or a di- or more valent linking group; $R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 when L is a single bond, or represents the number expressed by:

(the valent number of L)−1 when L is a di- or more valent linking group.

[32] The polarizer of [31], wherein $R^1$ in the formula (1) represents a an alkyl group having from 8 to 24 carbon atoms, an alkenyl group having from 8 to 24 carbon atoms or an alkynyl group having from 8 to 24 carbon atoms, and each group may have a substituent.

[33] The polarizer of [31] or [32], wherein $R^1$ in the formula (1) represents a straight chain alkyl group having from 10 to 24 carbon atoms, a straight chain alkenyl group having from 10 to 24 carbon atoms.

[34] The polarizer of any one of [31] to [33], wherein X in the formula (1) represents a carboxyl group, a sulfonic acid group, a sulfinic acid group, a phosphate group, a sulfonimide group or an ascorbic acid group.

[35] The polarizer of any one of [31] to [34], wherein L in the formula (1) represents a single bond or a di- or more valent linking group selected from the following units, or a di- or more valent linking group formed by combining any of these units:

Unit: —O—, —CO—, —N($R^2$)— wherein $R^2$ represents an alkyl group having from 1 to 5 carbon atoms, —CH(OH)—, —CH$_2$—, —CH=CH—, —SO$_2$—.

[36] The polarizer of any one of [31] to [35], wherein the organic acid represented by the formula (1) comprising a structure in which one molecule of a fatty acid and one molecule of a poly carboxylic acid bond to one molecule of a polyalcohol by ester bond, and the structure has at least one unsubstituted carboxyl group derived from the poly carboxylic acid.

[37] The polarizer of any one of [31] to [36], wherein the molecular weight of the organic acid is from 200 to 1000.

[38] The polarizer of any one of [31] to [37], wherein the layer containing an organic acid of formula (1) in an amount of 0.01 to 10 g/m² is an adhesive layer containing fine particles of a metal compound.

[39] The polarizer of [38], wherein the fine particles of a metal compound are of metal oxides.

[40] The polarizer of any one of [31] to [37], wherein the layer containing an organic acid of formula (1) in an amount of 0.01 to 10 g/m² is an ultraviolet curable adhesive layer.

[41] A liquid crystal display device comprising at least one of the polarizer of any one of [31] to [40].

According to the invention, there are provided a polarizer of which the polarizing element degrades little after aged in high-temperature and high-humidity environments and a protective film to a polarizer for use in the polarizer.

FIG. 1 is a schematic view which shows an exemplary example of the liquid crystal display device according to an aspect of the invention.

In the drawing, 1 denotes upper polarizer, 2 denotes absorption axis direction of upper polarizer, 3 denotes upper electrode substrate of liquid crystal cell, 4 denotes alignment control direction of upper substrate, 5 denotes liquid crystal layer, 6 denotes lower electrode substrate of liquid crystal cell, 7 denotes alignment control direction of lower substrate, 8 denotes lower polarizer, 9 denotes absorption axis direction of lower polarizer and 10 donates liquid crystal display device.

BEST MODE FOR CARRYING OUT THE INVENTION

Description will now be made in detail of the protective film to a polarizer, polarizer and liquid crystal display device according to the invention.

Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In the invention, "mass %" means equal to "weight %", and "% by mass" means equal to "% by weight".

The invention includes a first aspect, a second aspect and a third aspect, all of which are preferred.

The first aspect of the invention is a protective film to a polarizer containing a cellulose acylate and satisfying the following requirement (1) or (2):

(1): The surface of the film has a pH of from 3.0 to 4.5.

(2): The surface of the film has a pH of more than 4.5 and at most 6.0, and the film has a moisture permeability of at least 2800 g/m²·day.

The second aspect of the invention is a polarizer comprising a polarizing element and two protective films to a polarizer disposed on both sides of the polarizing element, wherein the pH of the aqueous solution of the polarizing element, as measured according to the following method (1), is from 4 to 7, and before and after aged at 60° C. and a relative humidity of 95% for 500 hours, the pH change in the aqueous solution of the polarizing element, as measured according to the following method (1), is less than 0.4.

Method (1): 40 mg of the polarizing element is dipped in 15 ml of pure water and heated at 100° C. for 2 hours, and then the pH of the aqueous solution is measured.

The third aspect of the invention is a polarizer comprising a polarizing element and at least one protective film to a polarizer and having, between the polarizing element and the protective film to a polarizer, a layer containing an organic acid of the following formula (1) in an amount of from 0.01 to 10 g/m².

   Formula (1)

wherein X represents an acid group wherein the acid dissociation constant is 5.5 or less; L represents a single bond, or a di- or more valent linking group; $R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 when L is a single bond, or represents the number expressed by:

(the valent number of L)−1 when L is a di- or more valent linking group.

[[First Aspect of the Invention]]

Hereinafter describes the first aspect of the invention, at first.

A liquid crystal display device has a constitution where a liquid crystal cell is sandwiched between two polarizers put on and below the cell. A polarizer is generally so designed that a protective film to a polarizer is stuck to one or both surfaces of a polarizing element having polarizance via an adhesive layer therebetween. As the polarizing element, mainly used is polyvinyl alcohol (PVA), and between PVA molecules aligned in parallel to each other, iodine or a dichroic dye is aligned, and further, the iodine or the like is firmly fixed in the ladder-structured space formed through crosslinking of the parallel-aligned PVA molecules with a boron compound. On the other hand, as the protective film to a polarizer, favorably used is a cellulose acylate film as optically transparent and having a small birefringence.

However, when the polarizer of the type is left in high-temperature high-humidity environments, its polarization property worsens with time therefore providing a problem in that the display performance of the liquid crystal display device comprising the polarizer is worsened. The reason is considered as follows: Since PVA having a high water absorption rate is used as the polarizing element, the alignment of the PVA molecules having extended through moisture absorption is disordered and therefore the alignment of the iodine aligned and adsorbed along the molecules is also disordered to cause iodine desorption and thereby polarizance depression.

The cellulose acylate film used as the protective film in the case can sufficiently fulfill the function of the protective film in ordinary humidity environments such as indoor environments and therefore can prevent the moisture absorption by the polarizing element. However, since the cellulose acylate film generally has high moisture permeability and may therefore readily transmit the environmental moisture in high-temperature high-humidity environment, the film could hardly prevent the moisture absorption by the polarizing element. Specifically, when the cellulose acylate film is used as a protective film to a polarizer in high-temperature high-humidity environments in which use of liquid crystal display devices is desired these days, then PVA alignment may be readily disordered and there occurs a problem in that the durability of the polarizer cannot be enhanced.

As a method for solving the problem of polarizer durability in such wet heat environments, JP-A-2004-240042 discloses a method of controlling the inner condition of a polarizer in order that the alignment state of boron contained in the polarizing element could keep 4-coordination, thereby toughening the crosslinked structure with the boron compound and preventing the PVA chain expansion and the accompanying iodine diffusion. Concretely, there is mentioned a method of producing a polarizer in such a manner that boric acid could maintain the condition of 4-coordination not taking 3-coordination, in which boric acid is prevented from reacting the hydroxyl group of cellulose acylate and an acid (especially sulfuric acid) that catalyzes the reaction is prevented from being incorporated in cellulose acylate. Heretofore, a method of alkali-saponifying a cellulose acylate film for improving the adhesiveness of the film and then applying thereto an aqueous acidic solution to neutralizing the film has been generally employed in the art; however, JP-A-2004-240042 discloses a method of controlling the film surface pH of a cellulose acylate film to be from 5 to 9 by removing alkali only by washing with water but not taking the alkali neutralization treatment with such an aqueous acidic solution.

The patent reference JP-A-2004-240042 says in [0035] that an acid having an acid dissociation constant pKa of from 1.93 to 4.50 may be added as a peeling agent for reducing the peeling stress of the cellulose acylate film, but no example of adding such an acid as a peeling agent is investigated therein from the above-mentioned viewpoint.

The method of controlling the film surface pH of cellulose acylate film disclosed in JP-A-2004-240042 is known in other references as a method of enhancing the film strength after aging in high-temperature and high-humidity environments to thereby prevent the coloration of the film. For example, JP-A-2006-208934 discloses an optical film production method through melt casting of a cellulose acetate propionate having a water content of from 50 to 1000 ppm, having a pH in dipping in pure water of from 5 to 7 and having a total degree of acyl substitution of 2.65, saying that the film surface pH of the obtained film could be from 5 to 7. The patent reference discloses a method of neutralizing all the acidic substances contained in the cellulose acylate before melt casting, for obtaining a high-strength and hardly-discoloring film.

The patent reference JP-A-2006-208934 has neither disclosure nor suggestion of an example of investigating the durability of the polarizing element when the obtained film is incorporated in a polarizer as a protective film to a polarizer and when the polarizer is aged in high-temperature and high-humidity environments. For example, Example 1 in the patent reference demonstrates a case having a film surface pH of 5.0, in which, however, nothing is investigated relating to the durability of the polarizing element after aged in high-temperature and high-humidity environments. Comparative Example 1 in the patent reference demonstrates a comparative case of using a cellulose acetate propionate having a total degree of acyl substitution of 2.65 to lower the film surface pH to 4.6; however, the reference says that the obtained film is unfavorable since the physical strength of the film is low and the film is discolored after aged in high-temperature and high-humidity environments.

The present inventors investigated the durability in high-temperature and high-humidity conditions of the polarizer and the liquid crystal display device obtained according to the method described in JP-A-2004-240042, and had known that the polarizer and the device are still unsatisfactory and require further improvements.

The problem that the first aspect of the invention is to solve is to provide a polarizer of which the polarizing element degrades little after aged in high-temperature and high-humidity environments and a protective film to a polarizer for use in the polarizer.

The inventors have assiduously studied for the purpose of solving the above-mentioned problem and, as a result, have found that when the film surface pH is controlled to be from 3 to 4.5, then the degradation of the polarizing element after aged in high-temperature and high-humidity environments can be surprisingly remarkably prevented.

On the other hand, it has heretofore been considered that, since the protective film to a polarizer having a higher moisture permeability could more readily permeate the environmental moisture in high-temperature and high-humidity environments, the film could promote the moisture absorption by the polarizing element and therefore the polarizer durability would be thereby worsened. However, the present inventors increased the moisture permeability of the film up to at least 2800 $g/m^2 \cdot day$ and, as a result, have found that the degradation of the polarizing element after aged in high-temperature and high-humidity environments can be prevented even when the film surface pH is within a range of more than 4.5 and at most 6.0. The finding that the durability can be improved even when the moisture permeability is high is contrary to the knowledge heretofore known in the art and is a surprising result.

[Protective Film to Polarizer]

The protective film to a polarizer of the first aspect of the invention (hereinafter this may be referred to as the film of the first aspect of the invention) contains a cellulose acylate and satisfies the following requirement (1) or (2):

(1): The surface of the film has a pH of from 3.0 to 4.5.

(2): The surface of the film has a pH of more than 4.5 and at most 6.0, and the film has a moisture permeability of at least 2800 $g/m^2 \cdot day$.

With reference to the preferred embodiments of the protective film to a polarizer of the first aspect of the invention, the first aspect of the invention is described concretely hereinunder.

<Film Properties>

The first embodiment of the protective film to a polarizer of the first aspect of the invention is to satisfy the above-mentioned requirement (1), or that is, the film surface pH of from 3.0 to 4.5.

Heretofore it has been known that, when the film surface pH is 4.5 or less as in the above, then the cellulose acylate film corrodes the casting support (so-called band or drum) in its melt casting thereon, therefore causing discoloration or fish eye failure of the formed film, and to solve the problem, the casting support must be washed. Accordingly, from the viewpoint of the production cost, the film surface pH is not lowered to 4.5 or less in ordinary practice of film production. However, the present inventors tried aging the polarizer that comprising the protective film to a polarizer having the constitution as above, in high-temperature and high-humidity environments, and have found that the durability of the polarizer is significantly improved.

The film surface pH as referred to in this description means as follows: 50 μl of decarbonated water prepared by bubbling pure water with nitrogen for at least 15 minutes is dropped onto the film, and after 10 minutes, the pH of the decarbonated water is measured through contact of a flat glass pH electrode with the film surface, and the thus-measured pH value is the film surface pH.

Preferably, the surface of the film has a pH of at least 3.0 from the viewpoint that the cellulose acylate is not decomposed. Also preferably, the film surface pH is at most 4.5 from the viewpoint that the film can enjoy the effect of the first aspect of the invention irrespective of the moisture permeability thereof.

More preferably, in the first embodiment of the film of the first aspect of the invention, the film surface pH is from 3.5 to 4.5, even more preferably from 4.0 to 4.5.

The second embodiment of the protective film to a polarizer of the first aspect of the invention is to satisfy the above-mentioned requirement (2), or that is, the surface of the film has a pH of more than 4.5 and at most 6.0 and the moisture permeability of at least 2800 g/m$^2$·day.

In case where the surface of the film has a pH of more than 4.5 and at most 6.0, the film can enjoy the effect of the first aspect of the invention when the moisture permeability thereof is controlled to fall within the above range. When the film surface pH is more than 4.5 and at most 6.0 and when the moisture permeability of the film is lower than the above range, then the polarizing element durability in high-temperature and high-humidity environments tends to worsen. It has heretofore been considered that, since the protective film to a polarizer having a higher moisture permeability could more readily permeate the environmental moisture in high-temperature and high-humidity environments, the film could promote the moisture absorption by the polarizing element and therefore the polarizing element durability would be thereby worsened. However, as a result of the present inventors' investigations, it has been found that, when the film surface pH is more than 4.5 and at most 6.0 and when the moisture permeability of the film is controlled to fall within the above range, then the polarizing element durability in high-temperature and high-humidity environments can be remarkably improved contrary to the conventional knowledge. Not adhering to any theory, it may be presumed that the film having a higher moisture permeability may enjoy a higher durability-enhancing effect through acid addition thereto since the acid component may readily diffuse into the PVA layer of the polarizer.

Preferably, the film surface pH is at most 6.0 from the viewpoint of enhancing the polarizing element durability in high-temperature and high-humidity environments.

In the second embodiment of the film of the first aspect of the invention, the film surface pH is more than 4.5 and at most 6.0, and in this case, more preferably, the film surface pH is more than 4.5 and at most 5.5, even more preferably more than 4.5 and at most 5.3.

In the first aspect of the invention, the moisture permeability means the weight of the water vapor that passes through a sample having an area of 1 m$^2$ for 24 hours, in an atmosphere at a temperature of 60° C. and a relative humidity of 95%, according to the moisture permeability test (cup method) of JIS Z0208.

In the second embodiment of the film of the first aspect of the invention, the moisture permeability is preferably from 2800 to 5000 g/m$^2$·day, more preferably from 2800 to 4000 g/m$^2$·day.

Preferably, the film of the first aspect of the invention has a film surface pH of from 3.0 to 6.0 and a moisture permeability of at least 2800 g/m$^2$·day. When having a film surface pH of from 3.0 to 4.5 and having a moisture permeability of at least 2800 g/m$^2$·day, the film can more favorably enjoy the durability-enhancing effect by acid addition thereto since the acid component can more readily diffuse into the PVA layer when the film moisture permeability is higher. In this case, the preferred range of the film moisture permeability is the same as the preferred range in the second embodiment of the first aspect of the invention.

In case where the moisture permeability is at least 2800 g/m$^2$·day, the film surface pH is more preferably from 3.5 to 6.0, even more preferably from 4.0 to 6.0, still more preferably from 4.0 to 5.5, and also preferred is more than 4.5 and at most 5.3.

Preferably, the water content of the protective film to a polarizer of the first aspect of the invention is at least 4.0% from the viewpoint of the driability in processing the film to produce polarizer, or that is, from the viewpoint of the polarizer producibility.

The water content as referred to in the description means the value computed by dividing the water amount (g) contained in the protective film to a polarizer having a size of 24 mm×35 mm and conditioned at 25° C. and 80% RH for at least 2 hours, by the sample weight (g).

The water content as referred to herein means the content of water in the film under a predetermined condition, and corresponds to the water retention ability of the film. When the water content of the protective film to a polarizer of the first aspect of the invention is not less than the above range, then the protective film to a polarizer of the first aspect of the invention can assist the action of PVA to expel the inner water thereof outside in laminating (sticking) the polarizing element and the protective film to a polarizer, especially when the moisture permeability of the protective film to a polarizer of the first aspect of the invention is high.

Preferably, the water content of the protective film to a polarizer of the first aspect of the invention is from 4.0 to 10.0%, more preferably from 4.0 to 8.0%.

(Film Thickness)

Preferably, the thickness of the of the film of the first aspect of the invention is from 30 to 100 μm, more preferably from 30 to 80 μm, even more preferably from 30 to 60 μm.

<Method of Controlling Film Surface pH>
(A) Acidic Compound:

For controlling the film surface pH in the first aspect of the invention, first mentioned is a method of adding an acidic compound to the film. The acidic compound may be any one capable of controlling the film surface pH to fall within the range that satisfies the above-mentioned requirement (1) or (2), not contradictory to the scope and the sprit of the first aspect of the invention.

Preferably, the acidic compound is a compound not only capable of controlling the film surface pH of the film of the first aspect of the invention but also capable of controlling the moisture permeability and/or the water content of the film to fall within the preferred range of the first aspect of the invention.

Above all, the following acidic compounds are preferred for use in the first aspect of the invention.
(Acidic Compound of Formula (1))

Preferably, the film of the first aspect of the invention contains an organic acid of the following formula (1), from the viewpoint of its ability to control the film surface pH of the film of the first aspect of the invention and of its ability to enhance the corrosion resistance of the casting support in case where the film of the first aspect of the invention is formed through casting film formation.

$$X\text{-}L\text{-}(R^1)_n \qquad \text{Formula (1)}$$

wherein X represents an acid group wherein the acid dissociation constant is 5.5 or less; L represents a single bond, or a di- or more valent linking group; $R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 in the case where L is a single bond, or represents the number expressed by:

(the valent number of L)−1 in the case where L is a di- or more valent linking group.

In the organic acid represented by the above formula (1), the acid group moiety of the X part acts to enhance the releasability of the formed film from the solution casting apparatus (metal support for dope casting thereon). Reduction of the releasability would be caused by the mechanism that the surface of a metal support (for example stainless) used for casting have an interaction (for example hydrogen bond) with the polar moiety (for example a hydroxyl group) in a cellulose contained in a dope directly or indirectly through components contained in the dope (for example a compound having an acid group or impurities) to increase the adhesiveness between the metal support and the dope. The polycarboxylic acid represented by the formula (1) would have a function to reduce or prevent the interaction under the mechanism.

Specifically, the X part of the acid group moiety adheres to the metal surface of the support, and the $R^1$ part of the hydrophobic group moiety having a specific structure protects the metal surface of the support from an oxidizing agent such as oxygen or the like, and therefore, as compared with an organic acid in which the hydrophilic group does not fall in the range of the above $R^1$, the organic acid for use in the invention is more effective for preventing metal corrosion.

Hereinafter describes the acidic compound preferably used in the film of the first aspect of the invention.

In the formula (1), X represents an acid group wherein the acid dissociation constant is 5.5 or less, X is preferably a carboxyl group, a sulfonic acid group, a sulfinic acid group, a phosphate group, a sulfonimide group or an ascorbic acid group, further preferably a carboxyl group or a sulfonic acid group, most preferably a carboxyl group. In case where X represents an ascorbic acid group, 5 and 6-position hydrogen atoms of the ascorbic acid group preferably dissociate to bond to L.

In this description, the data given in "Handbook of Chemistry" published by Maruzen may be employed for the acid dissociation constant.

In the formula (1), $R^1$ represents an alkyl group having from 6 to 30 carbon atoms (which may have a substituent and may be a cycloalkyl group), an alkenyl group having from 6 to 30 carbon atoms (which may have a substituent), an alkynyl group having from 6 to 30 carbon atoms (which may have a substituent), an aryl group having from 6 to 30 carbon atoms (which may have a substituent) or a from 6 to 30 membered heterocyclic group (which may have a substituent). Example of the substituent includes a halogen atom, an alkyl group (which preferably has from 1 to 10 carbon atoms, more preferably from 1 to 6 carbon atoms) an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acyl amino group, an oxycarbonyl group, a carbamoyl group, a sulfonyl group, a sulfamoyl group, a sulfonamide group, a sulfolyl group, a carboxyl group, etc.

$R^1$ is preferably an aryl group having from 6 to 24 carbon atoms, a from 6 to 24 membered heterocyclic group, an alkyl group having from 8 to 24 carbon atoms, an alkenyl group having from 8 to 24 carbon atoms or an alkynyl group having from 8 to 24 carbon atoms, most preferably an aryl group having from 6 to 20 carbon atoms, a from 6 to 20 membered heterocyclic group, a straight chain alkyl group having from 10 to 24 carbon atoms or a straight chain alkenyl group having from 10 to 24 carbon atoms.

L in the formula (1) preferably represents a single bond or a di- or more valent linking group selected from the following units, or a di- or more valent linking group formed by combining any of these units:

Unit: —O—, —CO—, —N($R^2$)— (where $R^2$ represents an alkyl group having from 1 to 5 carbon atoms), —CH(OH)—, —$CH_2$—, —CH=CH—, —$SO_2$—.

L in formula (1) is preferably a single bond or has an ester group-derived linking group (—COO—, —OCO—) or an amide group-derived linking group (—CON($R^2$)—, —N($R^2$)CO—) as the partial structure thereof.

L may further have a substituent; and not specifically defined, the substituent may be any one selected from those described above for the substituent that $R^1$ may have. Of those, preferred are —OH and an alkyl group (more preferably an alkyl group substituted with a carboxylic acid).

$R^2$ may have a substituent. The substituent is not specifically limited. Examples of the substituent include the above examples of the substituent which $R^1$ may have. Of those, preferred is a carboxyl group.

L is more preferably a linking group comprising a group derived from glycerin or a group derived from iminodicarboxylic acid (—N($CH_2COOH$)($CH_2COOH$)).

Preferably, L concretely has the following structure. In the following, p, q and r each indicate an integer of from 1 to 40, preferably from 1 to 20, more preferably from 1 to 10, even more preferably from 1 to 6. More particularly preferably, q indicates an integer of from 2 to 4.

L1: —$(CH_2)_p$—CO—O—$(CH_2)_q$—O—;
L2: —$(CH_2)_p$—CO—O—$(CH_2)_q$—(CH(OH))—$(CH_2)_r$—O—;

L3: —(CH$_2$)$_p$—CO—O—(CH$_2$)$_q$—(CH(OCO—R$^3$))—(CH$_2$)$_r$—O—;
L4: —(CH$_2$)$_p$—CO—O—(CH$_2$)$_q$—(CH(OH))—(CH$_2$)$_r$—O—CO—;
L4': —(CH$_2$)$_p$—CO—O—(CH$_2$)$_q$—(CH (OCO—R$^3$))—(CH$_2$)$_r$—O—CO—;
L5: —(CH$_2$)$_p$-n(CH$_2$COOH)—;
L6: —(CH$_2$)$_p$—N(CH$_2$COOH)—(CH$_2$)$_q$—;
L7: —(CH$_2$)$_p$—N(CH$_2$COOH)—(CH$_2$)$_q$—O—;
L8: —(CH$_2$)$_p$—N(CH$_2$COOH)—(CH$_2$)$_q$—CONH—;
L9: —(CH$_2$)$_p$—N(CH$_2$COOH)—(CH$_2$)$_q$—CONN—(CH$_2$)$_r$—;
L10: —(CH$_2$)$_p$—N(CH$_2$COOH)—CO—;
L11: —(CH$_2$)$_p$—N(CH$_2$COOH)—CO—CH(CH$_2$COOH)—;
L12: —(CH$_2$)$_p$—N(CH$_2$COOH)—SO$_2$—.

R$^3$ in the specific examples of L has the same meaning as that of R$^1$ in the above formula (1). Specifically, R$^3$ in the liking group of —(CH$_2$)$_p$—CO—O—(CH$_2$)$_q$—(CH(OCO—R$^3$))—(CH$_2$)$_r$—O— is described inside L for convenience sake, but the linking group L means the part from which R$^3$ is removed. Accordingly, in this case, L is trivalent. This may be expressed as the formula (1), X-L-(R$^1$)$_2$ (wherein L is —(CH$_2$)$_p$—CO—O—(CH$_2$)$_q$—(CH(OCO—))—(CH$_2$))$_r$—O— and in this case, the linking group L is a trivalent linking group.

Preferably, L and X bonds to each other via an ester bond or an amide bond, more preferably via an ester bond. Preferably, X does not have an ester bond or an amide bond therein.

Preferably, L and R$^1$ bonds to each other via an ester bond, an ether bond or an amide bond, more preferably an ester bond or an amide bond, even more preferably an ester bond. Preferably, R$^1$ does not have an ester bond, an ether bond or an amide bond therein.

Preferred examples of the organic acid of formula (1) for use in the invention are given below.

<<Fatty Acid>>
Myristic acid, palmitic acid, stearic acid, oleic acid, linolic acid, linolenic acid, recinoleic acid, undecanoic acid.

<<Alkylsulfuric Acid>>
Myristylsulfuric acid, cetylsulfuric acid, oleylsulfuric acid.

<<Alkylbenzenesulfonic Acid>>
Dodecylbenzenesulfonic acid, pentadecylbenzenesulfonic acid.

<<Alkylnaphthalenesulfonic Acid>>
Sesquibutylnaphthalenesulfonic acid, diisobutylnaphthalenesulfonic acid.

<<Dialkylsulfosuccinic Acid>>
Dioctylsulfosuccinic acid, dihexylsulfosuccinic acid, dicyclohexylsulfosuccinic acid, diamylsulfosuccinic acid, ditridecylsulfosuccinic acid.

<<Polycarboxylic Acid Represented by Formula (2)>>
The organic acid represented by the formula (1) is preferably a polycarboxylic acid represented by the following formula (2):

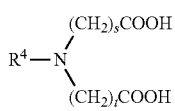

Formula (2)

In the formula, s and t each independently represent 1, 2 or 3. R$^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that R$^4$ includes the moiety of R$^1$ in the formula (1).

Preferably, s and t each independently represent 1 or 2 more preferably 1.

R$^4$ preferably represents an alkyl group having from 1 to 30 carbon atoms (which may have a substituent and may be a cycloalkyl group), an arylsulfonyl group having from 6 to 30 carbon atoms (which may have a substituent), an acyl group (which may have a substituent). More preferably, R$^4$ represents an alkyl group having from 1 to 30 carbon atoms (which may have a substituent), still more preferably an alkyl group having from to 24 carbon atoms (which may have a substituent), particularly preferably an alkyl group having from 1 to 20 carbon atoms.

Example of the substituent for R$^4$ includes an alkyl group, a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acyl amino group, an oxycarbonyl group, a carbamoyl group, a sulfonyl group, a sulfamoyl group, a sulfonamide group, and a carboxyl group; preferably an alkyl group, an acyl group, an aryl group and a carbamoyl group; more preferably an aryl group and a carbamoyl group.

The substituent of R$^4$ may further have a substituent. Preferably range of the substituent is the same as the preferably range of the substituent of R$^4$.

Most preferably, R$^4$ is an alkyl group having from 1 to 24 carbon atoms having an aryl group as a substituent, or an alkyl group having from 1 to 24 carbon atoms having a carbamoyl group as a substituent in which the carbamoyl group is preferably substitutied by an aryl group. The aryl group is preferably substituted by an alkyl group having from 1 to 10 carbon atoms, more preferably from 1 to 8 carbon atoms.

Examples of the carboxylic acid derivatives represented by Formula (3) include:
N-(2,6-diethylphenylcarbomoylmethyl)iminodiacetic acid represented by the following Formula (3):

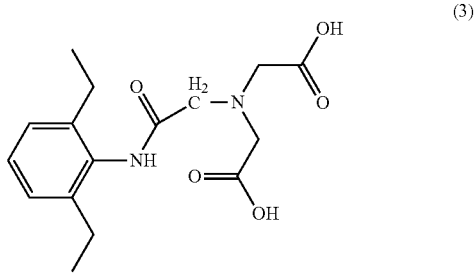 [SMILES: CCc1cccc(CC)c1NC(=O)CN(CC(=O)O)CC(=O)O]

N-benzyliminodiacetic acid represented by the following Formula (4):

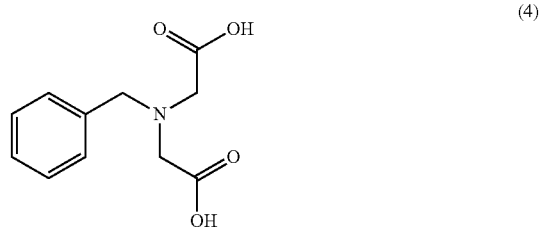 [SMILES: O=C(O)CN(CC(=O)O)Cc1ccccc1]

a compound represented by any one of the following Formulae (5) to (12):
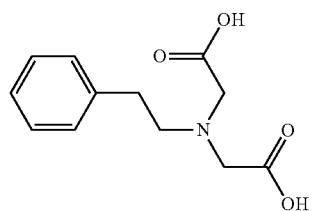
(5)
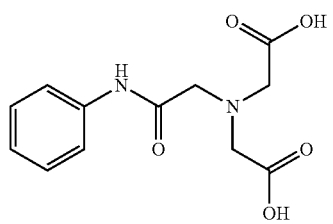
(6)
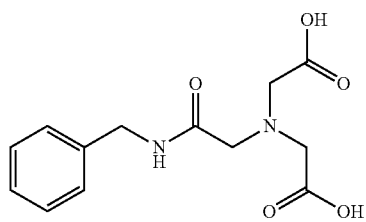
(7)
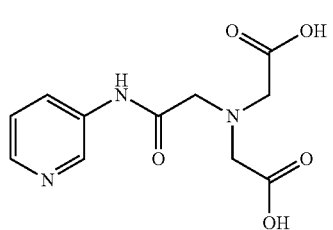
(8)
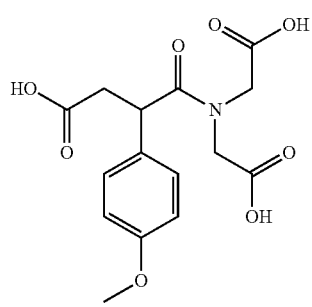
(9)
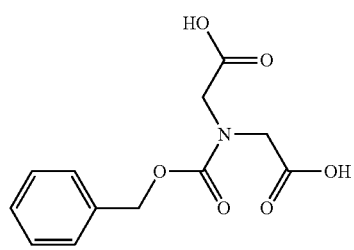
(10)
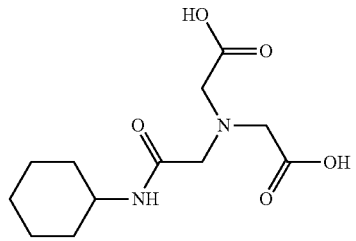
(11)
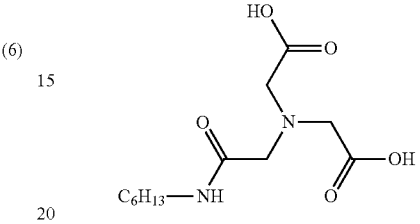
(12)
lauraminodiacetic acid represented by the following Formula (13):
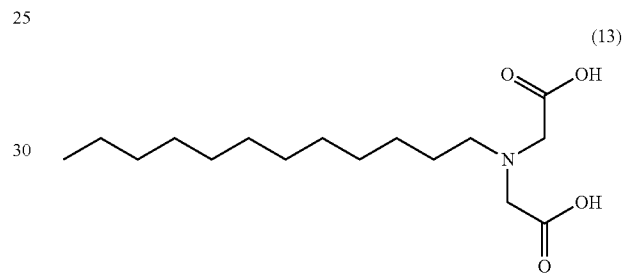
(13)
a compound represented by any one of the following Formulae (14) to (22):
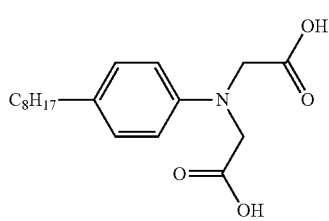
(14)
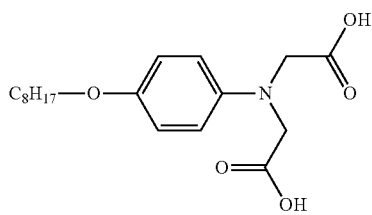
(15)
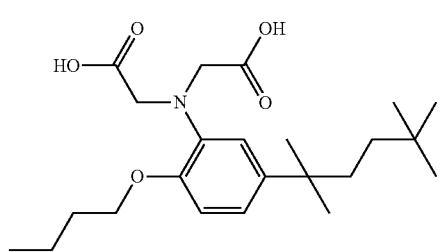
(16)

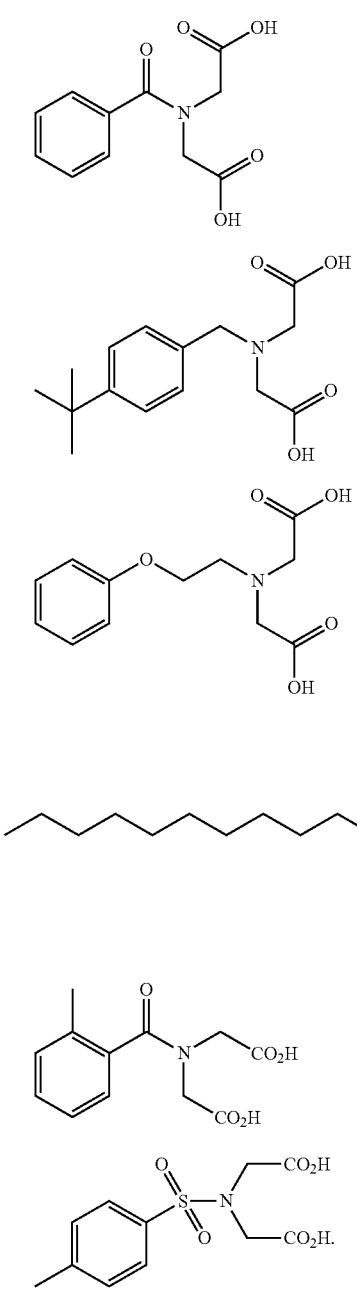

<<Polycarboxylic Acid, and Partial Derivative of Polycarboxylic acid>>

The organic acid of the formula (1) is preferably a partial derivative of a polycarboxylic acid from a viewpoint of adjusting pH of the surface of the film of the first aspect of the invention and from a viewpoint of improving the corrosiveness of a casting support when the film of the first aspect of the invention is manufactured by a solution casting method. In this description, the partial derivative of a polycarboxylic acid has a structure where one molecule of a fatty acid and a polycarboxylic acid are ester-bonded to one molecule of a polyalcohol, and is a compound having at lest one unsubstituted acid group derived from a polycarboxylic acid. In this description, the fatty acid means an aliphatic monocarboxylic acid. Specifically, the fatty acid in this description is not limited to a so-called higher fatty acid but includes a lower fatty acid having at most 12 carbon atoms such as acetic acid, propionic acid, etc.

The partial derivative of a polycarboxylic acid is preferably a partial derivative of a polycarboxylic acid. Above all, the organic acid of formula (1) comprising a structure wherein one molecule of fatty acid and one molecule of poly carboxylic acid bond to one molecule of polyalcohol by ester bond, wherein the structure has at least one of unsubstituted carboxyl group derived from the poly carboxylic acid. The polycarboxylic acid for the partial derivative of a polycarboxylic acid is not specifically defined, for which, for example, preferred are succinic acid, citric acid, tartaric acid, diacetyltartaric acid, malic acid, adipic acid.

The polyalcohol for the partial derivative of a polycarboxylic acid includes adonitol, arabitol, ethylene glycol, diethylene glycol, triethylene glycol, tetraethylene glycol, 1,2-propanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, glycerin, etc. In those, preferred are glycerin and so it is preferably that the organic acid represented by formula (1) is a so-called organic acid monoglyceride.

The organic acid of formula (1) for use in the invention is preferably an organic acid glyceride (glycerin fatty acid organic acid ester) in which the acid group X of the organic acid bonds to the hydrophobic moiety $R^1$ via the linking group L containing a glycerin-derived group from a viewpoint of adjusting pH of the surface of the film of the first aspect of the invention and from a viewpoint of improving the corrosiveness of a casting support when the film of the first aspect of the invention is manufactured by a solution casting method. The organic acid glyceride in this description is a compound having a structure in which one or two of the three hydroxyl groups of glycerin form an ester bond with a fatty acid and the remaining one or two hydroxyl groups form an ester bond with a polycarboxylic acid and which has an acid group derived from the polycarboxylic acid.

Above all, more preferred is an organic acid monoglyceride or an organic acid diglyceride, and even more preferred is an organic acid monoglyceride. The organic acid monoglyceride in this description is a compound having a structure in which one of the three hydroxyl groups of glycerin forms an ester bond with a fatty acid and the remaining one or two hydroxyl groups form an ester bond with a polycarboxylic acid and which has an acid group derived from the polycarboxylic acid. The organic acid diglyceride in this description is a compound having a structure in which two of the three hydroxyl groups of glycerin form an ester bond with a fatty acid and the remaining one hydroxyl group forms an ester bond with a polycarboxylic acid and which has an acid group derived from the polycarboxylic acid.

Of the organic monoglyceride, more preferred is one having a structure in which one of the three hydroxyl groups of glycerin forms an ester bond with a fatty acid and the remaining one hydroxyl group is an unsubstituted hydroxyl group and the last one hydroxyl group forms an ester bond with a polycarboxylic acid and which has an acid group derived from the polycarboxylic acid. Preferably, the hydroxyl group ester-bonding to the fatty acid in the organic acid monoglyceride is in an asymmetric position (so-called α-monoglyceride position), and the hydroxyl group ester-bonding to the polyorganic acid in the organic acid monoglyceride is similarly in an asymmetric position (so-called α-monoglyceride position). Specifically, of the above-mentioned organic monoglyceride, preferred is one having a structure which has an unsubstituted hydroxyl group and in which the carbon atom directly bonds to the hydroxyl group that ester-bonds to the fatty acid and the carbon atom directly bonds to the hydroxyl group that ester-bonds to the polycarboxylic acid do not lie next to each other.

Of the above-mentioned organic monoglyceride, especially preferred is a polycarboxylic acid monoglyceride. The polycarboxylic acid monoglyceride has at least one unsubstituted carboxyl group of the polycarboxylic acid moiety and the other carboxyl groups are substituted with a monoglyceride. More preferred is a carboxyl group-having organic acid monoglyceride in which one fatty acid molecule and one polyvalent carboxylic acid molecule bond to one glycerin molecule.

The polycarboxylic acid for the monoglyceride of a polycarboxylic acid is not specifically defined, for which, for example, preferred are succinic acid, citric acid, tartaric acid, diacetyltartaric acid, malic acid, adipic acid.

The fatty acid for the monoglyceride of a polycarboxylic acid is not specifically defined, for which is preferred a saturated or unsaturated fatty acid having from 8 to 22 carbon atoms. Concretely mentioned are caprylic acid, capric acid, lauric acid, myristic acid, palmitic acid, stearic acid, behenic acid, oleic acid, etc.

The carboxyl group-having organic acid monoglyceride for use in the film of the first aspect of the invention is described in detail hereinafter.

The carboxyl group-having organic acid monoglyceride usable in the film of the first aspect of the invention may be obtained by reacting a polyorganic acid anhydride and a fatty acid monoglyceride generally according to the method described in JP-A 4-218597 and Japanese Patent No. 3823524.

The reaction is attained generally in the absence of a solvent, and for example, the reaction of succinic acid and a fatty acid monoglyceride having 18 carbon atoms may be attained at a temperature of around 120° C. and may be completed within about 90 minutes. Thus obtained, the organic acid monoglyceride is generally a mixture containing an organic acid, unreacted monoglyceride and diglyceride and other oligomers. In the first aspect of the invention, the mixture may be used directly as it is.

For increasing the purity of the carboxyl group-having organic acid monoglyceride, the carboxyl group-having organic acid monoglyceride may be isolated from the mixture through distillation or the like. The carboxyl group-having organic acid monoglyceride having a high purity is commercially available as a distilled monoglyceride, which may be used in the invention. Commercial products of the carboxyl group-having organic acid monoglyceride include, for example, Riken Vitamin's Poem B-30, Riken Vitamin's Poem K-37V (citric and oleic acid esters of glycerol), Kao's Step SS (succinic acid monoglyceride in which stearic acid/palmitic acid monoglyceride bonds to succinic acid), etc.

The amount of the organic acid of formula (1) to be in the film of the first aspect of the invention is in a ratio of from 0.01% by mass to 10% by mass relative to the cellulose acylate, preferably from 0.1% by mass to 10% by mass, more preferably from 0.5% by mass to 10% by mass, particularly preferably from 1.5% by mass to 5% by mass, even more preferably from 2.5% by mass to 5% by mass.

When the amount is at least 0.01% by mass, then the polarizing element durability improving effect and the releasability improving effect of the resin film are satisfactory. When the amount is at most 20% by mass, then it is favorable since the organic acid hardly bleeds out when aged in high-temperature and high-humidity condition and since the vertical transmittance of the polarizer that comprising the film hardly increases.

The concentration of the organic acid of formula (1) to be in the film of the first aspect of the invention is preferably from 0.2 to 40 mmol per 100 g of the film, more preferably from 0.5 to 5 mmol, even more preferably from 0.6 to 4,.5 mmol, still more preferably from 0.8 to 4.0 mmol.

(Other Acidic Compound)

In addition to the organic acid of the formula (1), a known acidic compound may be added to the film of the first aspect of the invention. As the known acidic compound, the compounds described in JP-A 2006-45497, [0048] to [0069] may be preferably used herein. These compounds and other examples of the acidic compound preferably used. For example, an organic or an inorganic acidic compound, a surfactant and a chelating agent are used as the other acidic compound.

The acidic compound is preferably an organic acid, a polycarboxylate ester, a surfactant or a chelating agent.

As the polycarboxylate ester, preferred are the compounds described in JP-A 2006-45497, paragraph [0049].

As the surfactant, preferred are the compounds described in JP-A 2006-45497, paragraphs [0050] to [0051].

The chelating agent is a compound capable of being chelated with a polyvalent ion such as an iron ion or the like metal ion or a calcium ion or the like alkaline earth metal ion. As the chelating agent, usable here are the compounds described in JP-B 6-8956 and JP-A 11-190892.

The total content of the release promoter in the film of the first aspect of the invention is preferably in an amount of from 0.001% by mass (10 ppm) to 20% by mass (200000 ppm), more preferably in an amount of from 0.005% by mass (50 ppm) to 15% by mass (150000 ppm), particularly preferably in an amount of from 0.01% by mass (100 ppm) to 10% by mass (100000 ppm), more particularly preferably in an amount of from 0.03% by mass (300 ppm) to 10% by mass (100000 ppm), further more particularly preferably in an amount of from 0.1% by mass (1000 ppm) to 5% by mass (50000 ppm), relative to the amount of the cellulose acylate contained in the film of the invention.

(B) Method of Washing Film Surface with Water:

For controlling the film surface pH in the first aspect of the invention, also mentioned is a method of washing the film surface with water. Concretely, the film of the first aspect of the invention is once formed, it is saponified and then washed with water to thereby control the film surface pH, and then the thus-controlled film may be stuck to a polarizing element. For washing the protective film to a polarizer after the saponification treatment to control the film surface pH to fall within the above range, the following method may be mentioned.

After washed with water, the film is led to pass through an aqueous acidic solution of from 0.01 to 4.0 N hydrochloric acid, nitric acid, sulfuric acid, acetic acid, chloroacetic acid, oxalic acid or the like.

Other embodiments of saponification treatment will be described in detail in the section of the method for producing the protective film to a polarizer of the first aspect of the invention to be mentioned below, or in the section of the method for producing a polarizer to be mentioned below.

<Cellulose Acylate>

(Starting Material)

The cellulose acylate for use in the first aspect of the invention is not specifically defined. The starting material cellulose for the cellulose acylate includes cotton linter and wood pulp (broad-leaved tree pulp, coniferous tree pulp), etc.; and any cellulose acylate obtained from any starting material cellulose is employable herein. As the case may be, mixtures of cellulose acylates are also usable. The details of the starting material cellulose are described, for example, in Marusawa & Uda's "Plastic Materials Lecture (17), Cellulose Resins" by Nikkan Kogyo Shinbun (1970) and in Hatsumei Kyokai Disclosure Bulletin No. 2001-1745 (pp. 7 and 8).

Description will first be made in detail of the cellulose acylate preferably used for the first aspect of the invention. The glucose units having a β-1,4 bond and forming the cellulose have free hydroxyl groups in the 2-, 3- and 6-positions thereof. The cellulose acylate is a polymer obtained by esterifying a part or all of those hydroxyl groups. Its acyl substitution degree means the total of the esterification degrees of cellulose in the 2-, 3- and 6-positions (an esterification degree of 100% meaning a substitution degree of 1).

The degree of total acyl substitution, or that is, DS2+DS3+DS6 is preferably from at least 1.0 to less than 2.6, more preferably from at least 1.5 to less than 2.6, even more preferably from at least 2.0 to less than 2.6. The water vapor permeability and/or moisture content of the film of the first aspect of the invention can be adjusted to the desirable range of the first aspect of the invention because the total degree of acyl substitution of the cellulose is in the above-mentioned range.

DS6/(DS2+DS3+DS6) is preferably from 0.08 to 0.66, more preferably from 0.15 to 0.60, even more preferably from 0.20 to 0.45. DS2 is a degree of acyl substitution at the 2-positioned hydroxyl group in glucose unit (hereinafter this may be referred to as "degree of 2-position acyl substitution"); DS3 is a degree of acyl substitution at the 3-positioned hydroxyl group (hereinafter this may be referred to as "degree of 3-position acyl substitution"); and DS6 is a degree of acyl substitution at the 6-positioned hydroxyl group (hereinafter this may be referred to as "degree of 6-position acyl substitution"). DS6/(DS2+DS3+DS6) is a proportion of the degree of 6-position acyl substitution to the degree of total acyl substitution, and this may be hereinafter referred to as "proportion of 6-position acyl substitution".

Only one acyl group or two or more different acyl groups may be used in the film of the first aspect of the invention. When two or more different acyl groups are used, preferably, one of them is an acetyl group, and the acyl group having from 2 to 4 carbon atoms is preferably a propionyl group or a butyryl group. The sum total of the degree of substitution at the 2-positioned, 3-positioned and 6-positioned hydroxyl groups with an acetyl group is represented by DSA; and the sum total of the degree of substitution at the 2-positioned, 3-positioned and 6-positioned hydroxyl groups with a propionyl group or a butyryl group is represented by DSB. Preferably, DSA+DSB is at least 1.0 and less than 2.6. DSB is preferably from 0 to 1.70, more preferably from 0 to 1.2, particularly preferably from 0 to 0.5, more particularly preferably from 0; that is the cellulose acylate is cellulose acetate. Preferably, DSA and DSB are so planned as to fall within the above-mentioned range, as giving a film with little fluctuation in the values Re and Rth thereof in a varying environmental humidity.

Also preferably, at least 28% of DSB is for the substituent of the 6-positioned hydroxyl group, more preferably at least 30% of DSB is for the substituent of the 6-positioned hydroxyl group, even more preferably at least 31% of DSB is for the substituent of the 6-positioned hydroxyl group, still more preferably at least 32% of DSB is for the substituent of the 6-positioned hydroxyl group. For the film of the type, a solution of good solubility can be prepared, and in particular, a good solution in a chlorine-free organic solvent can be produced. In addition, a solution having a low viscosity and having good filterability can be produced.

The acyl group having 2 or more carbon atoms in the cellulose acylate in the first aspect of the invention may be an aliphatic group or an aryl group, and are not particularly limited. They may be an alkylcarbonyl ester of cellulose, an alkenylcarbonyl ester of cellulose, an aromatic carbonyl ester of cellulose or an aromatic alkylcarbonyl ester of cellulose. These esters may have a substituent. Preferable examples of the substituents include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. An acetyl group, a propionyl group, a butanoyl group, a dodecanoyl group, an octadecanoyl group, a tert-butanoyl group, an oleoyl group, a benzoyl group, a naphthylcarbonyl group and a cinnamoyl group are more preferred, and an acetyl group, a propionyl group and a butanoyl group (in case where the acyl group has from 2 to 4 carbon atoms) are particularly preferred, and the most preferred is an acetyl group (in case where the cellulose acylate is a cellulose acetate).

In acylation of cellulose, when an acid anhydride or an acid chloride is used as the acylating agent, the organic solvent as the reaction solvent may be an organic acid, such as acetic acid, or methylene chloride or the like.

When the acylating agent is an acid anhydride, the catalyst is preferably a protic catalyst such as sulfuric acid; and when the acylating agent is an acid chloride (e.g., $CH_3CH_2COCl$), a basic compound may be used as the catalyst.

A most popular industrial production method for a mixed fatty acid ester of cellulose comprising acylating cellulose with a fatty acid corresponding to an acetyl group and other acyl groups (e.g., acetic acid, propionic acid, valeric acid, etc.), or with a mixed organic acid ingredient containing their acid anhydride.

The cellulose acylate for use in the invention can be produced, for example, according to the method described in JP-A 10-45804.

<Other Additives>

The film of the first aspect of the invention may include various kinds of additive other than the acidic compound.

In the invention, widely employable are various high-molecular-weight additives and low-molecular-weight additives known as additives for cellulose acylate films.

The amount of the additive is preferably from 1 to 35% by mass, more preferably from 4 to 30% by mass, even more preferably from 10 to 25% by mass relative to the cellulose acylate. When the amount of the additive is at least 1% by mass, then it could follow the ambient temperature/humidity change; and when at most 35% by mass, then the film may not be whitened, and in addition, the physical properties of the film may be more improved.

The additives in the first aspect of the invention are ingredients to be added to the film of the first aspect of the invention for the purpose of enhancing the functions of the film, which are added in an amount of at least 1% by mass relative to the cellulose resin. Accordingly, impurities and residual solvent and the like are not the additives in the first aspect of the invention.

In the first aspect of the invention, two or more different types of additives may be used as combined. Using two or more different types of additives as combined brings about the advantage of satisfying the effects of enhancing the optical properties, increasing the film elasticity, reducing the film brittleness and enhancing the web handlability.

The additive includes, for example, non-phosphate compounds; mat agents; retardation regulators (retardation enhancers, retardation retardants); plasticizers such as phthalates, phosphates; antiaging agents (antioxidants); UV absorbents; acidic compounds, etc.

Preferred additives for use in the film of the first aspect of the invention are described in detail hereinunder.

(1) Non-Phosphate Compounds:

Preferably, the film of the first aspect of the invention contains a non-phosphate compound from the viewpoint of satisfying both retardation regulation and haze reduction.

In this description, "non-phosphate compounds" mean "ester bond-having compounds in which the acid contributing to the ester bond is not phosphoric acid". Accordingly, the "non-phosphate compounds" mean ester compounds not containing phosphoric acid.

The non-phosphate compounds may be low-molecular compounds or polymers (high-molecular compounds). Non-phosphate polymer compounds (high-molecular compounds) will be hereinafter referred to as non-phosphate polymers.

The non-phosphate compounds for use in the first aspect of the invention are described below.

As the non-phosphate compound, widely employable herein are high molecular agent and low molecular agent known as additives for cellulose acylate films.

The content of the non-phosphate compound in the film of the invention is preferably in an amount of from 0 to 35% by mass, more preferably more preferably in an amount of from 0 to 18% by mass, particularly preferably in an amount of from 0 to 15% by mass, relative to the amount of the cellulose acylate.

The high molecular weight additive for use in the film of the first aspect of the invention as the non-phosphate compound is a compound having repetitive units therein, preferably having a number-average molecular weight of from 700 to 100000. The high molecular weight additive serves to promote the solvent vaporization speed and to reduce the residual solvent amount in a solution casting process. Further, the high molecular weight additive added to the film of the invention is effective from the viewpoint of reforming the film of, for example, enhancing the mechanical properties of the film, imparting flexibility and water absorption resistance to the film and reducing the moisture permeability of the film.

The high molecular weight additive for use in the first aspect of the invention as the non-phosphate compound more preferably has a number-average molecular weight from 700 to 8000, further preferably from 700 to 5000, particularly preferably 1000 to 5000.

Description will be made in detail of the high molecular weight additives used in the first aspect of the invention as the non-phosphate compound with reference to the specific examples. However, the high molecular weight additives used in the first aspect of the invention as the non-phosphate compound are not limited thereto.

Preferably, the non-phosphate compound is preferably a non-phosphate ester compound. In this description, the "non-phosphate ester compound" means "a compound that is an ester not containing phosphoric acid.

The polymer additive of the non-phosphate compound includes polyester polymers (aliphatic polyester polymers, aromatic polyester polymers, etc.), and copolymers of a polyester ingredient and any other ingredient. Preferred are aliphatic polyester polymers, aromatic polyester polymers, copolymers of a polyester polymer (aliphatic polyester polymer, aromatic polyester polymer, etc.) and an acrylic polymer, and copolymers of a polyester polymer (aliphatic polyester polymer, aromatic polyester polymer, etc.) and a styrenic polymer; and more preferred are polyester compounds having an aromatic ring moiety as at least one copolymerization ingredient.

The aliphatic polyester-type polymers is one produced by reaction of a mixture of an aliphatic dicarboxylic acid having from 2 to 20 carbon atoms, and a diol selected from the group consisting of aliphatic diols having from 2 to 12 carbon atoms and alkyl ether diols having from 4 to 20 carbon atoms. Both ends of the reaction product maybe as such, or may be blocked by further reaction with monocarboxylic acids, monoalcohols or phenols. The terminal blocking maybe effected for the reason that the absence of a free carboxylic acid in the plasticizer is effective for the storability of the plasticizer. The dicarboxylic acid for the polyester plasticizer for use in the first aspect of the invention is preferably an aliphatic dicarboxylic having from 4 to 20 carbon atoms, or an aromatic dicarboxylic acid having from 8 to 20 carbon atoms.

The aliphatic dicarboxylic acids having from 2 to 20 carbon atoms preferably used in the first aspect of the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. Particularly preferred aliphatic dicarboxylic acids are succinic acid, glutaric acid and adipic acid.

The diol used for the high molecular weight agent are selected, for example, from aliphatic diols having from 2 to 20 carbon atoms and alkyl ether diols having from 4 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

In the first aspect of the invention, especially preferred is a high molecular weight agent of which the terminal is blocked with an alkyl group or an aromatic group. The terminal protection with a hydrophobic functional group is effective against aging at high temperature and high humidity, by which the hydrolysis of the ester group is retarded.

Preferably, the high molecular weight agent is protected with a monoalcohol residue or a monocarboxylic acid residue in order that both ends of the high molecular weight agent are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the first aspect of the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol and benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, p-tert-amylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high molecular weight agent may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The compounds having a positive birefringence are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

The aromatic polyester-type polymers are those produced by copolymerization of the polyester polymer and a monomer having an aromatic ring. The monomer having an aromatic ring is preferably at least one monomer selected from an aromatic dicarboxylic acid having from 8 to 20 carbon atoms and an aromatic diol having from 6 to 20 carbon atoms.

The aromatic dicarboxylic acids having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, etc. More preferred aromatic dicarboxylic acids in these are phthalic acid, terephthalic acid and isophthalic acid.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

For the aromatic polyester polymer, in this invention, combined is the above-mentioned polyester and at least one of aromatic dicarboxylic acids and aromatic diols, in which the combination mode is not specifically defined. Different types of the ingredients may be combined in any desired mode. In the first aspect of the invention, especially preferred is the polymer additive terminated with an alkyl group or an aromatic group, as described above. For the termination, employable is the above-mentioned method.

Specific examples of the polyester-type polymer usable in the first aspect of the invention are shown below; however, the polyester-type polymer for use in the first aspect of the invention should not be limited to these.

TABLE 1

|  | Dicarboxylic Acid | | | Diol | | | Number |
| --- | --- | --- | --- | --- | --- | --- | --- |
|  | Aromatic Dicarboxylic Acid | Aliphatic Dicarboxylic Acid | Ratio of Dicarboxylic Acid (mol %) | Aliphatic Diol | Ratio of Diol (mol %) | Terminal | Average Molecular Weight |
| P-1 | — | AA | 100 | ethane diol | 100 | hydroxyl group | 1000 |
| P-2 | — | AA | 100 | ethane diol | 100 | hydroxyl group | 2000 |
| P-3 | — | AA | 100 | propane diol | 100 | hydroxyl group | 2000 |
| P-4 | — | AA | 100 | butane diol | 100 | hydroxyl group | 2000 |
| P-5 | — | AA | 100 | hexane diol | 100 | hydroxyl group | 2000 |
| P-6 | — | AA/SA | 60/40 | ethane diol | 100 | hydroxyl group | 900 |
| P-7 | — | AA/SA | 60/40 | ethane diol | 100 | hydroxyl group | 1500 |
| P-8 | — | AA/SA | 60/40 | ethane diol | 100 | hydroxyl group | 1800 |
| P-9 | — | SA | 100 | ethane diol | 100 | hydroxyl group | 1500 |
| P-10 | — | SA | 100 | ethane diol | 100 | hydroxyl group | 2300 |
| P-11 | — | SA | 100 | ethane diol | 100 | hydroxyl group | 6000 |
| P-12 | — | SA | 100 | ethane diol | 100 | hydroxyl group | 1000 |
| P-13 | PA | SA | 50/50 | ethane diol | 100 | hydroxyl group | 1000 |
| P-14 | PA | SA | 50/50 | ethane diol | 100 | hydroxyl group | 1800 |
| P-15 | PA | AA | 50/50 | ethane diol | 100 | hydroxyl group | 2300 |
| P-16 | PA | SA/AA | 40/30/30 | ethane diol | 100 | hydroxyl group | 1000 |
| P-17 | PA | SA/AA | 50/20/30 | ethane diol | 100 | hydroxyl group | 1500 |
| P-18 | PA | SA/AA | 50/30/20 | ethane diol | 100 | hydroxyl group | 2600 |
| P-19 | TPA | SA | 50/50 | ethane diol | 100 | hydroxyl group | 1000 |
| P-20 | TPA | SA | 50/50 | ethane diol | 100 | hydroxyl group | 1200 |

TABLE 1-continued

| | Dicarboxylic Acid | | | Diol | | | Number |
|---|---|---|---|---|---|---|---|
| | Aromatic Dicarboxylic Acid | Aliphatic Dicarboxylic Acid | Ratio of Dicarboxylic Acid (mol %) | Aliphatic Diol | Ratio of Diol (mol %) | Terminal | Average Molecular Weight |
| P-21 | TPA | AA | 50/50 | ethane diol | 100 | hydroxyl group | 2100 |
| P-22 | TPA | SA/AA | 40/30/30 | ethane diol | 100 | hydroxyl group | 1000 |
| P-23 | TPA | SA/AA | 50/20/30 | ethane diol | 100 | hydroxyl group | 1500 |
| P-24 | TPA | SA/AA | 50/30/20 | ethane diol | 100 | hydroxyl group | 2100 |
| P-25 | PA/TPA | AA | 15/35/50 | ethane diol | 100 | hydroxyl group | 1000 |
| P-26 | PA/TPA | AA | 20/30/50 | ethane diol | 100 | hydroxyl group | 1000 |
| P-27 | PA/TPA | SA/AA | 15/35/20/30 | ethane diol | 100 | hydroxyl group | 1000 |
| P-28 | PA/TPA | SA/AA | 20/30/20/30 | ethane diol | 100 | hydroxyl group | 1000 |
| P-29 | PA/TPA | SA/AA | 10/50/30/10 | ethane diol | 100 | hydroxyl group | 1000 |
| P-30 | PA/TPA | SA/AA | 5/45/30/20 | ethane diol | 100 | hydroxyl group | 1000 |
| P-31 | — | AA | 100 | ethane diol | 100 | acetyl ester residue | 1000 |
| P-32 | — | AA | 100 | ethane diol | 100 | acetyl ester residue | 2000 |
| P-33 | — | AA | 100 | propane diol | 100 | acetyl ester residue | 2000 |
| P-34 | — | AA | 100 | butane diol | 100 | acetyl ester residue | 2000 |
| P-35 | — | AA | 100 | hexane diol | 100 | acetyl ester residue | 2000 |
| P-36 | — | AA/SA | 60/40 | ethane diol | 100 | acetyl ester residue | 900 |

TABLE 2

| | Dicarboxylic Acid | | | Diol | | | Number |
|---|---|---|---|---|---|---|---|
| | Aromatic Dicarboxylic Acid | Aliphatic Dicarboxylic Acid | Ratio of Dicarboxylic Acid (mol %) | Aliphatic Diol | Ratio of Diol (mol %) | Terminal | Average Molecular Weight |
| P-37 | — | AA/SA | 60/40 | ethane diol | 100 | acetyl ester residue | 1000 |
| P-38 | — | AA/SA | 60/40 | ethane diol | 100 | acetyl ester residue | 2000 |
| P-39 | — | SA | 100 | ethane diol | 100 | acetyl ester residue | 1000 |
| P-40 | — | SA | 100 | ethane diol | 100 | acetyl ester residue | 3000 |
| P-41 | — | SA | 100 | ethane diol | 100 | acetyl ester residue | 5500 |
| P-42 | — | SA | 100 | ethane diol | 100 | acetyl ester residue | 1000 |
| P-43 | PA | SA | 50/50 | ethane diol | 100 | acetyl ester residue | 1000 |
| P-44 | PA | SA | 50/50 | ethane diol | 100 | acetyl ester residue | 1500 |
| P-45 | PA | AA | 50/50 | ethane diol | 100 | acetyl ester residue | 2000 |
| P-46 | PA | SA/AA | 40/30/30 | ethane diol | 100 | acetyl ester residue | 1000 |
| P-47 | PA | SA/AA | 33/33/34 | ethane diol | 100 | benzoic acid | 1000 |
| P-48 | PA | SA/AA | 50/20/30 | ethane diol | 100 | acetyl ester residue | 1500 |
| P-49 | PA | SA/AA | 50/30/20 | ethane diol | 100 | acetyl ester residue | 2000 |
| P-50 | TPA | SA | 50/50 | ethane diol | 100 | acetyl ester residue | 1000 |
| P-51 | TPA | SA | 50/50 | ethane diol | 100 | acetyl ester residue | 1500 |
| P-52 | TPA | SA | 45/55 | ethane diol | 100 | acetyl ester residue | 1000 |
| P-53 | TPA | AA | 50/50 | ethane diol | 100 | acetyl ester residue | 2200 |
| P-54 | TPA | SA | 35/65 | ethane diol | 100 | acetyl ester residue | 1000 |
| P-55 | TPA | SA/AA | 40/30/30 | ethane diol | 100 | acetyl ester residue | 1000 |
| P-56 | TPA | SA/AA | 50/20/30 | ethane diol | 100 | acetyl ester residue | 1500 |
| P-57 | TPA | SA/AA | 50/30/20 | ethane diol | 100 | acetyl ester residue | 2000 |
| P-58 | TPA | SA/AA | 20/20/60 | ethane diol | 100 | acetyl ester residue | 1000 |
| P-59 | PA/TPA | AA | 15/35/50 | ethane diol | 100 | acetyl ester residue | 1000 |
| P-60 | PA/TPA | AA | 25/25/50 | ethane diol | 100 | acetyl ester residue | 1000 |
| P-61 | PA/TPA | SA/AA | 15/35/20/30 | ethane diol | 100 | acetyl ester residue | 1000 |
| P-62 | PA/TPA | SA/AA | 20/30/20/30 | ethane diol | 100 | acetyl ester residue | 1000 |
| P-63 | PA/TPA | SA/AA | 10/50/30/10 | ethane diol | 100 | acetyl ester residue | 1000 |
| P-64 | PA/TPA | SA/AA | 5/45/30/20 | ethane diol | 100 | acetyl ester residue | 1000 |
| P-65 | PA/TPA | SA/AA | 5/45/20/30 | ethane diol | 100 | acetyl ester residue | 1000 |
| P-66 | IPA | AA/SA | 20/40/40 | ethane diol | 100 | acetyl ester residue | 1000 |
| P-67 | 2,6-NPA | AA/SA | 20/40/40 | ethane diol | 100 | acetyl ester residue | 1200 |
| P-68 | 1,5-NPA | AA/SA | 20/40/40 | ethane diol | 100 | acetyl ester residue | 1200 |
| P-69 | 1,4-NPA | AA/SA | 20/40/40 | ethane diol | 100 | acetyl ester residue | 1200 |
| P-70 | 1,8-NPA | AA/SA | 20/40/40 | ethane diol | 100 | acetyl ester residue | 1200 |
| P-71 | 2,8-NPA | AA/SA | 20/40/40 | ethane diol | 100 | acetyl ester residue | 1200 |

In Table 1 and Table 2, PA means phthalic acid, TPA means terephthalic acid, IPA means isophthalic acid, AA means adipic acid, SA means succinic acid, 2,6-NPA means 2,6-naphthalenedicarboxylic acid, 2,8-NPA means 2,8-naphthalenedicarboxylic acid, 1,5-NPA means 1,5-naphthalenedicarboxylic acid, 1,4-NPA means 1,4-naphthalenedicarboxylic acid, 1,8-NPA means 1,8-naphthalenedicarboxylic acid.

(2) Matting Agent

Matting agent is preferably added to the film of the first aspect of the invention from the viewpoint of film slide property and stable manufacture. The matting agent may be a matting agent of an inorganic compound or a matting agent of an organic compound.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 18, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called direct addition method, in which the ingredients may be on-line mixed by screw kneading. Concretely, preferred is a static mixer such as an in-line mixer. As the in-line mixer, for example, preferred is a static mixer, SWJ (Toray's static tubular mixer, Hi-Mixer, by Toray Engineering). Regarding the mode of in-line addition, JP-A 2003-053752 describes an invention of a method for producing a cellulose acylate film wherein, for the purpose of preventing concentration unevenness and particle aggregation, the distance L between the nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A2003-014933 discloses an invention of providing a retardation film which is free from a trouble of additive bleeding and a trouble of interlayer peeling and which has good lubricity and excellent transparency; and regarding the method of adding additives to the film, the patent reference says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

(3) Retardation Enhancer

The film of the invention, at least one retardation enhancer is preferably added to the low substitution layer of the film for making the film have a preferable retardation. Not specifically defined, the retardation enhancer includes rod-shaped compounds, discotic compounds and the non-phosphate ester compounds in which show retardation expression. Of the rod-shaped or discotic compounds, those having at least two aromatic groups are preferred for use as the retardation enhancer in the invention.

(4) Plasticizer

Many compounds known as a plasticizer for the cellulose acylate may be used for the invention as the plasticizer. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates include butyl oleate, methylacetyl ricinoleate, dibutyl sebacate, and various trimellitates. Preferred for use herein are phthalate plasticizers (DMP, DEP, DBP, DOP, DPP, DEHP). More preferred are DEP and DPP.

<Method for Producing Protective Film to Polarizer>

Not specifically defined, the method for producing the protective film to a polarizer of the first aspect of the invention may be any known method not contradictory to the scope and the sprit of the first aspect of the invention. For example, a solution containing the above-mentioned cellulose acylate and preferably the above-mentioned acidic compound may be formed into a film. On the other hand, in case where the acidic compound is not used, the film may be produced according to the above-mentioned method of washing the formed film with water.

The film formation method is not also specifically defined so far as it is not contradictory to the scope and the sprit of the first aspect the invention. For example, the film may be formed according to a solution casting method (solvent casting method) or a melt casting method. Especially preferred is the solvent casting method. In the solvent casting method, a solution (dope) prepared by dissolving cellulose acylate in an organic solvent is used to produce films. In the first aspect of the invention, the timing that the acidic compound is added to the cellulose acylate solution is not specifically defined. For example, it may be added at the composition time of a cellulose acylate, and may be added with a cellulose acylate at the time of dope preparation.

The amount of cellulose acylate is preferably so controlled that it may be in the dope in an amount of from 10% to 40% by mass. More preferably, the amount of cellulose acylate is from 10% to 30% by mass.

In the first aspect of the invention, a well-known solvent for solution casting can be used as a solvent of a dope. It is desirable that the dope preferably contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms. The ethers, ketones and esters may have acyclic structure. In addition, compounds having two or more functional groups (e.g., —O—, —CO— and —COO—) of the ethers, ketones and esters may also be used as the organic solvent. The organic solvent may have any other functional group such as an alcoholic hydroxyl group. When the organic solvent has two or more functional groups, then it is desirable that the number of the carbon atoms constituting the solvent is within the above-mentioned preferred range of the solvent having either one of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvents having two or more functional groups include 2-ethoxyethyl acetate, 2-methoxyethanol and 2-butoxyethanol.

The number of the carbon atoms constituting the halogenohydrocarbon is preferably 1 or 2, more preferably 1. The halogen of the halogenohydrocarbon is preferably chlorine. The ratio in which the hydrogen atom of the halogenohydrocarbon is substituted with halogen is preferably from 25 to 75 mol %, more preferably from 30 to 70 mol %, even more preferably 35 to 65 mol %, most preferably from 40 to 60 mol %. Methylene chloride is the most typical halogenohydrocarbon for use herein. Examples of halogenohydrocarbons include dichloromethane, chloroform, methyl chloride, carbon tetrachloride, trichloroacetic acid, methyl bromide, methyl iodide, tri(tetra)chloroethylene, etc. Preferably, the halogenohydrocarbon contains at least dichloromethane.

In the first aspect of the invention, preferably, the solvent contains a poor solvent in a ratio of from 3 to 30% by mass, more preferably in a ratio of from 5 to 20% by mass. Containing a poor solvent in the ratio falling within the above range, the miscibility of the solvent with cellulose acylate may increase and the haze of the film to be produced tends to decrease favorably.

Preferably, the boiling point of the poor solvent is not higher than 120° C., more preferably from 40 to 100° C. When the boiling point is not higher than 120° C., the solvent drying speed can be increased favorably.

Preferred examples of the poor solvent of the type include methanol, ethanol, propanol, butanol and water; and methanol is more preferred.

The cellulose acylate solution (dope) maybe prepared in an ordinary method where it is processed at a temperature not lower than 0° C. (room temperature or high temperature). For preparing the cellulose acylate solution, herein employable are a method and an apparatus for dope preparation in an ordinary solution casting method. The cellulose acylate solution may be prepared by stirring cellulose acylate and an organic solvent at room temperature (e.g., 0 to 40° C.). A high-concentration solution may be stirred under pressure and under heat. Concretely, cellulose acylate and an organic solvent are put into a pressure chamber, sealed up, and heated with stirring under pressure at a temperature not lower than the boiling point of the solvent at atmospheric pressure but up to a temperature at which the solvent does not boil. The heating temperature is preferably 40° C. or higher, more preferably from 60 to 200° C., even more preferably from 80 to 110° C.

The constitutive components may be previously roughly mixed before put into a chamber. They may be put thereinto one after another. The chamber must be so designed that it allows stirring therein. An inert gas such as nitrogen gas may be introduced into the chamber for pressure application thereto. If desired, the solvent in the chamber may be heated so as to increase the vapor pressure therein for pressure application. After the chamber has been sealed up, the constitutive components may be introduced thereinto under pressure.

When it is heated, the chamber is preferably heated from the outside. For example, a jacket-type heater may be used. A plate heater may be disposed outside the chamber, and a liquid may be circulated through a pipe line around it so as to heat the whole of the chamber.

Preferably, a stirring blade is provided inside the chamber, with which the stirring may be attained. Regarding the length thereof, it is desirable that the stirring blade may reach around the wall of the chamber. Also preferably, a scraper is fitted to the tip of the stirring blade, for the purpose of renewing the liquid film on the wall of the chamber.

The chamber may be equipped with instruments such as a pressure gauge and a thermometer. In the chamber, the constitutive components are dissolved in a solvent. The thus-prepared dope is taken out of the chamber after cooled, or after taken out, it is cooled with a heat exchanger or the like.

The cellulose acylate solution may also be prepared according to a cooling dissolution method.

(Film Forming)

It is preferable that a cellulose acylate film is produced by the solvent casting method from the prepared dope in the first aspect of the invention.

The method and equipment for producing the film of the first aspect of the invention are the same as the solution casting film forming method and equipment for the solution casting film forming conventionally used for the cellulose triacetate film manufacture. A dope (cellulose acylate solution) prepared in a dissolution machine (pot) is once stored in a storage pot, and after defoaming of bubbles contained in the dope, the dope is subjected to final preparation. Then, the dope is discharged from a dope exhaust and fed into a pressure die via, for example, a pressure constant-rate gear pump capable of feeding the dope at a constant flow rate at a high accuracy depending upon a rotational rate; the dope is uniformly cast from a nozzle (slit) of the pressure die onto a metallic support continuously running in an endless manner in the casting section; and at the peeling point where the metallic support has substantially rounded in one cycle, the half-dried dope film (also called a web) is peeled away from the metallic support. The obtained web is clipped at both ends and dried by conveying with a tenter while keeping a width. Subsequently, the obtained film is mechanically conveyed with a group of rolls in a dryer to terminate the drying and then wound in a roll form with a winder in a prescribed length. A combination of the tenter and the dryer of a group of rolls vary depending upon the purpose. In the solution casting film formation for the film formation of a functional protective film for electrical display device, in addition to a solution casting film forming apparatus, a coating apparatus is often added for the purpose of subjecting a coating layer such as a subbing layer, an antistatic layer, an anti-halation layer and a protective layer to coating and formation (coating processing) on the surface of the film. Herein after describes each producing process, but the invention is not defined by them.

Preferably, the prepared dope is cast onto an endless metal support, for example, a metal drum or a metal support (band or belt), and the solvent is evaporated away to form a film on the support. Before cast, the dope is preferably so controlled that the cellulose amount therein could be from 10 to 35% by mass. Preferably, the surface of the drum or the band is mirror-finished. The casting and drying method in a solvent casting method is described in U.S. Pat. Nos. 2,336,310, 2,367,603, 2,492,078, 2,492,977, 2,492,978, 2,607,704, 2,739,069, 2,739,070; BP 640731, 736892; JP-B-45-4554, 49-5614; JP-A-60-176834, 60-203430, 62-115035.

In addition, the cellulose acylate film formation technology described in JP-A-2000-301555, 2000-301558, 7-032391, 3-193316, 5-086212, 62-037113, 2-276607, 55-014201, 2-111511 and 2-208650 is also applicable to the first aspect of the invention.

Preferably, the dope is cast on a drum or a band having a surface temperature of not higher than 30° C.; and especially preferably, the metal support temperature is from −50 to 20° C. Preferably, the film is dried through exposure to air for at least 2 seconds after cast. The formed film is peeled away from the drum or the band, and then dried with high-temperature air of which the temperature is successively changed to be from 100° C. to 160° C. to thereby remove the residual solvent through evaporation. The method is described in JP-B-5-17844. According to the method, the time from casting to peeling may be shortened. For carrying out the method, the dope must gel at the surface temperature of the drum or the band in casting thereon.

(Washing of Casting Support)

In producing the protective film to a polarizer of the first aspect of the invention, an acidic compound is preferably used as the method of controlling the pH of the film. In this case, the acidic compound may be the same as that mentioned above. In case where an acidic compound that may corrode the casting support (preferably made of SUS) is used, preferably, the film formation is attained while the casting support is washed, from the viewpoint of preventing the casting support (metal support) from being corroded.

The washing method for the casting support is not specifically defined.

(Drying)

A method of drying the web that is dried on a drum or belt and is peeled away from it is described hereinafter. The web peeled away at the peeling position just before one lap of the drum or the belt is preferably conveyed according to a method where the web is led to pass alternately through rolls disposed like a houndstooth check, or according to a method where the peeled web is conveyed in a non-contact mode while both sides of the web are held by clips or the like. The drying may be attained according to a method where air at a predetermined temperature is given to both surfaces of the web (film) being conveyed, or according to a method of using a heating means such as microwaves, etc. Rapid drying may damage the surface smoothness of the formed film. Therefore, in the initial stage of drying, the web is dried at a temperature at which the solvent does not bubble, and after having gone on in some degree, the drying may be preferably attained at a high temperature. In the drying after peeled away from the support, the film tends to shrink in the machine direction or in the cross direction owing to solvent evaporation. The shrinkage may be larger in drying at a higher temperature. Preferably, the shrinkage is inhibited as much as possible for bettering the surface condition of the film to be formed. From this viewpoint, for example, preferred is a method (tenter method) where the entire drying or a part of the drying is carried out with both sides of the web held with clips or pins so as to keep the width of the web, as in JP-A 62-46625. The drying temperature in the drying is preferably from 100 to 145° C. The drying temperature, the drying air amount and the drying time may vary depending on the solvent used, and are therefore suitably selected in accordance with the type and the combination of the solvent to be used.

(Stretching)

It is preferable that the film peeled from a support is stretched while the residual solvent amount in the film is less than 120% by mass.

The residual solvent amount may be represented as follows:

$$\text{Residual Solvent Amount (\% by mass)} = \{(M-N)/N\} \times 100.$$

In this, M means the mass of the web at any time, N means the mass of the web of which M is measured and which is dried at 110° C. for 3 hours. When the residual solvent amount in the web is too much, the film could hardly enjoy the stretching effect, and therefore, the residual solvent amount in the film being stretched is more preferably from 10% by mass to 50% by mass, even more preferably from 12% by mass to 30% by mass. In case where the draw ratio in stretching is too small, the stretched film could not have sufficient retardation Re and Rth; but when too large, the stretching may be difficult and the film being stretched may be cut or broken.

The film is effectively stretched in two axial directions perpendicular to each other for the purpose of controlling Nx, Ny and Nz of the stretched film to fall within the range of the first aspect of the invention. For example, when the film is stretched in the casting direction and when the shrinkage in the cross direction of the stretched film is too large, and then the value Nz of the film may be large. In this case, the lateral shrinkage of the film is prevented or the film is stretched also in the cross direction, and the film is thereby improved. In case where the film is stretched in the cross direction, the refractive index of the film may have a distribution in the cross direction. This is often seen in a case of using a tenter method for film stretching. As stretched in the cross direction, the center of the film is shrunk while the sides thereof are fixed, and this may be a so-called bowing phenomenon. Even in this case, the bowing phenomenon may be prevented by stretching the film in the casting direction, and therefore the retardation distribution in the cross direction can be reduced. Further, the thickness fluctuation to occur in stretching the film in two axial directions perpendicular to each other can be reduced. In case where the thickness fluctuation of an optical film is too large, then the retardation of the film may be uneven. The thickness fluctuation of the stretched film is preferably within a range of ±3%, more preferably within a range of ±1%. In the object as above, the method of stretching the film in two axial directions perpendicular to each other is effective, and the draw ratio in stretching in two axial directions perpendicular to each other is preferably from 1.2 to 2.0 times each, more preferably from 0.7 to 1.0 time each. The stretching at a ratio of from 1.2 to 2.0 times in one direction and at a ratio of from 0.7 to 1.0 time in the other perpendicular direction means that the distance between the clips or pins to support the film is controlled to fall within a range of from 0.7 to 1.0 times relative to the distance therebetween of the film before stretching.

In general, in case where the film is stretched in the cross direction by 1.2 to 2.0 times, using a biaxial stretching tenter, a shrinking force acts on the perpendicular direction thereof, or that is, on the machine direction of the film.

Accordingly, when the film is stretched while a force is kept applied only in one direction, then the width of the film in the other direction perpendicular to that one direction may shrink. The method means that the shrinking degree is controlled without control of the width of the film, or that is, this means that the distance between the clips or the pins for width control is defined to be from 0.7 to 1.0 time the distance therebetween before stretching. In this case, a force of shrinking the film in the machine direction acts on the film owing to the stretching in the cross direction. The distance kept between the clips or the pins in the machine direction makes it possible to prevent any unnecessary tension from being given to the film in the machine direction thereof. The method of stretching the web is not specifically defined. For example, there are mentioned a method of providing plural rolls each running at a different peripheral speed and stretching the film in the machine direction based on the peripheral speed difference between the rolls, a method of holding both sides of the web with clips or pins and expanding the distance between the clips or pins in the machine direction to thereby stretch the film in the machine direction, or expanding the distance therebetween in the cross direction to thereby stretch the film in the cross direction, and a method of expanding the distance both in the machine direction and in the cross direction to thereby stretch film in both the machine and cross directions. Needless-to-say, these methods may be combined. In the so-called tenter method, preferably, the clip parts are driven according to a linear driving system, by which the film may be smoothly stretched with little risk of breaking, etc.

(Saponification Treatment)

Alkali saponification of the protective film to a polarizer of the first aspect of the invention enhances the adhesiveness of the film to the material of polarizing element such as polyvinyl alcohol. Preferably, the film of the first aspect of the invention is further saponified after formed. Also preferably, after the film is saponified and before stuck to a polarizing element, the film surface pH is made to fall within the range of the first aspect of the invention.

The method of saponification is described in detail in the section of the polarizer production method.

[Polarizer]

The polarizer of the first aspect of the invention comprising a polarizing element and at least one protective film to a polarizer of the first aspect of the invention.

More preferably, in the polarizer of the first aspect of the invention, the protective film to a polarizer of the first aspect of the invention is laminated only on one surface of the polarizing element from the viewpoint of easily controlling the optical characteristic values of the polarizer.

The polarizing element may be any known one, and for example, a hydrophilic polymer film such as a polyvinyl alcohol film may be processed with a dichroic dye such as iodine and then stretched to prepare the polarizing element.

(Properties of Polarizer)

The polarizer comprising the film of the first aspect of the invention degrades little in high-temperature and high-humidity environments and can stably maintain its properties for a long period of time.

For the cross-transmittance, CT of the polarizer, the polarizer durability test may be carried out in two different modes of (1) the polarizer alone and (2) the polarizer attached to a glass sheet via an adhesive. In the case (1) of the polarizer alone, the protective film to a polarizer of the invention is sandwiched between two polarizing elements, and two of the same combinations are prepared, and these are set to be perpendicular to each other. In the case of (2) of the polarizer attached to a glass sheet via an adhesive, the polarizer is stuck to a glass sheet in such a manner that the protective film to a polarizer of the invention could face the glass sheet, and two of the same sample (about 5 cm×5 cm) are prepared. In measurement of the single plate cross-transmittance, the sample is set before a light source in such a manner that the film side of the sample could face the light source. Two samples are analyzed, and the data are averaged to give the single plate cross-transmittance. In Examples of the first aspect of the invention, the test method (2) of the above-mentioned methods (1) and (2) was employed.

[Method for Producing Polarizer]

A method for producing the polarizer of the first aspect of the invention is described below.

The production method for the polarizer of the first aspect of the invention is not specifically defined, for which any known method is employable.

The saponification method is not also specifically defined. For example, the method is described in [0211] and of JP-A-2007-86748; and the method of preparing the polarizing element for the polarizer and the optical properties of the polarizer are described in [0213] to [0255] of the patent reference; and based on these descriptions, a polarizer comprising the film of the first aspect of the invention as the protective film may be produced.

For example, the protective film to a polarizer of the first aspect of the invention may be alkali-saponified generally by a cycle method of dipping the film surface in an alkali solution, then neutralizing it with an acidic solution, washing it with water and drying it; however, the first aspect of the invention is not limited to the embodiment. Specifically, after alkali-saponified, the protective film to a polarizer of the first aspect of the invention may be neutralized with an acidic solution, or after neutralized with an acidic solution, the film may be washed with water, or not neutralized with an acidic solution, the film may be washed with water to remove the alkali, and then treated with an acidic solution. In this description, in case where the film surface pH is controlled by washing with water, the case includes an embodiment where the alkali is removed only by washing with water but not by neutralization with an acidic solution, and thereafter the processed film is led to pass through an acidic solution.

From the viewpoint that the saponified film is controlled to have the film surface pH after the treatment of washing with water, preferred is an embodiment where the alkali solution is removed by washing alone and then the film is led to pass through an aqueous acidic solution of 0.01 to 4.0 N hydrochloric acid, nitric acid, sulfuric acid, acetic acid, chloroacetic acid, oxalic acid or the like.

The alkali solution includes a potassium hydroxide solution and a sodium hydroxide solution. Preferably, the hydroxide ion concentration in the solution is within a range of from 0.1 to 5.0 mol/L, more preferably from 0.5 to 4.0 mol/L. Preferably, the temperature of the alkali solution is within a range of from room temperature to 90° C., more preferably from 40 to 70° C.

Above all, the production method for the polarizer of the first aspect of the invention preferably comprising alkali-saponifying the protective film to a polarizer of the first aspect of the invention, washing the alkali-saponified protective film to a polarizer with water, and laminating the water-washed protective film to a polarizer on at least one surface of a polarizing element. In particular, in case where the protective film to a polarizer of the first aspect of the invention does not contain the above-mentioned acidic compound at the time before the alkali saponification treatment thereof, the production method preferably includes washing the alkali-saponified protective film to a polarizer with water, and more preferably includes washing with water only with no neutralization with an acidic solution.

The method of laminating the protective film to a polarizer of the first aspect of the invention and the above-mentioned polarizing element is not specifically defined. Preferably, the saponified protective film to a polarizer of the first aspect of the invention is stuck to the polarizing element with an adhesive. Not specifically defined, the adhesive maybe an aqueous solution of a water-soluble polymer. As the water-soluble polymer adhesive, preferred is an aqueous solution of a completely-saponified polyvinyl alcohol.

More preferably, in the production method for the polarizer of the first aspect of the invention, the water-washed protective film to a polarizer is laminated on both surfaces of the polarizing element.

[Liquid Crystal Display Device]

The liquid crystal display device of the first aspect of the invention comprising the protective film to a polarizer of the first aspect of the invention or the polarizer of the first aspect of the invention. The liquid crystal display device of the first aspect of the invention degrades little in high-temperature and high-humidity environments and can keep the stable properties thereof for a long period of time.

The liquid crystal display device of the first aspect of the invention may contain one or two polarizers of the first aspect of the invention.

In the liquid crystal display device of the first aspect of the invention, the polarizer of the first aspect of the invention may have the protective film to a polarizer of the first aspect of the invention only on one surface thereof or on both surfaces thereof.

Above all, in the liquid crystal display device of the first aspect of the invention, the polarizer of the first aspect of the invention has the protective film to a polarizer of the first aspect of the invention only on one surface of the polarizing element therein, from the viewpoint that the optical characteristic values of the polarizer can be easily controlled, though not adhering to any theory.

In case where the polarizing element has the protective film to a polarizer of the first aspect of the invention only on one surface thereof, preferably, the film is the protective film on the glass side (between the liquid crystal cell and the polarizing element). The protective film to a polarizer on the other surface of the polarizing element, preferably the protective film on the air side (on the side of the polarizing element opposite to the liquid crystal cell side thereof) may be a known film with no specific limitation thereon not contradictory to the scope and the sprit of the first aspect of the invention. For example, employable are Fujitac TD80UF (by FUJI-FILM), and films described in JP-A-2006-58322, 2009-122664, 2009-299075.

Among them, preferred is use of Fujitac TD8OUF from the viewpoint of the optical uniformity thereof.

FIG. 1 is a schematic view showing an example of the liquid crystal display device according to the invention. In FIG. 1, a liquid crystal display device 10 has a liquid crystal cell containing a liquid crystal layer 5, and an upper electrode substrate 4 and a lower electrode substrate 6 disposed thereon, and has an upper polarizer 1 and a lower polarizer 8 disposed on the both sides of the liquid crystal cells. A color filter may be disposed between the liquid crystal cell and the polarizing films. When the liquid crystal display device 10 is a transmission type device, a backlight using a light source such as a cold or hot cathode fluorescent tube, a light emitting diode, a field emission device, or an electroluminescent device is disposed on the back side.

The upper and lower polarizers 1 and 8 are each composed of a polarizer sandwiched between two protective films. In the liquid crystal display device 10 of the first aspect of the invention, at least one of the protective films facing the cell in one of the polarizer preferably has the protective film to a polarizer of the first aspect of the invention. In the liquid crystal display device 10 of the invention, a transparent protective film, a polarizer, and the protective film to a polarizer of the first aspect of the invention are preferably stacked in this order from the outside of the device (from the side farther from the liquid crystal cell).

The liquid crystal display device 10 may be a direct view type, projection type, or optical modulation type display. The invention is particularly efficiently applied to active matrix liquid crystal display devices using 3- or 2-terminal semiconductor elements such as TFT and MIM. The first aspect of the invention may be efficiently applied also to passive matrix liquid crystal display devices as represented by STN mode, which is so-called time division operation.

The liquid crystal display device of the first aspect of the invention preferably has a VA mode liquid crystal cell.

In the case of the VA mode, a liquid crystal having $\Delta n$ of about 0.0813 and $\Delta \epsilon$ of negative value −4.6 is enclosed between the upper and lower substrates. The alignment of the liquid crystal can be controlled by rubbing, and the director representing the alignment direction of the liquid crystal molecules, the tilt angle, is preferably about 89°. In the FIG. 1, the thickness d of the liquid crystal layer 5 is 3.5 μm. The brightness at the white display depends on the product of the thickness d and the refractive index anisotropy $\Delta n$. Thus the thickness of the liquid crystal layer is controlled in a range of 0.2 to 0.5 μm to obtain a maximum brightness.

The absorption axis 2 of the upper polarizer 1 in the liquid crystal cell is approximately perpendicular to the absorption axis 9 of the lower polarizer 8. A transparent electrode (not shown) is formed on the inner surface of the alignment film disposed on each of the upper and lower electrode substrates 3 and 6. In the non-driving state where a driving voltage is not applied to the electrodes, the liquid crystal molecules in the liquid crystal layer 5 are aligned approximately perpendicular to the substrate, so that the polarization state of a light that passes through the liquid crystal panel is hardly changed. Thus, the liquid crystal display device shows ideal black display in the non-driving state. On the other hand, in the driving state, the liquid crystal molecules are aligned approximately parallel to the substrate, so that the polarization state of the light that passes through the liquid crystal panel is changed by the tilted liquid crystal molecules. Thus, the liquid crystal display device shows white display in the driving state. In addition, in the FIG. 1, 4 and 7 denote alignment control direction of upper and lower substrate.

An electric field is applied to the upper and lower substrates, whereby the used liquid crystal material has a negative dielectric anisotropy and is such that the liquid crystal molecules are aligned perpendicularly to the electric field direction. In a case where an electrode is placed on one substrate, and an electric field is applied in the longitudinal direction parallel to the substrate, the liquid crystal material having a positive dielectric anisotropy is used.

In the VA mode liquid crystal display device, A chiral agent, which is commonly used for TN mode liquid crystal display devices, is not often used because it deteriorates the dynamic response characteristic. A chiral agent may be added to reduce alignment defects in some cases.

The VA mode is characterized by high-speed response and high contrast. However, the contrast is lowered in the oblique direction though it is high at the front. The liquid crystal molecules are aligned perpendicular to the substrate surface at the time of black level. When the display is observed at the front, the transmittance is low and the contrast is high because the liquid crystal molecules have little birefringence. However, when the display is observed from an oblique direction, the liquid crystal molecules show a birefringence. The angle between the absorption axes of the upper and lower polarizers is more than 90° from an oblique direction, though it is 90° at the front. By the two factors, light leakage is caused and the contrast is reduced in the oblique direction. An optical compensatory sheet is added to solve the problem.

Further, the liquid crystal molecules are tilted at the time of white level, and in the tilted direction and the opposite direction, the birefringences of the liquid crystal molecules are different from the oblique direction, resulting in different brightness and color hue. To solve the problem, one pixel of the liquid crystal display device is divided into a plurality of domains to form a multidomain structure.
(Multidomain)

For example, in the VA mode, when an electric field is applied to the liquid crystal molecules, the molecules are tilted in different domains in one pixel, thereby averaging the viewing angle properties. The alignment of the one pixel may be divided by forming a slit in the electrode, or by forming a projection to change the electric field direction or make an electric field density deviation. To obtain constant viewing angles in all the directions, the number of the domains has to be increased. Approximately constant viewing angles can be obtained by dividing into 4 or 8 domains. When the pixel is divided into 8 domains, the polarizer absorption axis can be preferably controlled at a desired angle.

In the boundary of the domains, the liquid crystal molecules are hardly likely to respond. Thus, in the normally black display, the black level of display is maintained, thereby resulting in brightness reduction. The boundary area can be reduced by adding a chiral agent to the liquid crystal material.

[[Second Aspect of the Invention]]

Applications of liquid crystal display devices are expanding year by year as power-saving and space-saving image display devices. Heretofore, one serious defect of liquid crystal display devices is that the viewing angle dependence of displayed image is large. Recently, however, various types of wide viewing angle-mode (for example VA-mode) liquid crystal display devices have been put into practical use, and in that situation, the demand for liquid crystal display devices is rapidly expanding even in the market such as the TV market which requires high image quality.

The basic constitution of a liquid crystal display device is such that a polarizer is provided on both sides of a liquid crystal cell. The polarizer plays a role in transmitting therethrough only the light polarized in a certain direction, and the performance of a liquid crystal display device is greatly influenced by the performance of the polarizer in the device. The polarizer is generally so designed that a transparent protective film is stuck to both the surface and the back of the polarizing element therein formed of an oriented, and iodide or dye-adsorbing polyvinyl alcohol film or the like. A cellulose acylate film, typically cellulose acetate, is highly transparent and readily secures good adhesiveness to polyvinyl alcohol for use as a polarizing element, and therefore it has been widely used as a protective film to a polarizer.

With the recent expansion of applications of liquid crystal display devices, large-size and high-quality applications of TVs and others have become enlarging, and the demand for high-quality polarizers and protective films thereof is much increasing these days. In particular, use of large-size and high-quality liquid crystal display devices has become much more needed in various severe environments, for example, for outdoor use or the like than before. From such viewpoints, recently, for protective films to a polarizer for use in liquid crystal display devices, improvement of both polarizer durability at high temperature and high humidity and polarizer durability at high temperature and low humidity has become greatly required.

For improving the polarizing element durability in high-temperature and high-humidity environments, heretofore a method of making the polarizing element layer acidic is known effective. A method of improving the polarizing element itself such as a polyvinyl alcohol film or the like, and a method of improving the protective film to a polarizer such as a cellulose acylate film or the like have been investigated. Concretely, a method of adding an acidic compound to the polarizing element or the protective film to a polarizer of a polarizer, or a method of dipping the element or the film in an acidic solution has been investigated.

As a method of improving the protective film to a polarizer such as a cellulose acylate film or the like, for example, Japanese Patent 4136054 discloses a case of improving the durability such as degradation resistance or discoloration resistance in drying under heat at 60° C. of a protective film to a polarizer formed of cellulose acetate flakes containing an acid having an acid dissociation constant of from 1.93 to 4.50 in an aqueous solution. However, in the patent reference, nothing is investigated relating to the durability of the optical properties of polarizer and to the evaluation thereof in high-temperature and high-humidity environments, and nothing is taken into consideration therein relating to the pH of the polarizing element layer incorporated in the polarizer.

On the other hand, as a method of improving the polarizing element itself such as a polyvinyl alcohol film or the like, a method of making the pH of the polarizing element layer acidic to thereby improve the polarizing element durability in high-temperature and high-humidity environments has been investigated. For example, JP-A-2001-83329 discloses a method of dipping a stretched polyvinyl alcohol film in an aqueous boric acid solution kept to have a pH of at most 4.5 to thereby improve the wet heat durability of the polarizing element at 70° C. and at a relative humidity of 90%. JP-A-6-254958 discloses a method of improving the durability of a polarizing element by dipping an unstretched polyvinyl alcohol resin film in an aqueous acidic solution having a pH of at most 6, preferably at most 5, and then stretching it, dying it with iodine and crosslinking it through treatment with boric acid to thereby improve the durability of the polarizing element of the film at 60° C. and at a relative humidity of 90%.

WO2006/095815 discloses a case of investigating the polarizing element durability in high-temperature and high-humidity environments and additionally the dry heat durability of the polarizing element, in which a polyvinyl resin film containing iodine, an iodide, a crosslinking agent and/or a waterproofing agent (boric acid or the like) is stretched and then processed in an acid-processing solution (except boric acid) with $2.4 \leq pH < 6.0$, thereby providing a polarizing element excellent in the wet heat durability at 65° C. and a relative humidity of 93% and also in the dry heat durability in an atmosphere preferably at 90° C.

However, in all the patent references of JP-A-2001-83329 and 6-254958 and WO2006/095815, nothing is taken into consideration relating to the pH of the polarizing element layer incorporated in a polarizer.

On the other hand, in JP-A-2005-62458, the fact that the pH of the solution prepared by dissolving a polarizing element in water (hereinafter this may be referred to as the pH of the aqueous solution of polarizing element) is from 5.5 to 5.7 just before the polarizing element is incorporated in a polarizer has been specifically noted from the viewpoint of improving the durability of the polarizing element in high-temperature and high-humidity environments, and the patent reference discloses a method of improving the durability of a polarizing element in an environment at 25° C. and at a relative humidity of 60% by controlling the pH of the aqueous solution of the polarizing element just before incorporated in a polarizer to be from 1.0 to 5.0. In Examples in the patent reference, a polarizing element formed of a polyvinyl alcohol, of which the pH of the aqueous solution is from 3.7 to 4.8, is investigated; however, nothing is investigated therein relating to the polarizing element durability of the cross-transmittance change thereof in high-temperature and high-humidity environments or in high-temperature and low-humidity environments.

The present inventors prepared a polarizer by combining a protective film to a polarizer that contains the compound having an acid dissociation constant of from 1.93 to 4.50, as described in Japanese Patent 4136054 to improve the polarizing element durability in drying under heat at 60° C., with an ordinary polarizing element, and investigated the polarizing element durability of the cross-transmittance change thereof in high-temperature and high-humidity environments or in high-temperature and low-humidity environments, and unexpectedly, the present inventors have found that the polarizing element durability in high-temperature and high-humidity environments could be improved but the polarizing element durability in high-temperature and low-humidity environments is rather worsened.

In addition, the present inventors prepared a polarizer by combining the polarizing element that had been obtained according to the method described in WO2006/095815, with an ordinary protective film to a polarizer, and investigated the properties of the polarizer, and have found that, even though the concentration of the weak acid to be used is remarkably increased up to the level described in Example 13 in the patent reference, the cross-transmittance change under aging condition at 80° C. is still large, and the polarizer is still unsatisfactory in point of the properties thereof. Further, from the viewpoint of the production method, the concentration of the weak acid must be remarkably increased, and the present inventors have found that the method requires further improvements including the viewpoint of the production cost.

Moreover, the present inventors prepared a polarizer by combining the polarizing element that had been obtained according to the method described in JP-A-2005-62458, with an ordinary protective film to a polarizer, and investigated the properties of the polarizer, and have found that the polarizing element is still unsatisfactory in point of the cross-transmittance thereof in high-temperature and low-humidity environments, and the polarizer is therefore unsatisfactory in point of the properties thereof.

Specifically, a polarizer improved in point of both the polarizing element durability in high-temperature and high-humidity environments and the polarizing element durability in high-temperature and low-humidity environments is heretofore not known in the art, and polarizer improvements to that effect are desired.

An object of the second aspect of the invention is to provide a polarizer improved in point of the polarizing element durability in both high-temperature and high-humidity environments and high-temperature and low-humidity environments.

For solving the above-mentioned problems, the present inventors have assiduously studied and, as a result, have known that the increase in the pH of the polarizing element aged in high-temperature and high-humidity environments is one reason for the cross-transmittance increase in the polarizing element aged in high-temperature and high-humidity environments. Further, the inventors have found that, when the pH of the polarizing element in aging in high-temperature and high-humidity environments is controlled to fall within a predetermined range by gradually moving the acid in the protective film to a polarizer from the film toward the polarizing element during aging in high-temperature and high-humidity environments, then the cross-transmittance increase in the polarizing element in high-temperature and high-humidity environments can be prevented.

On the other hand, regarding the aging in high-temperature and low-humidity environments, the inventors have found that the pH change in the polarizing element itself is small and the acid does not move from the protective film to a polarizer, and therefore the pH of the polarizing element does not change and the cross-transmittance thereof changes little.

According to the second aspect of the invention, there are provided a polarizer improved in point of the polarizing element durability in high-temperature and high-humidity environments not worsening the polarizing element durability in high-temperature and low-humidity environments, and a method for producing the polarizer. In addition, there is also provided a liquid crystal display device that uses the polarizer of the second aspect of the invention.

[Polarizer]

The polarizer of the second aspect of the invention comprising a polarizing element and two protective films to a polarizer disposed on both sides of the polarizing element, wherein the pH of the aqueous solution of the polarizing element, as measured according to the following method (1), is from 4 to 7, and before and after aged at 60° C. and a relative humidity of 95% for 500 hours, the pH change in the aqueous solution of the polarizing element, as measured according to the following method (1), is less than 0.4.

Method (1): 40 mg of the polarizing element is dipped in 15 ml of pure water and heated at 100° C. for 2 hours, and then the pH of the aqueous solution is measured.

In many conventional polarizers, the pH of the aqueous solution of the polarizing element after aged in high-temperature and high-humidity environments increases, and this is one reason of polarizance degradation. As opposed to this, in the polarizer of the second aspect of the invention, the organic acid added to the protective film to a polarizer moves toward the polarizing element during aging in high-temperature and high-humidity environments, and therefore the pH increase in the aqueous solution of the polarizing element is thereby prevented.

The polarizer of the second aspect of the invention is described in detail hereinunder.

<Properties of Polarizer>

(pH of Aqueous Solution of Polarizing Element)

In the polarizer of the second aspect of the invention, the pH of the aqueous solution of the polarizing element before aged in high-temperature environments is, as measured according to the above-mentioned method (1), from 4 to 7. Having the constitution, the single plate cross-transmittance change (%) in the polarizer, when left in a dry environment at 80° C. for 500 hours, can be reduced.

Preferably, the pH of the aqueous solution of the polarizing element is from 4.0 to 6.5, more preferably from 4.0 to 6.0.

In the polarizer of the second aspect of the invention, the pH change in the aqueous solution of the polarizing element, as measured according to the above-mentioned method (1) before and after aged at 60° C. and a relative humidity of 95% for 500 hours, is less than 0.4. Having the constitution, the single plate cross-transmittance change (%) in the polarizer, when left in a dry environment at 80° C. for 500 hours, can be reduced.

Preferably, the pH change in the aqueous solution of the polarizing element is at most 0.2, more preferably at most 0.1.
(Cross-Transmittance CT)

Preferably, the cross-transmittance CT of the polarizer of the second aspect of the invention is CT 2.0, more preferably CT≤1.3, most preferably CT≤0.6 (the unit is %).
(Cross-Transmittance Change)

In the polarizer durability test, the cross-transmittance change is preferably smaller.

When left at 60° C. and at a relative humidity of 95% for 500 hours, the single plate cross-transmittance change (%) in the polarizer of the second aspect of the invention is at most 0.65%, and when left in a dry environment at 80° C. (with no moisture control, and in Examples of the second aspect of the invention, the relative humidity in the dry environment is from 0% to 20%) for 500 hours, the single plate cross-transmittance change (%) in the polarizer is at most 0.15%.

Preferably, the single plate cross-transmittance change (%) in the polarizer when left at 60° C. and at a relative humidity of 95% for 500 hours is at most 0.30%, more preferably at most 0.25%. On the other hand, the single plate cross-transmittance change in the polarizer when left in a dry environment at 80° C. for 500 hours is preferably at most 0.10%.

"Change" as referred to herein means the value computed by subtracting the value before the test from the value after the test.

When the polarizer satisfies the range of the cross-transmittance change as above, it is favorable since the polarizer can secure the stability in long-term use or storage thereof in high-temperature and high-humidity environments and in high-temperature and low-humidity environments.

In invention of the second aspect of the invention, the cross transmittance CT of the polarizer was measured using an automatic polarizing film analyzer VAP-7070 (manufactured by JASCO Corporation). In measurement, the CT was measured at 410 nm 10 times and the average value of measurement was used.

The polarizer durability test is the same as that of (1) and (2) of the polarizer durability test of the first aspect of the invention. In EXAMPLES of the second aspect of the invention, the test method of (2) was adopted among above test method of (1) and (2).
(Other Properties)

The other preferred optical properties of the polarizer of the second aspect of the invention are described in [0238] to [0255] of JP-A-2007-086748, and preferably, the polarizer of the invention fulfills these properties.
<Configuration, Constitution>

Regarding the configuration thereof, the polarizer of the second aspect of the invention includes not only those in the form of a sheet cut so as to be directly incorporated into liquid crystal display devices but also those in the form of a roll as wound up in continuous production (for example, a roll having a roll length of at least 2500 m or at least 3900 m). For application to large-panel liquid crystal display devices, the width of the polarizer is preferably at least 1470 mm.

The polarizer of the second aspect of the invention comprising a polarizing element and a protective film to a polarizer to protect both surfaces of the element, and is also preferably so designed that a protective is attached to one surface of the polarizer and a separate film to the other surface thereof.

In this embodiment, the protective film and the separate film are to protect the polarizer in its shipping and acceptance inspection. In this case, the protective is used for the purpose of protecting the surface thereof, and is attached to the side of the polarizer opposite to the side thereof to which a liquid crystal plate is stuck. The separate film is used for the purpose of covering the adhesive layer or the like of the polarizer via which the polarizer is stuck to a liquid crystal plate, and therefore, the separate film is attached to the side of the polarizer to which a liquid crystal plate is stuck.

The details of the polarizing element and two protective films to a polarizer for use in the polarizer of the second aspect of the invention are described below.
<Production of Polarizer>
(Polarizing Element)

At first, a polarizing element used in a polarizer in the second aspect of the invention is described below.

In the invention, the polarizer is preferably composed of a polyvinyl alcohol (PVA) and a dichroic molecule, and may be a polyvinylene polarizer prepared by subjecting a PVA or polyvinyl chloride to dehydration or dechlorination and by aligning the generated polyene structure as described in JP-A-11-248937.
(1-1) PVA The PVA is preferably a polymer material obtained by saponifying a polyvinyl acetate, and may contain a component capable of copolymerizing with vinyl acetate, such as an unsaturated carboxylic acid, an unsaturated sulfonic acid, an olefin, or a vinyl ether. Further, modified PVAs having an acetoacetyl group, sulfonic acid group, carboxyl group, oxyalkylene group, etc. may be used in the invention.

Additionally, a PVA film having a bonding 1,2-glycol amount of 1.5 mol % or less described in Japanese Patent No. 3021494, a PVA film having 500 or less optically foreign substances of 5 μm or more in size per 100 cm$^2$ described in JP-A-2001-316492, a PVA film having a hot water breaking temperature of 1.5° C. or lower in the TD direction described in JP-A-2002-030163, and a PVA film prepared from a solution containing 1 to 100 parts by mass of 3 to 6-polyvalent alcohol such as glycerin or 15% by mass or more of a plasticizer described in JP-A-06-289225 can be preferably used for the polarizer in the second aspect of the invention.
(1-2) Dichroic Molecule The dichroic molecule maybe a higher iodine ion such as $I_3$— or $I_5$—, or a dichroic dye.

The higher iodine ion is particularly preferably used in the second aspect of the invention. The higher iodine ion can be generated such that the PVA is soaked in a liquid prepared by dissolving iodine in an aqueous potassium iodide solution and/or an aqueous boric acid solution to adsorb the iodine to the PVA as described in Henkoban no Oyo, Ryo Nagata, CMC and Kogyo Zairyo, Vol. 28, No. 7, Page 39 to 45.

In the case of using the dichroic dye as the dichroic molecule, the dichroic dye is preferably an azo dye, particularly preferably a bisazo or trisazo dye. The dichroic dye is preferably water-soluble, and thus a hydrophilic substituent such as a sulfonic acid group, an amino group, or a hydroxyl group is preferably introduced to a dichroic molecule, to generate a free acid, an alkaline metal salt, an ammonium salt, or an amine salt. Examples of the dichroic molecule includes those described in JP-A 2007-086748.
(1-3) Organic Acid Furthermore, the above-mentioned polarizer may contain the organic acid contained in the protective film to a polarizer mentioned later, unless it is contrary to the purpose of the second aspect of the invention.

In that case, the content of the organic acid is preferably from 0.01% to 10% by mass to the resin used for the base film of the polarizing element. In case where the content of the organic acid is at least 0.01% by mass, the polarizing element durability improvement effect is easy to be acquired. In case where the content of the organic acid is at most 10% by mass, it is hard to cause film whitening by the phase separation in the inside of polarizing element. The content of the organic acid is more preferably from 0.1% to 8% by mass, particularly preferably from 0.1% to 5% by mass.

The polarizer of the second aspect of the invention can fully acquire the effect of the polarizer of invention of the second aspect of the invention, even if an organic acid is not contained in polarizing element, since the organic acid is contained in the protective film to a polarizer described later.

(1-4) Thickness of Polarizing Element

The film thickness of the unstretched polarizing element is not specifically defined, but it is preferably from 1 µm to 1 mm, particularly preferably from 20 to 200 µm from the viewpoint of the film stability and uniform stretching. Such a thin PVA film that 10 N or less of stress is generated in the stretching in water at a ratio of 4 to 6 times may be used as described in JP-A-2002-236212.

<Protective Film to Polarizer>

Two protective films to a polarizer for use in the polarizer of the second aspect of the invention are described below.

At least one protective film to a polarizer for use in the polarizer of the second aspect of the invention contains a resin and an organic acid having an octanol/water partition coefficient (hereinafter referred to as log P) of at least 3.0 in an amount of from 0.1 to 20 parts by mass relative to 100 parts by mass of the resin. Containing the organic acid of the type, the protective film to a polarizer can improve the polarizing element durability in high-temperature and high-humidity environments not worsening the polarizing element durability in high-temperature and low-humidity environments.

Preferred embodiments of the organic acid and the film base material for use in the protective film to a polarizer, and those of the protective film to a polarizer are described below.

(2-1) Organic Acid (Octanol/Water Partition Coefficient)

In the polarizer of the second aspect of the invention, preferably, at least one protective film to a polarizer contains an organic acid having an octanol/water partition coefficient of at least 3.0.

Log P of the organic acid to be contained in the protective film to a polarizer for use in the polarizer of the second aspect of the invention is preferably from 3 to 7, more preferably from 3.5 to 6. As defined to have log P of at least 3, the organic acid can be so controlled that it can move to the polarizing element only when aged in high-temperature and high-humidity environments, and therefore the polarizing element durability in high-temperature and high-humidity environments can be thereby improved not worsening the polarizing element durability in high-temperature and low-humidity environments. On the other hand, when defined to have log P of at most 7, the organic acid does not increase the haze of the protective film to a polarizer to which it is added.

Octanol-water partition coefficients (logP values) can be generally measured by the shake flask method described in Japan Industrial Standards (JIS) Z7260-107 (2000). The octanol-water partition coefficients (logP values) can be estimated by a calculative chemical method or experiential method instead of actual measurement. Known examples of the calculative methods include Crippen's fragmentation method (J. Chem. Inf. Comput. Sci., 27, 21(1987)), Viswanadhan's fragmentation method (J. Chem. Inf. Comput. Sci., 29, 163(1989)), and Broto's fragmentation method (Eur. J. Med. Chem.-Chim. Theor., 19, 71 (1984)). The Crippen's fragmentation method (J. Chem. Inf. Comput. Sci., 27, 21(1987)) is used in the invention.

The "ClogP value" is a calculated common logarithm (log P) of an octanol-water partition coefficient P. Known methods and softwares can be used to calculate the ClogP value. In the invention, the CLOGP program installed in PCModels that is a system of Daylight Chemical Information System is used.

When ClogP value of a compound measured by some method differs from ClogP value of the compound calculated by some calculation method, the Crippen's fragmentation method is used to determine if the compound is included in the invention.

(Acid Dissociation Constant of Organic Acid)

The organic acid to be contained in the protective film to a polarizer for use in the polarizer of the second aspect of the invention preferably has an acid dissociation constant at 25° C. of at most 6, more preferably at most 5.

For measuring the acid dissociation constant in the invention, employed is the alkali titration method described in Course of Experimental Chemistry, 2nd Ed., pp. 215-217 by Maruzen.

(Structure of Organic Acid)

The organic acid is preferably a compound represented by the above formula (1):

X-L-(R$^1$)$_n$     Formula (1)

wherein X represents an acid group wherein the acid dissociation constant is 5.5 or less; L represents a single bond, or a di- or more valent linking group; R$^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 in the case where L is a single bond, or represents the number expressed by:

(the valent number of L)−1 in the case where L is a di- or more valent linking group.

Comprising the protective film to a polarizer that contains the organic acid of the above formula (1), the polarizer of the second aspect of the invention can remarkably improve the polarizing element durability when aged in high-temperature and high-humidity environments and in high-temperature and low-humidity environments. In addition, the pH of the aqueous solution of the polarizing element before and after aged in high-temperature and high-humidity environments can be controlled to fall within the range of the second aspect of the invention, and the effect could not be attained by ordinary inorganic acids.

The preferred range of the structure of the organic acid of the above-mentioned formula (1) in the second aspect of the invention is the same as the preferred range thereof in the first aspect of the invention described hereinabove.

The amount of the organic acid of formula (1) to be in the protective film to a polarizer of the second aspect of the invention is preferably in a ratio of from 0.1% by mass to 20% by mass, more preferably from 1% by mass to 15% by mass, particularly preferably from 1% by mass to 10% by mass, more particularly preferably from 1.5% by mass to 5% by mass.

When the amount is at least 0.1% by mass, then the polarizing element durability improving effect and the releasability improving effect of the resin film are satisfactory. When the amount is at most 20% by mass, then it is favorable since the organic acid hardly bleeds out when aged in high-temperature and high-humidity condition and since the vertical transmittance of the polarizer that comprising the film hardly increases.

The concentration of the organic acid of formula (1) to be in the protective film to a polarizer of the second aspect of the invention is preferably from 0.2 to 40 mmol per 100 g of the film, more preferably from 0.5 to 5 mmol, even more preferably from 0.6 to 4.5 mmol, still more preferably from 0.8 to 4.0 mmol.

(2-2) Resin

The resin to constitute the film base material for use for the protective film to a polarizer is described below.

Not contradictory to the scope and the sprit of the second aspect of the invention, any known resin is usable for the film base material for the protective film to a polarizer with no specific limitation. For example, the film base material includes cellulose acylate, acrylic resin, cycloolefin resin. Above all, preferred is cellulose acylate resin. Accordingly, the s preferably contains a cellulose acylate.

(Cellulose Acylate)

Cellulose acylate for use in the second aspect of the invention is described in detail hereinunder.

The degree of substitution in cellulose acylate means the ratio of acylation of three hydroxyl groups existing in the constitutive unit of cellulose ((β)-1,4-glycoside-bonding glucose). The degree of substitution (degree of acylation) may be computed by determining the bonding fatty acid amount per the constitutive unit mass of cellulose. In the second aspect of the invention, the degree of substitution of cellulose may be computed as follows: The substituted cellulose is dissolved in a solvent such as deuterium-substituted dimethyl sulfoxide or the like, and analyzed for the 13C-NMR spectrum thereof. The degree of substitution may be computed from the peak intensity ratio of the carbonyl carbon in the acyl group. The remaining hydroxyl group in the cellulose acylate is substituted with any other acyl group than the acyl group that the cellulose acylate itself has, and then determined through 13C-NMR analysis. The details of the measurement method are described by Tezuka et al's (Carbohydrate, Res., 273 (1995) 83-91).

Preferably, the cellulose acylate for use in the second aspect of the invention has a total degree of acyl substitution of from 2.0 to 2.97, more preferably from 2.2 to 2.95, even more preferably from 2.3 to 2.95. The organic acid used for the second aspect of the invention has the high polarizer durability improvement effect, when it is used together with the cellulose acylate of the range of such a total degree of acyl substitution especially.

The acyl group in the cellulose acylate for use in the second aspect of the invention is preferably an acetyl group, a propionyl group or a butyryl group, more preferably an acetyl group.

A mixed fatty acid ester having two or more different acyl groups is also preferably used for the cellulose acylate in the second aspect of the invention. In this case, the acyl groups are preferably an acetyl group and an acyl group having 3 or 4 carbon atoms. Also preferably, the degree of substitution with an acetyl group is less than 2.5, more preferably less than 1.9. On the other hand, the degree of substitution with an acyl group having 3 or 4 carbon atoms is from 0.1 to 1.5, more preferably from 0.2 to 1.2, particularly preferably from 0.5 to 1.1.

In the second aspect of the invention, two types of cellulose acylates that differ in the substituent and/or the degree of substitution therein may be used as combined or mixed; or films composed of multiple layers of different cellulose acylates may be formed according to a co-casting method or the like to be mentioned below.

The mixed acid ester having a fatty acid acyl group and a substituted or unsubstituted aromatic acyl group, which is described in JP-A 2008-20896, [0023] to [0038], is also preferred for use in the invention.

Preferably, the cellulose acylate for use in the second aspect of the invention has a mass-average degree of polymerization of from 250 to 800, more preferably a mass-average degree of polymerization of from 300 to 600. The cellulose acylate for use in the second aspect of the invention preferably has a number-average molecular weight of from 70000 to 230000, more preferably a number-average molecular weight of from 75000 to 230000, most preferably a number-average molecular weight of from 78000 to 120000.

The cellulose acylate for use in the second aspect of the invention may be produced using an acid anhydride or an acid chloride as the acylating agent. In case where the acylating agent is an acid anhydride, an organic acid (for example, acetic acid) or methylene chloride is used as the reaction solvent. As the catalyst, a protic catalyst such as sulfuric acid may be used. In case where the acylating agent is an acid chloride, a basic compound may be used as the catalyst. A most popular production method on an industrial scale comprising esterifying cellulose with a mixed organic acid component containing an organic acid (acetic acid, propionic acid, butyric acid) or an acid anhydride thereof (acetic anhydride, propionic anhydride, butyric anhydride) corresponding to an acetyl group and other acyl group, thereby producing a cellulose ester.

In the above method, cellulose such as cotton linter or wood pulp is, in many cases, activated with an organic acid such as acetic acid and then esterified with a mixed liquid of the above-mentioned organic acid component. The organic acid anhydride component is used generally in an excessive amount over the amount of the hydroxyl group existing in cellulose. In the esterification treatment, hydrolysis reaction (depolymerization reaction) of the cellulose main chain ((β)-1,4-glycoside bond) occurs along with the esterification reaction. When the hydrolysis reaction of the main chain goes on, then the degree of polymerization of the cellulose ester lowers, and the physical properties of the cellulose ester film to be produced worsen. Accordingly, it is desirable that the reaction condition such as the reaction temperature is determined in consideration of the degree of polymerization and the molecular weight of the cellulose ester to be obtained.

(2-3) Properties of Protective Film to Polarizer

Preferably, the protective film to a polarizer fulfills the following properties.

The two protective films to a polarizer for use in the polarizer of the second aspect of the invention may be the same or different.

As the other protective film to a polarizer, usable are films of which the moisture permeability after aged at 60° C. and at a relative humidity of 90% for 24 hours is well balanced with that of the organic acid-containing protective film to a polarizer.

Preferably, the other protective film to a polarizer is selected in consideration of the water content and the modulus of elasticity thereof.

As the other protective film to a polarizer, preferred is use of commercially-available cellulose triacetate films (Fujitac TD80UF, by FUJIFILM), alicyclic structure-having polymer resin films described in JP-A-2006-58322, and acrylic resins described in JP-A-2009-122644.

(Thickness of Protective Film to Polarizer)

Preferably, the thickness of the organic acid-containing protective film to a polarizer is from 30 μm to 100 μm, more preferably from 30 μm to 80 μm, even more preferably from 35 μm to 65 μm.

On the other hand, the thickness of the other protective film to a polarizer not containing an organic acid is preferably from 30 μm to 100 μm, more preferably from 35 μm to 80 μm, even more preferably from 35 to 65 μm.

(Moisture Permeability of Protective Film to Polarizer)

Preferably, the moisture permeability of the organic acid-containing protective film to a polarizer is from 10 to 500 g/m$^2$·day, more preferably from 100 to 500 g/m$^2$·day, even more preferably from 200 to 450 g/m$^2$·day.

On the other hand, the moisture permeability of the other protective film to a polarizer not containing an organic acid is preferably from 10 to 500 g/m$^2$·day, more preferably from 100 to 500 g/m$^2$·day, even more preferably from 200 to 450 g/m$^2$·day.

In the second aspect of the invention, the moisture permeability means the weight (g) of the water vapor that passes through a sample having an area of 1 m$^2$ for 24 hours, in an atmosphere at a temperature of 40° C. and a relative humidity of 92%, according to the moisture permeability test (cup method) of JIS Z0208.

[Producing Method of Polarizer]

The producing method of a polarizer of the second aspect of the invention (hereinunder called the producing method of the second aspect of the invention) is characterized in containing laminating two protective films to a polarizer on both sides of a polarizing element, wherein at least one protective film to a polarizer is formed of a composition that contains a resin and an organic acid having an octanol/water partition coefficient of at least 3.0 in an amount of from 0.1 to 20 parts by mass relative to 100 parts by mass of the resin.

Hereinafter describes the producing method of a polarizer of the second aspect of the invention, in order of functionalization of the producing method of a protection film to a polarizer, the producing method of a polarizing element, the lamination method of a protection film to a polarizer and polarizing element, and a polarizer.

<Producing Method of Protective Film to Polarizer>

The protective film to a polarizer in the second aspect of the invention may be produced according to a solution casting method. Although the mode which a cellulose acylate is used as a base material is described as an example of the producing method of the protective film to a polarizer containing the organic acid hereafter, also when other resin is used, the producing method of the protective film to a polarizer containing the organic acid can be manufactured similarly. In the solution casting method, a solution (dope) prepared by dissolving cellulose acylate in an organic solvent is used to produce films.

The organic solvent preferably contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms.

The ethers, ketones and esters may have acyclic structure. In addition, compounds having two or more functional groups (e.g., —O—, —CO— and —COO—) of the ethers, ketones and esters may also be used as the organic solvent. The organic solvent may have any other functional group such as an alcoholic hydroxyl group. When the organic solvent has two or more functional groups, then it is desirable that the number of the carbon atoms constituting the solvent is within the above-mentioned preferred range of the solvent having either one of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvents having two or more functional groups include 2-ethoxyethyl acetate, 2-methoxyethanol and 2-butoxyethanol.

The number of the carbon atoms constituting the halogenohydrocarbon having from 1 to 6 carbon atoms is preferably 1 or 2, more preferably 1. The halogen of the halogenohydrocarbon is preferably chlorine. The ratio in which the hydrogen atom of the halogenohydrocarbon is substituted with halogen is preferably from 25 to 75 mol %, more preferably from 30 to 70 mol %, even more preferably 35 to 65 mol %, most preferably from 40 to 60 mol %. Methylene chloride is the most typical halogenohydrocarbon for use herein.

Two or more organic solvents may be combined for use herein.

The cellulose acylate solution (dope) maybe prepared in an ordinary method where it is processed at a temperature not lower than 0° C. (room temperature or high temperature). For preparing the cellulose acylate solution, herein employable are a method and an apparatus for dope preparation in an ordinary solution casting method. In such an ordinary process, a halogenohydrocarbon (especially methylene chloride) is preferably used for the organic solvent.

The amount of cellulose acylate in the cellulose acylate solution (composition) is so controlled that it is in an amount of from 10% to 40% by mass of the solution obtained. More preferably, the amount of cellulose acylate is from 10% to 30% by mass. To the organic solvent (main solvent), optional additives to be mentioned below may be added.

Preferable embodiment of the method for preparing the dope other than above mentioned of the second aspect of the invention is the same as the preferable embodiment of that of the first aspect of the invention.

From the thus-prepared cellulose acylate solution (dope), produced is a cellulose acylate film in a solution casting method. Preferably, a retarder is added to the dope. The dope is cast onto a drum or a band, on which the solvent is evaporated away to form a film thereon. Before cast, the concentration of the dope is preferably so controlled that the solid content of the dope could be from 18% to 35%. Preferably, the surface of the drum or the band is mirror-finished. Also preferably, the dope is cast onto the drum or the band having a surface temperature not higher than 10° C.

A mode of drying in the solution casting method is described, for example, in U.S. Pat. Nos. 2,336,310, 2,367,603, 2,492,078, 2,492,977, 2,492,978, 2,607,704, 2,739,069, 2,739,070, BP 640731 and BP 736892; JP-B-45-4554, JP-B-49-5614, JP-A-60-176834, JP-A-60-203430 and JP-A-62-115035. Drying on a band or a drum may be attained by applying thereto a blow of an inert gas such as air or nitrogen.

The obtained film may be peeled off from the drum or the band, and may be dried with hot air having a varying temperature of from 100° C. to 160° C., whereby the residual solvent may be evaporated away. The method is described in JP-B-5-17844. According to the method, the time from the casting to the peeling may be shortened. For carrying out the method, the dope must be gelled at the surface temperature of the drum or the band on which the dope is cast.

The prepared cellulose acylate solution (dope) may be cast in two or more layers for film formation. In this case, it is desirable that the first retardation cellulose acylate film is formed according to a solution casting method. The dope is cast onto a drum or a band, and then the solvent is evaporated away to form a film thereon. Before cast, the dope concentration is preferably so controlled that the solid content of the dope could be from 10% to 40% by mass. Also preferably, the surface of the drum or the band is mirror-finished.

When two or more layers of plural cellulose acylate solutions are formed by casting, then plural cellulose acylate solutions may be cast. Through plural casting ports spaced from each other in the machine direction of the support, cellulose acylate-containing solutions are separately cast onto the support and laminated thereon to form a film. For this, for example, methods described in JP-A-61-158414, JP-A-1-122419 and JP-A-11-198285 may be referred to. When cellulose acylate solutions are cast through two casting ports, then a film may also be produced. For this, for example, methods described in JP-B-60-27562, JP-A-61-94724, JP-A-61-947245, JP-A-61-104813, JP-A-61-158413 and JP-A-6-134933 may be referred to. Also employable herein is a casting method described in JP-A-56-162617, in which a high-viscosity cellulose acylate solution flow is enveloped with a low-viscosity cellulose acylate solution, and the high-viscosity and low-viscosity cellulose acylate solutions are co-extruded simultaneously to give a film.

Two casting ports may be used as follows: A film is formed on a support through the first casting port, and this is peeled off. On the surface of the film having been in contact with the support, a second dope is cast via a second casting port to form a second film thereon. For this, for example, referred to is a method described in JP-B-44-20235.

The same cellulose acylate solution may be cast, or two or more different cellulose acylate solutions maybe cast. In order to make plural cellulose acylate layers have different functions, different cellulose acylate solutions corresponding to the intended functions maybe extruded out via the respective casting ports. In addition, the cellulose acylate solution in the second aspect the invention may be co-cast with any other functional layers (e.g., adhesive layer, dye layer, antistatic layer, antihalation layer, UV absorbent layer, polarizing layer).

(Addition of Organic Acid)

The production method of the second aspect of the invention includes forming at least one protective film to a polarizer to be in the polarizer from a composition containing a resin and an organic acid having an octanol/water partition coefficient of at least 3.0 in an amount of from 0.1 to 20 parts by mass relative to 100 parts by mass of the resin. The timing at which the organic acid is added to the cellulose acylate solution to be the starting resin material for the protective film to a polarizer is not specifically defined, and the acid maybe added to the solution at anytime in film formation. For example, the acid may be added at the time of producing cellulose acylate, or may be mixed with cellulose acylate in dope preparation.

(Adding of Other Additives)

Known anti-aging agents (e.g., antioxidant, peroxide-decomposing agent, radical inhibitor, metal inactivator, acid scavenger, amine) may be added to the protective film to a polarizer of the second aspect of the invention. Anti-aging agents are described in JP-A 3-199201, JP-A 5-197073, JP-A 5-194789, JP-A 5-271471, JP-A 6-107854. The amount of the anti-aging agent to be added is preferably from 0.01 to 1% by mass of the prepared solution (dope), more preferably from 0.01 to 0.2% by mass from the viewpoint that the added anti-aging agent could exhibit its effect and does not bleed out on the film surface. Especially preferred examples of the anti-aging agent are butylated hydroxytoluene (BHT) and tribenzylamine (TBA).

Preferably, the protective film to a polarizer of the second aspect of the invention contains fine particles serving as a mat agent. As the fine particles for use in second aspect of the invention, there may be mentioned silicon dioxide, titanium dioxide, aluminium oxide, zirconium oxide, calcium carbonate, talc, clay, calcined kaolin, calcined calcium silicate, hydrated calcium silicate, aluminium silicate, magnesium silicate, and calcium phosphate. Fine particles containing silicon are preferred, as the haze of the film containing them may be low, and silicon dioxide is more preferred. Preferably, the fine particles of silicon dioxide have a primary mean particle size of at most 20 nm, and an apparent specific gravity of at least 70 g/L. More preferred are those having a small primary mean particle size of from 5 to 16 nm as the haze of the film containing them could be lower. The apparent specific gravity is preferably from 90 to 200 g/L, more preferably from 100 to 200 g/L. Those having a larger apparent specific gravity may form a dispersion having a higher concentration, and are therefore preferred since the haze of the film containing them may be low and since few aggregates are formed in the film.

The fine particles generally form secondary particles having a mean particle size of from 0.1 to 3.0 μm, and the fine particles exist as aggregates of the primary particles in the film, therefore forming fine projections of from 0.1 to 3.0 μm in height in the film surface. Preferably, the mean particle size of the secondary particles is from 0.2 μm to 1.5 μm, more preferably from 0.4 μm to 1.2 μm, most preferably from 0.6 μm to 1.1 μm. The particle size of the primary and secondary particles are determined as follows: Using a scanning electronic microscope, the particles in the film are observed, and the diameter of the circumscribing circle of each particle is taken as the particle size. At different sites, 200 particles are randomly observed, and their data are averaged to be the mean particle size.

As the fine particles of silicon dioxide, for example, usable are commercial products of Aerosil R972, R972V, R974, R812, 200, 200V, 300, R202, OX50 and TT600 (all by Nippon Aerosil). Fine particles of zirconium oxide are sold on the market as trade names of Aerosil R976 and R811 (by Nippon Aerosil), and these can be used here.

Of those, Aerosil 200V and Aerosil R972V are fine particles of silicon dioxide having a primary mean particle size of at most 20 nm and an apparent specific gravity of at least 70 g/liter, and are especially preferred for use herein as capable of keeping the haze of the optical film low and effective for reducing the friction factor of the film.

For obtaining a film containing fine particles having a small secondary mean particle size, some methods may be taken into consideration for preparing a dispersion of the fine particles. For example, herein employable is a method of previously preparing a fine particles dispersion where a solvent and fine particles are stirred and mixed, adding the fine particles dispersion to a small amount of a cellulose ester solution separately prepared, and stirring it, and further mixing it with a main cellulose ester dope solution. This method is a preferred preparation method since the silicon dioxide fine particles are well dispersible and since the silicon dioxide fine particles hardly reaggregate. Another method employable here comprising adding a small amount of cellulose ester to a solvent, stirring and dissolving it, then adding thereto fine particles and dispersing them with a disperser to prepare a fine particle additive dispersion, and well mixing the fine particle additive dispersion with a dope solution with an in-line mixer. However, the second aspect of the invention is not limited to these methods. When silicon dioxide fine particles are mixed and dispersed in a solvent, the concentration of silicon dioxide is preferably from 5 to 30% by mass, more preferably from 10 to 25% by mass, most preferably from 15 to 20% by mass. When the dispersion concentration is higher, then the liquid turbidity relative to the added amount may be lower, and therefore the dispersion concentration is preferably higher since the haze of the film may be lower and the film has few aggregates. The amount of the mat agent in the final cellulose ester dope solution is preferably from 0.01 to 1.0 g per $m^2$ of the film to be formed, more preferably from 0.03 to 0.3 g, most preferably from 0.08 to 0.16 g.

The solvent for use here may be a lower alcohol, preferably methyl alcohol, ethyl alcohol, propyl alcohol, isopropyl alcohol or butyl alcohol. The other solvent than the lower alcohol is not specifically defined. Preferably, the solvent for use in formation of cellulose ester film is used here.

The process from casting to drying may be attained in an air atmosphere or in an inert gas atmosphere of nitrogen gas or the like. An ordinary winder may be used for a winder used for producing the second aspect of the invention, and the film may be wound up according to an ordinary winding method of a constant tension method, a constant torque method, a taper tension method or a programmed tension control method where the internal stress is kept constant.

(Stretching Treatment)

The protective film to a polarizer may be stretched. The protective film to a polarizer may be given a desired retardation by stretching. Regarding the stretching direction thereof, the cellulose acylate film for the protective film to a polarizer may be stretched in any of the cross direction or the machine direction thereof.

The method of stretching in a cross direction is described in, for example, JP-A-62-115035, 4-152125, 4-284211, 4-298310, 11-48271.

The film is stretched under heat. The film may be stretched during drying it, which is especially effective when a solvent remains in the film. In machine-direction stretching, for example, the speed of the film conveying rollers is so controlled that the film winding speed could be higher than the film peeling speed whereby the film is stretched. In cross-direction stretching, the film is conveyed while its width is held by a tenter and the tenter width is gradually expanded whereby the film is stretched. After dried, the film may be stretched with a stretcher (preferably monoaxially with a long stretcher).

Preferably, the protective film to a polarizer is stretched at a temperature of from (Tg−5° C.) to (Tg+40° C.) in which Tg means the glass transition temperature of the protective film to a polarizer, more preferably from (Tg) to (Tg+35° C.), even more preferably from (Tg+10° C.) to (Tg+30° C.). When the film is a dry film, its stretching temperature is preferably from 130° C. to 200° C.

In case where the cast film is stretched while the dope solvent still remains therein, it may be stretched at a temperature lower than the temperature of a dry film, and in this case, the wet cast film is stretched preferably at from 100° C. to 170° C.

The draw ratio in stretching of the protective film to a polarizer (the degree of elongation of the stretched film relative to the unstretched film) is preferably from 1% to 200%, more preferably from 5% to 150%. In particular, the film is stretched in the cross direction preferably by from 1% to 200%, more preferably by from 5% to 150%, even more preferably by from 30 to 45%.

The stretching speed is preferably from 1%/min to 300%/min, more preferably from 10%/min to 300%/min, most preferably from 30%/min to 300%/min.

Preferably, after the protective film to a polarizer is produced via a process where the film is stretched up to the maximum draw ratio and then kept at a draw ratio lower than the maximum draw ratio for a predetermined period of time (hereinafter this may be referred to as "relaxation"). The draw ratio in the relaxation is preferably from 50% to 99% of the maximum draw ratio, more preferably from 70% to 97% thereof, most preferably from 90% to 95% thereof. The time for the relaxation is preferably from 1 second to 120 seconds, more preferably from 5 seconds to 100 seconds.

Further, it is preferred that the protective film to a polarizer is produced by a method containing shrinking the film while holding the film in the width direction.

In the method containing stretching the film in the width direction and shrinking the film in the transport direction, the film can be shrunk such that the film is held by a pantograph- or linear motor-type tenter, and a distance of clips is gradually reduced in the transport direction while stretching the film in the width direction.

In the method described above, at least a part of the stretching and the shrinking are attained at the same time.

For example, FITZ manufactured by Ichikin, Ltd. can be preferably used as a stretching apparatus for stretching the film in the longitudinal direction or width direction and for shrinking the film in the other direction simultaneously to increase the film thickness. The apparatus is described in JP-A-2001-38802.

A stretch ratio in the stretching and a shrink ratio in the shrinking may be appropriately selected depending on desired front retardation Re and thickness direction retardation Rth, and it is preferred that the stretch ratio is 10% or more and the shrink ratio is 5% or more.

It is preferable to include the stretching process extended at least 10% to the width direction of a film and the shrinking which shrinks the conveying direction of a film at least 5% while clipping a film to the width direction of a film.

In the second aspect of the invention, the shrink ratio means the length ratio of the film in the shrinking direction before and after the shrinking.

The shrink ratio is preferably 5 to 40%, particularly preferably 10 to 30%.

(Saponification Treatment)

The protective film to a polarizer is given adhesiveness to the material of a polarizing element such as polyvinyl alcohol by saponification with alkali, and thus processed, the film is used as a protective film to a polarizer.

For the saponification, usable is the method described in [0211] and [0212] of JP-A-2007-86748.

The alkali saponification of the protective film to a polarizer is preferably attained in a cycle that includes dipping the film surface in an alkali solution, then neutralizing it with an acid solution, washed with water and dried. The alkali solution includes a potassium hydroxide solution and a sodium hydroxide solution. Preferably, the hydroxide ion concentration in the solution is within a range of from 0.1 to 5.0 mol/L, more preferably from 0.5 to 4.0 mol/L. Preferably, the temperature of the alkali solution is within a range of from room temperature to 90° C., more preferably from 40 to 70° C.

In place of alkali saponification, the film may be processed for easy adhesion treatment as described in JP-A-6-94915, 6-118232.

<Production Method for Polarizing Element>

The method for producing the polarizing element for use in the polarizer production method of the second aspect of the invention is not specifically defined. For example, one preferred method comprising forming a film of PVA followed by introducing a dichroic molecule thereinto to constitute a polarizing element. For producing the PVA film, referred to are the method described in [0213] to [0237] of JP-A-2007-86748, and those described in Japanese Patent 3342516, JP-A-09-328593, 2001-302817, 2002-144401.

Concretely, one preferred method of producing the polarizing element comprising preparing a PVA resin solution, casting, swelling, dyeing, hardening, stretching and drying in that order. During the process or after the process, an on-line surface condition inspecting process may be provided.

(Preparation of PVA Resin Solution)

In preparing a PVA resin solution, preferably, a dope solution is prepared by dissolving a PVA resin in water or an organic solvent. The concentration of the polyvinyl alcohol resin in the dope is preferably from 5 to 20% by mass. For example, a wet cake of PVA is put in a dissolution tank, and optionally a plasticizer and water are added thereto, and these are stirred with introducing water vapor thereinto from the bottom of the tank. This is one preferred method for the preparation. Preferably, the internal resin temperature is from 50 to 150° C., and the system may be kept under pressure.

An acid may be added or may not be added to the polarizing element. In case where an acid is added thereto, preferably, it is added in this process. In case where an acid is added to the polarizing element, the acid may be the same as the organic acid to be contained in the protective film to a polarizer.

(Casting)

Preferably, the PVA resin dope solution prepared in the previous process is cast to form a film. The casting method is not specifically defined. Preferably, the PVA resin dope solution is heated and fed into a double-screw extruder, and cast onto a support through a casting means (preferably a die, more preferably a T-type slit die) via a gear pump for film formation thereon. The temperature of the resin solution to be cast through the die is not specifically defined.

The support is preferably a cast drum, and the diameter, the width, the rotating speed and the surface temperature of the drum are not specifically defined.

Subsequently, preferably, the obtained film is dried by alternately bringing the back and the surface thereof into contact with a drying roll.

(Swelling)

Though the swelling is preferably carried out using only water, a polarizer matrix may be swelled by an aqueous boric acid solution, thereby controlling the swelling degree to improve the optical performance stability and prevent wrinkling of the matrix in the production line as described in JP-A-10-153709.

The temperature and time of the swelling may be any one, and are preferably 10 to 60° C. and 5 to 2,000 seconds.

The film may be slightly extended at the time of a swelling process, for example, it may be preferably stretched to about 1.3 times.

(Dyeing)

The dyeing may be carried out using a method described in JP-A-2002-86554. The dyeing may be achieved by soaking, application or spraying of an iodine or dye solution, etc. Further, the dyeing may be carried out while controlling the iodine concentration, dyeing bath temperature, and stretch ratio in the bath and while stirring the solution in the bath as described in JP-A-2001-290025.

In the case of using the higher iodine ion as the dichroic molecule, in dyeing, a solution prepared by dissolving iodine in an aqueous potassium iodide solution is preferably used to obtain a high-contrast polarizer. The preferable mass ratio of iodine of iodine-cadmium potassium solution and the cadmium potassium is described in JP-A-2007-086748. A boron compound such as boric acid or borax may be added to the dyeing solution as described in Japanese Patent No. 3145747.

(Hardening)

In hardening, the film is preferably soaked in a crosslinking agent solution or coated with the solution, thereby adding a crosslinking agent to the film. The hardening may be carried out in several batches as described in JP-A-11-52130.

The crosslinking agent may be an agent described in U.S. Reissue Pat. No. 232,897. Also a boron compound such as boric acid or borax may be used as the crosslinking agent. The crosslinking agent is most preferably a boric acidic compound though it may be a polyvalent aldehyde for increasing the dimension stability as described in Japanese Patent No. 3357109. In the case of using boric acid as the crosslinking agent in the hardening, a metal ion may be added to an aqueous boric acid-potassium iodide solution. A compound containing the metal ion is preferably zinc chloride, and zinc salts including zinc halides such as zinc iodide, zinc sulfate, and zinc acetate may be used instead of zinc chloride as described in JP-A-2000-35512.

The PVA film is preferably hardened by soaking the film in an aqueous boric acid-potassium iodide solution containing zinc chloride and the preferable embodiment is described in JP-A-2007-086748.

In this, for enhancing the durability thereof in high-temperature environments, the film may be or may not be dipped in a known acid solution. For the treatment with an acid solution, referred to is the method described in JP-A-2001-83329, 6-254958, WO2006/095815.

(Stretching)

In stretching, a vertical monoaxial stretching method described in U.S. Pat. No. 2,454,515, etc. and a tentering method described in JP-A-2002-86554 can be preferably used. The stretch ratio is preferably 2 to 12 times, more preferably 3 to 10 times. It is preferred that the stretch ratio, the film thickness, and the polarizer thickness satisfies the condition of (Thickness of protective film-attached polarizer/Thickness of film)×(Total stretch ratio)>0.17 as described in JP-A-2002-040256, and that the width of the polarizer taken from final bath and the width of the polarizer at the time of attaching the protective film satisfies the condition of 0.80≤ (Width of polarizer at attaching protective film/Width of polarizer taken from final bath)≤0.95, as described in JP-A-2002-040247.

(Drying)

In drying, a known method described in JP-A-2002-86554 may be used, and the drying temperature is preferably 30 to 100° C., and the drying time is preferably 30 seconds to 60 minutes. It is also preferred that a heat treatment for controlling an in-water discoloring temperature at 50° C. or higher is carried out as described in Japanese Patent No. 3148513, and that an aging treatment under controlled temperature and humidity is carried out as described in JP-A-07-325215 and JP-A-07-325218.

Through the process, preferably, a polarizing element having a thickness of from 10 to 200 μm is produced. The film thickness may be controlled in any known method. For example, the thickness may be controlled by suitably defining the die slit width in the casting and by suitably defining the stretching condition.

<Method of Lamination of Polarizing Element and Protective Film to Polarizer>

In the polarizer production method of the second aspect of the invention, two protective films to a polarizer are laminated on both surfaces of the polarizing element prepared as above. As described in the above, one of the two protective films to a polarizer for use in the polarizer of the second aspect of the invention contains the above-mentioned organic acid, but preferably, another of the two does not contain the organic acid.

In the polarizer production method of the second aspect of the invention, preferably, the protective film to a polarizer is alkali-processed and then stuck to both surfaces of the polarizing element that is prepared by dipping and stretching a polyvinyl alcohol film in an iodine solution, using an aqueous solution of a completely-saponified polyvinyl alcohol, thereby producing the polarizer.

The adhesive to be used for sticking the polarizing element to the processed surface of the protective film to a polarizer includes, for example, polyvinyl alcohol adhesive of polyvinyl alcohol, polyvinyl butyral or the like, and vinyl latex adhesive of butyl acrylate or the like.

For sticking the protective film to a polarizer to the polarizing element in the polarizer production method of the second aspect of the invention, preferably, the two are so stuck to each other that the transmission axis of the polarizing element could be substantially parallel to the slow axis of the protective film to a polarizer.

In this, "substantially parallel" means that the difference between the direction of the main refractive index nx of the organic acid-containing protective film to a polarizer and the direction of the transmission axis of the polarizing element is within a range of 5°, preferably within 1°, more preferably within 0.5°. When the difference is within 1°, then it is favorable since the polarizance of the polarizer hardly lowers under cross Nicol and light leakage hardly occurs.

<Functionalization of Polarizer>

The polarizer used in the second aspect of the invention may be preferably used as a functionalized polarizer by combining with an antireflection film for increasing visibility of the display, a brightness increasing film, or an optical film having a functional layer such as a hard coating layer, a forward scattering layer, or an antiglare (antidazzle) layer. An antireflection film, a brightness increasing film, an optical film having a functional layer, a hard coating layer, a forward scattering layer and an antiglare layer used for functionalization of polarizer is described in [0257] to [0276] in JP-A-2007-086748, and a functionalized polarizer can be manufactured according to those descriptions.

(3-1) Antireflection Film

The polarizer used in the second aspect of the invention may be used in combination with an antireflection film. The antireflection film may be a film with a reflectivity of about 1.5% composed of a single layer of a low refractive material such as a fluorine polymer, or a film with a reflectivity of about 1% utilizing interference of thin layers. In the second aspect of the invention, it is preferred that a low refractive layer and at least one layer having a refractive index higher than that of the low refractive layer (a high refractive layer or an middle refractive layer) are stacked on a transparent substrate. Further, also antireflection films described in Nitto Giho, Vol. 38, No. 1, May 2000, Page 26 to 28, JP-A-2002-301783, etc. may be preferably used in the second aspect of the invention.

The refractive indexes of the layers satisfy the following relations.

Refractive index of high refractive layer>Refractive index of middle refractive layer>Refractive index of transparent substrate>Refractive index of low refractive layer The transparent substrate used for the antireflection film may be preferably the above mentioned transparent polymer film for the protective film to a polarizer.

The refractive index of the low refractive layer is preferably 1.20 to 1.55, more preferably 1.30 to 1.50. It is preferred that the low refractive layer is used as the outermost layer having an excoriation resistance and antifouling property. It is also preferred that a silicone-containing compound or a fluorine-containing compound, etc. is used for improving the slipping property of the surface to increase the excoriation resistance.

For example, compounds described in JP-A-9-222503, Paragraph 0018 to 0026, JP-A-11-38202, Paragraph 0019 to 0030, JP-A-2001-40284, Paragraph 0027 to 0028, JP-A-2000-284102, etc. can be preferably used as the fluorine-containing compound.

The silicone-containing compound preferably has a polysiloxane structure. Reactive silicones such as SILAPLANE available from Chisso Corporation and polysiloxanes having silanol end groups described in JP-A-11-258403, etc. can be used as the compound. An organic metal compound such as a silane coupling agent and a silane coupling agent having a particular fluorine-containing hydrocarbon group may be hardened by a condensation reaction in the presence of a catalyst, as described in JP-A-58-142958, JP-A-58-147483, JP-A-58-147484, JP-A-9-157582, JP-A-11-106704, JP-A-2000-117902, JP-A-2001-48590, JP-A-2002-53804, etc.

The low refractive layer may preferably contain another additive such as a filler (e.g. low refractive inorganic compound having an average primary particle size of 1 to 150 nm composed of silicon dioxide (silica) or a fluorine-containing compound (magnesium fluoride, calcium fluoride, barium fluoride, etc.), a fine organic particle described in JP-A-11-3820, Paragraph 0020 to 0038), a silane coupling agent, a slipping agent, or a surfactant.

The low refractive layer may be formed by a gas phase method such as a vacuum deposition method, a sputtering method, an ion plating method, or a plasma CVD method, and is preferably formed by a coating method advantageous in low costs. Preferred examples of the coating methods include dip coating methods, air-knife coating methods, curtain coating methods, roller coating methods, wire bar coating methods, gravure coating methods, and microgravure coating methods.

The thickness of the low refractive layer is preferably 30 to 200 nm, more preferably 50 to 150 nm, most preferably 60 to 120 nm.

The middle refractive layer and the high refractive layer are preferably such that high refractive inorganic compound ultrafine particles with an average particle size of 100 nm or less are dispersed in a matrix material. The high refractive inorganic compound fine particles are preferably composed of an inorganic compound having a refractive index of 1.65 or more such as an oxide of Ti, Zn, Sb, Sn, Zr, Ce, Ta, La, In, etc. or a multiple oxide containing the metal atom.

The ultrafine particles may be used such that the particle surfaces are treated with a surface treatment agent such as a silane coupling agent described in JP-A-11-295503, JP-A-11-153703, JP-A-2000-9908, etc., or an anionic compound or organic metal coupling agent described in JP-A-2001-310432, etc., such that a core-shell structure is formed by using high refractive particles as cores as described in JP-A-2001-166104, or such that a particular dispersant is used in combination as described in JP-A-11-153703, U.S. Pat. No. 6,210,858B1, JP-A-2002-2776069, etc.

The matrix material may be a known thermoplastic resin or hardening resin coating, etc., and may be a polyfunctional material described in JP-A-2000-47004, JP-A-2001-315242, JP-A-2001-31871, JP-A-2001-296401, etc. or a hardening film derived from a metal alkoxide composition described in JP-A-2001-293818, etc.

The refractive index of the high refractive layer is preferably 1.70 to 2.20. The thickness of the high refractive layer is preferably 5 nm to 10 μm, more preferably 10 nm to 1 μm.

The refractive index of the middle refractive layer is controlled at a value between those of the low refractive layer and the high refractive layer. The refractive index of the middle refractive layer is preferably 1.50 to 1.70.

The haze of the antireflection film is preferably 5% or less, more preferably 3% or less. The strength of the film is preferably H or more, more preferably 2H or more, most preferably 3H or more, in a pencil hardness test in accordance with JIS K5400.

(3-2) Brightness Increasing Film

In the second aspect of the invention, the polarizer may be used in combination with a brightness increasing film. The brightness increasing film has a function of separating a circular polarized light or a linearly polarized light, is placed between the polarizer and a backlight, and reflects or scatters a circular polarized light or linearly polarized light backward to the backlight. The light reflected by the backlight is in a partly changed polarization state, and is injected again to the brightness increasing film and the polarizer. In this case, a part of the light is transmitted therethrough, whereby the light utilization ratio is increased by repeating the processes to improve the front brightness about 1.4 times. In the second aspect of the invention, the polarizer may be used in combination with a known brightness increasing film such as an anisotropy reflection type film or an anisotropy scattering type film.

A known anisotropy reflection type brightness increasing film is such that uniaxially stretched films and unstretched films are stacked to enlarge the refractive index difference in the stretch direction, thereby showing a reflectivity and a transmittance anisotropy. Such brightness increasing films include multilayer films using dielectric mirror described in WO 95/17691, WO 95/17692, and WO 95/17699, and cholesteric liquid crystal films described in EP No. 606940A2 and JP-A-8-271731. In the second aspect of the invention, DBEF-E, DBEF-D, and DBEF-M available from 3M is preferably used as the multilayer brightness increasing film using the dielectric mirror principle, and NIPOCS available from Nitto Denko Corporation is preferably used as the cholesteric liquid crystal brightness increasing film. NIPOCS is described in Nitto Giho, Vol. 38, No. 1, May 2000, Page 19 to 21, etc.

In the second aspect of the invention, also an anisotropy scattering type brightness increasing film prepared by blending a positive intrinsic birefringence polymer and a negative intrinsic birefringence polymer and by uniaxial stretching, described in WO 97/32223, WO 97/32224, WO 97/32225, WO 97/32226, JP-A-9-274108, and JP-A-11-174231, is preferably used in combination. DRPF-H available from 3M is preferably used as the anisotropy scattering type brightness increasing film.

In the second aspect of the invention, the polarizer is preferably used in combination with a functional optical film having a hard coating layer, a forward scattering layer; an antiglare (antidazzle) layer, a gas barrier layer, a slipping layer, an antistatic layer, an undercoat layer, a protective layer, etc. Further, it is preferred that these functional layers are combined with the antireflection layer of the antireflection film or the optically anisotropic layer in one layer. These functional layers maybe formed on one or both of the polarizer side and the opposite side near the air interface.

(3-3) Hard Coating Layer

The polarizer is preferably combined with a functional optical film prepared by forming a hard coating layer on a transparent substrate to improve the mechanical strength such as excoriation resistance. Particularly in the case of forming the hard coating layer in the above antireflection film, the hard coating layer is preferably formed between the transparent substrate and the high refractive layer.

The hard coating layer is preferably formed by a crosslinking reaction of a hardening compound by light and/or heat, or a polymerization reaction. A hardening functional group of the compound is preferably a photopolymerizable group, and an organic alkoxysilyl compound is preferably used as a hydrolyzable functional group-containing, organic metal compound. A hard coating layer composition described in JP-A-2002-144913, JP-A-2000-9908, and WO 00/46617, etc. is preferably used in the second aspect of the invention.

The thickness of the hard coating layer is preferably 0.2 to 100 μm.

The strength of the hard coating layer is preferably H or more, more preferably 2H or more, most preferably 3H or more, by a pencil hardness test in accordance with JIS K5400. Further, in a taber test according to JIS K5400, the hard coating layer more preferably has a smaller abrasion.

Compounds having an unsaturated ethylenic group and compounds having a ring opening polymerizable group can be used as materials for the hard coating layer, and the compounds may be used singly or in combination. Preferred examples of the compounds having the unsaturated ethylenic groups include polyol polyacrylates such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether and diacrylate of hexanediol diglycidyl ether; and urethane acrylates prepared by a reaction of a polyisocyanate and a hydroxyl-containing acrylate such as hydroxyethyl acrylate. Examples of commercially available compounds include EB-600, EB-40, EB-140, EB-1150, EB-1290K, IRR214, EB-2220, TMPTA, and TMPTMA available from Daicel ucb, and UV-6300 and UV-1700B available from Nippon Synthetic Chemical Industry Co., Ltd.

Preferred examples of the compounds having a ring opening polymerizable group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ethers of cresol novolac resins, and polyglycidyl ethers of phenol novolac resins; alicyclic epoxys such as CELOXIDE 2021P, CELOXIDE 2081, EPOLEAD GT-301, EPOLEAD GT-401, and EHPE3150CE available from Daicel Chemical Industries, Ltd., and polycyclohexyl epoxymethyl ether of phenol novolac resins; oxetanes such as OXT-121, OXT-221, OX-SQ, and PNOX-1009 available from Toagosei Co., Ltd. Further, polymers of glycidyl(meth)acrylate, and copolymers of glycidyl(meth)acrylate and a monomer copolymerizable there with may be used for the hard coating layer.

It is preferred that fine particles of oxides of silicon, titanium, zirconium, aluminum, etc., crosslinked particles of polyethylenes, polystyrenes, poly(meth)acrylic esters, polydimethylsiloxanes, etc., and organic crosslinked fine particles such as crosslinked rubber particles of SBR, NBR, etc. are added to the hard coating layer to reduce hardening shrinkage of the hard coating layer, increase the adhesion to the substrate, and reduce curling of the hard coating product. The average particle size of these crosslinked fine particles is preferably 1 to 20,000 nm. The shape of the crosslinked fine particles is not particularly limited, and may be a spherical shape, rod-like shape, needle-like shape, tabular shape, etc. The amount of the fine particles is preferably such that the fine particle content of the hardened hard coating layer is 60% or less by volume. The fine particle content is more preferably 40% or less by volume.

In the case of adding the above described inorganic fine particles, which are poor in affinity for binder polymers generally, a surface treatment is preferably carried out using a surface treatment agent having a metal such as silicon, aluminum, or titanium, and a functional group such as an alkoxide group, a carboxylic acid group, a sulfonic acid group, or a phosphonic acid group.

The hard coating layer is hardened preferably by heat or an activation energy ray, and more preferably by an activation energy ray such as a radioactive ray, a gamma ray, an alpha ray, an electron ray, or a ultraviolet ray, and particularly preferably by an electron ray or a ultraviolet ray in view of safeness and productivity. In the case of the heat hardening, the heating temperature is preferably 140° C. or lower, more preferably 100° C. or lower, in view of the heat resistance of the plastic.

(3-4) Forward Scattering Layer

The forward scattering layer is used for improving the viewing angle properties (the hue and brightness distribution) in the directions of up, down, left, and right, of the liquid crystal display device containing the polarizer according to the second aspect of the invention. In the second aspect of the invention, the forward scattering layer is preferably composed of fine particles with different refractive indexes dispersed in a binder. For example, the forward scattering layer may have such a structure that the forward scattering coefficient is particularly controlled as described in JP-A-11-38208, that relative refractive indexes of a transparent resin and fine particles are particularly controlled as described in JP-A-2000-199809, or that the haze is controlled at 40% more as described in JP-A-2002-107512. Further, it is preferred that the polarizer is used in combination with LUMISTY described in Sumitomo Chemical Co., Ltd., Technical Report, Optical functional film, page 31 to 39 to control the haze viewing angle properties.

(3-5) Antiglare Layer

The antiglare (antidazzle) layer is used for scattering a reflected light to prevent glare. The antiglare function is obtained by forming concavity and convexity on the outermost surface of the liquid crystal display device. The haze of the optical film having the antiglare function is preferably 3 to 30%, more preferably 5 to 20%, most preferably 7 to 20%.

The concavity and convexity is preferably formed on the film surface by a method of adding fine particles (JP-A-2000-271878, etc.), a method of adding a small amount (0.1 to 50% by mass) of relatively large particles having a size of 0.05 to 2 μm (JP-A-2000-281410, JP-A-2000-95893, JP-A-2001-100004, JP-A-2001-281407, etc.), or a method of physically transferring the concavity and convexity to the film surface (such as a embossing method described in JP-A-63-278839, JP-A-11-183710, JP-A-2000-275401, etc.).

[Liquid Crystal Display Devise]

Next, the liquid crystal display of the second aspect of the invention is described.

The liquid crystal display of the second aspect of the invention is characterized by including at least one polarizer of the second aspect of the invention.

Preferable embodiment of the liquid crystal display of the second aspect of the invention is the same as the preferable embodiment of the liquid crystal display of the first aspect of the invention.

[[Third Aspect of the Invention]]

Next, the third aspect of the invention is described hereinunder.

From the same viewpoint as the second aspect of the invention, in recent, a polarizer used for a liquid crystal display have been expected strongly to improve both a polarizer durability under high temperature and high humidity and a polarizer durability under high temperature and low humidity.

For the above, a method of making the pH of the protective film to a polarizer fall in an acid region or a method of making the pH of the polarizing element itself fall in an acid region has been investigated for improving the polarizing element durability in high-temperature and high-humidity environments. As one example of the former, Japanese Patent 4136054 discloses a protective film to a polarizer that uses cellulose acetate flakes containing an acid having an acid dissociation constant in the aqueous solution thereof of from 1.95 to 4.50. As one example of the latter, WO2006/095815 discloses a method for producing a polarizing element excellent in wet heat durability and preferably excellent in dry heat durability, by processing, after stretching treatment thereof, a polyvinyl resin film containing iodine, an iodide, a crosslinking agent and/or a waterproofing agent with an acid processing solution having pH of $2.4 \leq pH < 6.0$.

On the other hand, some methods are known for improving the polarizing element durability by making the pH of the layer between the protective film to a polarizer and the polarizing element fall in an acid region. For example, Japanese Patent 3977064 discloses a method of providing a layer that contains an dissociating organic acid group-having polyester resin between the protective film to a polarizer and the polarizing element. JP-A-2004-12578 discloses a method of adding a hydroxycarboxylic acidic compound with a substituent having a small carbon number to the adhesive layer.

The present inventors investigated the polarizing element durability of the film containing the compound described in Japanese Patent 4136054, especially containing citric acid or its salt used in Examples in the patent reference, and have known that the polarizing element durability in high-temperature and high-humidity environments could surely be improved but the polarizing element durability in high-temperature low-humidity environments is rather worsened.

In addition, the inventors investigated the method described in WO2006/095815, and have known that, in order to improve the transmittance change to the level recently required in the art, the concentration of the weak acid to be used must be remarkably increased up to the level described in Example 13 in the patent reference, and even so, the requirement could be satisfied only in some way, or that is, the method disclosed in the patent reference is still unsatisfactory from the viewpoint of the production cost, and requires further improvements.

Further, the inventors investigated the method of making the pH of the layer between the protective film to a polarizer and the polarizing element fall in an acid region described in Japanese Patent 3977064 and JP-A-2004-12578, and have known that the method is still unsatisfactory for improving the transmittance change to the level recently required in the art, and have additionally known that, when L-lactic acid described in JP-A-2004-12578 is used, then the polarizing element durability in high-temperature and low-humidity environments is rather worsened.

Specifically, a polarizer excellent both in the polarizing element durability in high-temperature and high-humidity environments and in the polarizing element durability in high-temperature and low-humidity environments is heretofore not known, and improvements on polarizers are desired.

An object of the third aspect of the invention is to provide a polarizer improved in point of the polarizing element durability in high-temperature and high-humidity environments not worsening the polarizing element durability in high-temperature and low-humidity environments, and to provide a liquid crystal display device that uses the polarizer.

The present inventors have assiduously studied for the purpose of solving the above-mentioned problems and, as a result, have found that when a layer that contains an organic acid having a specific hydrophobic group satisfying a specific carbon number range, such as typically a long-chain alkyl group, is provided between the polarizing element and the protective film to a polarizer, then the cross-transmittance increase in the polarizing element when aged in high-temperature and high-humidity environments can be noticeably inhibited and further the cross-transmittance change therein in high-temperature and low-humidity environments can be low.

According to the third aspect of the invention, there are provided a polarizer improved in point of the polarizing element durability in high-temperature and high-humidity environments not worsening the polarizing element durability in high-temperature and low-humidity environments, and a liquid crystal display device that uses the polarizer.

[Polarizer]

The polarizer of the third aspect of the invention comprising a polarizing element and at least one protective film to a polarizer (hereinafter this may be referred to as a transparent protective film) and has, between the polarizing element and the protective film to a polarizer, a layer containing an organic acid of the following formula (1) in an amount of from 0.01 to 10 g/m² (hereinafter the layer may be referred to as a layer containing an organic acid of formula (1)).

$$X\text{-}L\text{-}(R^1)_n \qquad \text{Formula (1)}$$

wherein X represents an acid group having an acid dissociation constant of at most 5.5, L represents a single bond or a divalent or more polyvalent linking group, $R^1$ represents an alkyl group having from 6 to 30 carbon atoms, an alkenyl group having from 6 to 30 carbon atoms, an alkynyl group having from 6 to 30 carbon atoms, an aryl group having from 10 to 30 carbon atoms or a heterocyclic group having from 6 to 30 carbon atoms, and may have an additional substituent, n indicates 1 when L is a single bond, and indicates (valence of L−1) when L is a divalent or more polyvalent linking group.

The polarizer of the third aspect of the invention comprising a polarizing element and at least one protective film to a polarizer and has, between the polarizing element and the protective film to a polarizer, a layer containing an organic acid of formula (1).

Preferably, the polarizer of the third aspect of the invention comprising a polarizing element and two protective films to a polarizer (transparent protective films) disposed on both sides of the polarizing element, and has, between at least one protective film to a polarizer and the polarizing element, a layer containing an organic acid of formula (1).

More preferably, the polarizer of the third aspect of the invention comprising a polarizing element and two protective films to a polarizer disposed on both sides of the polarizing element, and has, between the two protective films to a polarizer and the polarizing element, a layer containing an organic acid of formula (1).

In the polarizer of the third aspect of the invention, the polarizing element and the protective film to a polarizer are laminated via a polarizing element-neighboring, layer. In this description, "polarizing element-neighboring layer" means a layer that exists between the polarizing element and the protective film to a polarizer and is in direct contact with the polarizing element.

The polarizer of the third aspect of the invention is described below in point of the properties of the polarizer, the polarizing element, the protective film to a polarizer, the layer containing an organic acid of formula (1), the other layers, the functionalization of polarizer and the polarizer production method in that order.

<Properties of Polarizer>

Having the constitution as above, the polarizer of the third aspect of the invention is improved in point of the polarizing element durability in high-temperature and high-humidity environments not worsening the polarizing element durability in high-temperature and low-humidity environments.

In this description, the polarizing element durability is evaluated by measuring the cross-transmittance change in the polarizer in a specific environment.

(Cross-Transmittance CT)

Preferably, the cross-transmittance CT of the polarizer of the third aspect of the invention is CT≤2.0, more preferably CT≤1.3, even more preferably CT≤0.6 (the unit is %).

(Cross-Transmittance Change)

In the polarizer durability test, the cross-transmittance change in the polarizer of the third aspect of the invention is preferably smaller.

When left at 60° C. and at a relative humidity of 95% for 500 hours, the single plate cross-transmittance change (%) in the polarizer of the third aspect of the invention is preferably at most 0.60%, and when left in a dry environment at 80° C. (with no moisture control, and in Examples of the third aspect of the invention, the relative humidity in the dry environment is from 0% to 20%) for 500 hours, the single plate cross-transmittance change (%) in the polarizer is preferably at most 0.10%.

More preferably, the single plate cross-transmittance change (%) in the polarizer when left at 60° C. and at a relative humidity of 95% for 500 hours is at most 0.30%, even more preferably at most 0.25%. On the other hand, the single plate cross-transmittance change (%) in the polarizer when left in a dry environment at 80° C. for 500 hours is more preferably at most 0.05%. "Change" as referred to herein means the value computed by subtracting the value before the test from the value after the test.

When the polarizer satisfies the range of the cross-transmittance change as above, it is favorable since the polarizer can secure the stability in long-term use or storage thereof in high-temperature and high-humidity environments and in high-temperature and low-humidity environments.

The cross-transmittance CT of the polarizer of the third aspect of the invention is measured with an automatic polarizing film analyzer VAP-7070 (manufactured by JASCO Corporation). A sample of the polarizer was analyzed ten times each at 410 nm or 680 nm, and the found data were averaged.

The polarizer durability test is as follows: A sample (about 5 cm×5 cm) of the polarizer is stuck to a glass sheet with an adhesive, and two of the samples are prepared. In measurement of the single plate cross-transmittance thereof, the sample is set before a light source in such a manner that the film side of the sample could face the light source. The found data are averaged to give the single plate cross-transmittance of the polarizer.

(Other Properties)

The other preferred optical properties of the polarizer of the third aspect of the invention are described in [0238] to [0255] of JP-A-2007-086748, and preferably, the polarizer of the invention fulfills these properties.

<Polarizing Element>

The polarizing element for use in the polarizer of the third aspect of the invention is described.

The polarizing element for use in the polarizer of the third aspect of the invention includes an iodine-based polarizing element, a dye-based polarizing element using a dichroic dye, and a polyene-based polarizing element. Preferably, the polarizing element in the third aspect of the invention is composed of a polyvinyl alcohol (PVA) and a dichroic molecule; however, a polyvinylene-based polarizing element may also be used, which is prepared by dehydrating and dechlorinating PVA or polyvinyl chloride to form a polyene structure followed by aligning it, as in JP-A-11-248937.

(1-1) PVA

Preferable embodiment of PVA used in the third aspect of the invention is the same as the preferable embodiment of PVA used in the second aspect of the invention.

(1-2) PVA

Preferable embodiment of a dichroic molecule used in the third aspect of the invention is the same as the preferable embodiment of a dichroic molecule used in the second aspect of the invention.

(1-3) Organic Acid:

Not contradictory to the scope and the sprit of the third aspect of the invention, the polarizer may contain an inorganic acid between the polarizing element and the protective film to a polarizer as mentioned below.

In that case, the content of the organic acid is preferably from 0.01 to 10 parts by mass relative to the resin used in the base material film of the polarizing element. When the content is at least 0.01 parts by mass, then the polarizer can readily secure the polarizing element durability-enhancing effect; and when at most 10 parts by mass, then the polarizing element is hardly whitened owing to phase separation therein. The content of the organic acid is more preferably from 0.1 to 8 parts by mass, even more preferably from 0.1 to 5 parts by mass.

The polarizer of the third aspect of the invention contains the above-mentioned organic acid in the layer that contains an organic acid of formula (1) in an amount of from 0.01 to 10 g/m$^2$, between the polarizing element and the protective film to a polarizer as mentioned below, and therefore the effect of the polarizer of the third aspect of the invention can be fully secured even though the polarizing element does not contain an organic acid.

(1-4) Thickness of Polarizing Element

Preferable embodiment of a thickness of a polarizing element used in the third aspect of the invention is the same as the preferable embodiment of a thickness of a polarizing element used in the second aspect of the invention.

For production of the polarizing element, referred to is the method described in [0213] to [0255] of JP-A-2007-86748.

<Protective Film to Polarizer>

The protective film to a polarizer for use in the polarizer of the third aspect of the invention is described below.

Preferred embodiments of the film base material resin and the additive for use in the protective film to a polarizer, and those of the protective film to a polarizer are described below.

(2-1) Properties of Protective Film to Polarizer:

Preferably, the protective film to a polarizer fulfils the following properties.

In case where the polarizer of the third aspect of the invention contains two protective films to a polarizer, the two films may be the same or different.

From the viewpoint that the polarizer of the third aspect of the invention can fully secure light transmission through it, the light transmittance of the protective film to a polarizer is preferably at least 85%, more preferably at least 88%, even more preferably at least 90%. The haze of the protective film to a polarizer is preferably at most 2%, more preferably at most 1.5%, even more preferably at most 1.0%.

The thickness of the protective film to a polarizer is generally from 20 to 300 μm, preferably from 25 to 200 μm, more preferably from 30 to 100 μm.

As the protective film to a polarizer, preferred is use of commercially-available cellulose triacetate films (Fujitac TD80UF, by FUJIFILM), alicyclic structure-having polymer resin films described in JP-A-2006-58322, and acrylic resins described in JP-A-2009-122644.

(2-2) Resin:

The protective film to a polarizer fulfilling the above properties is preferably a transparent resin film. The protective film to a polarizer is preferably a film mainly containing a thermoplastic resin, and may further contain an additive.

Examples of the resin for use for the protective film to a polarizer include cellulose ester resins, polycarbonate resins, polyester carbonate resins, polyarylate resins, polysulfone resins, polyether sulfone resins, cycloolefin resins such as norbornene resins, polystyrene resins, polyacrylate resins, polymethacrylate resins, polyester resins, and imide resins such as olefin maleimide resins, glutarimide resins. One or more of these may be used here either singly or as combined. Of the above resins, more preferred are cellulose ester resins, cycloolef in resins, polystyrene resins and imide resins of which the birefringence through molecular alignment as well as the photoelastic coefficient is relatively small.

Preferably, the resins have a glass transition temperature of not lower than 100° C., more preferably not lower than 120° C.

Preferably, the protective film to a polarizer is formed of a single resin or a resin composition, and may be a composite film that comprising plural layers of those resins or compositions.

(2-3) Production Method for Protective film to a Polarizer:

The protective film to a polarizer may be produced in any known film formation method, and the film formation method is not specifically defined. Prior to film formation, predrying the resin or the pellets to be used is effective for preventing the formed film from foaming or having failure. In particular, in case where an imide resin or a cycloolefin resin is used, preferred is film formation according to a melt casting method since the formed film could hardly have retardation owing to molecular alignment in working. In case where the film is formed according to a melt casting method, any known method is employable, including a melt extrusion method such as a T-die method or an inflation method, as well as a calendering method, a hot pressing method, an injection molding method, etc. From the viewpoint of readily obtaining a wide film having a good thickness accuracy, the melt casting method using a T-die is preferred. From the viewpoint of obtaining a film having an extremely uniform thickness accuracy, a solution casting method is also preferred. According to these film formation methods, transparent films free from defects such as die lines and having a small film thickness fluctuation of at most 5% can be obtained.

(2-2) Addition of Additives

Preferable embodiment of additives added to the protective film to a polarizer used in the third aspect of the invention is the same as the preferable embodiment of additives added to the protective film to a polarizer used in the second aspect of the invention.

(2-3) Saponification

Preferable embodiment of a saponification of the protective film to a polarizer used in the third aspect of the invention is the same as the preferable embodiment of a saponification of the protective film to a polarizer used in the second aspect of the invention.

<Layer containing Organic Acid represented by Formula (1)>

The polarizer of the third aspect of the invention includes a polarizing element and at least one sheet of a protective film to a polarizer, and includes a layer which contains from 0.01 to 10 $g/m^2$ of the organic acid represented by the following Formula (1) (a layer containing the organic acid represented by the Formula (1)) between the polarizing element and the protective film to a polarizer.

$$X\text{-}L\text{-}(R^1)_n \qquad \text{Formula (1)}$$

wherein X represents an acid group wherein the acid dissociation constant is 5.5 or less; L represents a single bond, or a di- or more valent linking group; $R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent; n represents 1 when L is a single bond, or represents the number expressed by:

(the valent number of L)−1 when L is a di- or more valent linking group.

Hereinafter describes the layer containing the organic acid represented by the Formula (1).

(3-1) Organic Acid

Hereinafter describes details of the organic acid represented by the Formula (1), at first.

Having the layer that contains an organic acid of formula (1), the polarizer of the third aspect of the invention can be remarkably improved in point of the polarizing element durability when aged in high-temperature and high-humidity environments and in high-temperature and low-humidity environments. The effect could not be attained when an ordinary inorganic acid or an ordinary organic acid is used.

The preferred range of the structure of the organic acid of formula (1) for use in the third aspect of the invention is the same as that of the organic acid of formula (1) for use in the first aspect of the invention.

In the third aspect of the invention, log P of the organic acid of formula (1) is preferably from 3 to 7, more preferably from 3.5 to 6. As defined to have log P of at least 3, the organic acid can be so controlled that it can move to the polarizing element only when aged in high-temperature and high-humidity environments, and therefore the polarizing element durability in high-temperature and high-humidity environments can be thereby improved not worsening the polarizing element durability in high-temperature and low-humidity environments. On the other hand, when defined to have log P of at most 7, the organic acid does not increase the haze of the protective film to a polarizer to which it is added.

(Acid Dissociation Constant)

In the third aspect of the invention, the organic acid of formula (1) preferably has an acid dissociation constant at 25° C. of at most 6, more preferably at most 5.

(Molecular Weight of Organic Acid)

In the third aspect of the invention, the molecular weight of the organic acid of formula (1) is preferably from 200 to 1000, more preferably from 250 to 900, even more preferably from 300 to 800. Also preferably, the organic acid of formula (1) is not a polymer having a recurring unit.

(Content of Organic Acid)

In the third aspect of the invention, the content of the organic acid of formula (1) is preferably from 0.01 $g/m^2$ to 10 $g/m^2$. When the content is at least 0.01 $g/m^2$, then the polarizer is readily given the polarizing element durability improving effect; and when at most 10 $g/m^2$, the haze of the polarizer increases little. More preferably, the content of the organic acid of formula (1) is from 0.1 $g/m^2$ to 6 $g/m^2$, even more preferably from 0.3 $g/m^2$ to 3 $g/m^2$. In the third aspect of the invention, the content of the organic acid of formula (1) is preferably from 0.2 to 20 $mmol/m^2$, more preferably from 0.5 to 18 $mmol/m^2$, even more preferably from 0.8 to 15 $mmol/m^2$. The content of the organic acid of formula (1) means the weight (g) or the substance amount (mmol) of the organic acid per $m^2$ of the layer containing the organic acid of formula (1).

(3-2) Location of Layer Containing Organic Acid of Formula (1):

The polarizer of the third aspect of the invention contains at least the layer containing the organic acid of formula (1) between the polarizing element and the protective film to a polarizer therein. In case where only one layer is laminated between the polarizing element and the protective film to a polarizer, then the layer containing the organic acid of formula (1) is necessarily the polarizing element-neighboring layer.

On the other hand, the polarizer of the third aspect of the invention may contain any other layer than the layer containing the organic acid of formula (1) between the polarizing element and the protective film to a polarizer; and in this case, the layer containing the organic acid of formula (1) may be the polarizing element-neighboring layer or the other layer than the layer containing the organic acid of formula (1) may be the polarizing element-neighboring layer. Especially preferably among them, the organic acid of formula (1) is added to the polarizing element-neighboring layer.

Specifically, in any embodiment, it is desirable that the organic acid of formula (1) is added to the polarizing element-neighboring layer from the viewpoint that the organic acid of formula (1) can be more readily localized in the interface to the polarizing element and the polarizing element durability can be more efficiently enhanced thereby. Preferably, therefore, in the polarizer of the third aspect of the invention, the layer containing the acid of formula (1) in an amount of from 0.01 to 10 $g/m^2$ is the polarizing element-neighboring layer.

In the polarizer of the third aspect of the invention, it is desirable that the organic acid of formula (1) is contained in the layer existing between the polarizing element and the protective film to a polarizer but not in the polarizing element or in the protective film to a polarizer, from the viewpoint of preventing the polarizing element from being degraded.

<Other Layers>

The polarizer of the third aspect of the invention may contain nay other layers. The other layers include easy-adhesion layer, pressure-sensitive adhesive agents layer (paste layer), adhesive layer, antistatic layer, and other functional layers described in the section of <Functionalization of Polarizer> given hereinunder. The easy-adhesion layer, the paste layer, the adhesive layer, the antistatic layer and other functional layers may be the above-mentioned polarizing element-neighboring layer.

(4-1) Easy-Adhesion Layer

Preferably, the surface of the optical compensation layer that adheres to the polarizer is applied with an easy-adhesion treatment to form an easy-adhesion layer. The easy-adhesion treatment is preferably a treatment of coating with resin materials. Preferable examples of the resin material include silicon resins, urethane resins, and acrylic resins.

The thickness of the easy-adhesion layer is preferably in the range from 5 nm to 100 nm and more preferably in the range from 10 nm to 80 nm.

The adhesive layer may be provided on the polarizing element side, on the protective film to a polarizer side, or on both of the polarizing element side and the protective film to a polarizer side.

(4-2) Pressure-Sensitive Adhesive Agents Layer:

In the polarizer of the third aspect of the invention, the constitutive layers maybe be stuck to the polarizing element and the protective film to a polarizer via a pressure-sensitive adhesive agents layer (paste layer). The paste layer formed of pressure-sensitive adhesive agents (a paste) may be the polarizing element-neighboring layer.

In this case, any appropriate pressure-sensitive adhesive agents can be employed as the pressure-sensitive adhesive agent. Examples of the pressure-sensitive adhesive agent include a solvent pressure-sensitive adhesive agent, a non-aqueous emulsion pressure-sensitive adhesive agent, an aqueous pressure-sensitive adhesive agent, a hot-melt pressure-sensitive adhesive agent, and the like. Among them, a solvent pressure-sensitive adhesive agent containing an acrylic polymer as a base polymer is preferably used. This is because such a pressure-sensitive adhesive agent shows reasonable pressure-sensitive adhesion properties (e.g., wettability, aggregability, and adhesiveness) to the polarizer and the optical compensation layer and is superior in optical transparency, weather resistance, and heat resistance.

The thickness of the pressure-sensitive adhesive agent layer can be set suitably depending on the intended use, adhesive force, and the like. For example, the thickness of the pressure-sensitive adhesive agent layer is preferably in the range from 1 μm to 100 μm, more preferably in the range from 3 μm to 50 μm, further preferably in the range from 5 μm to 30 μm, and particularly preferably in the range from 10 μm to 25 μm.

(4-3) Adhesive Layer:

In the polarizer of the third aspect of the invention, the constitutive layers maybe be stuck to the polarizing element and the protective film to a polarizer via an adhesive layer.

The adhesive layer may be an adhesive agent layer. The adhesive agent layer can be formed by coating the surface of at least one of the optical compensation layer and the polarizer with a coating solution that contains an adhesive agent at a predetermined ratio, and then drying. Any appropriate methods can be employed for the method for preparing the coating solution. As the coating solution, for example, a commercially available solution or a dispersion liquid may be used directly or a commercially available solution or a dispersion liquid to which a solvent is further added may be used. In addition, a solid content may be dissolved or dispersed in each solvent.

As the adhesive agent, adhesive agents having any appropriate properties, forms, and adhesive mechanisms can be used depending on the intended use. Examples of the adhesive agent include a water-soluble adhesive agent, an ultraviolet curable (UV curable) adhesive agent, an emulsion adhesive agent, a latex adhesive agent, a mastic adhesive agent, a double-layered adhesive agent, a paste adhesive agent, a foam adhesive agent, a supported film adhesive agent, a thermoplastic adhesive agent, a thermofusion adhesive agent, a thermosolidification adhesive agent, a hot-melt adhesive agent, a thermoactive adhesive agent, a heat-seal adhesive agent, a thermosetting adhesive agent, a contact adhesive agent, a pressure-sensitive adhesive agent, a polymeric adhesive agent, a solvent adhesive agent, a solvent active adhesive agent, and the like. Among them, in case where the polarizer of the third aspect of the invention where the polarizing element-neighboring layer is an adhesive agent layer, a water-soluble adhesive agent that is superior in transparency, adhesiveness, workability, quality of a product, and economic efficiency is preferably used.

(A) Water-Soluble Adhesive Agent

The water-soluble adhesive agent may contain at least one of a water-soluble natural polymer and a water-soluble synthetic polymer. Examples of the natural polymer include proteins, starches, and the like. Examples of the synthetic polymer include resol resins, urea resins, melamine resins, polyethylene oxides, polyacrylamides, polyvinylpyrrolidones, acrylic esters, methacrylate esters, polyvinyl alcohol resins, and the like. Among them, a water-soluble adhesive agent that contains a polyvinyl alcohol resin is preferably used. In the polarizer of the third aspect of the invention, the polarizing element-neighboring layer preferably includes a water-soluble adhesive agent that contains a polyvinyl alcohol resin because it is excellent in adhesiveness with the polarizer and is superior in adhesiveness with the protective film to a polarizer.

Examples of the polyvinyl alcohol resin include a saponifiable matter of polyvinyl acetate; a derivative of the saponifiable matter; a saponifiable matter of a copolymer of vinyl acetate and a copolymerizable monomer; modified polyvinyl alcohols obtained, for example, by acetalizing, urethanizing, etherifying, grafting, esterifying polyvinyl alcohols; and the like. Examples of the monomer include unsaturated carboxylic acids such as a maleic acid, a maleic acid anhydride, a fumaric acid, a crotonic acid, an itaconic acid, an acrylic acid, a methacrylic acid, and the like; esters thereof; .alpha.-olefins such as ethylene, propylene, and the like; aryl sulfonic acid; methallyl sulfonic acid; sodium aryl sulfonate; sodium methallyl sulfonate; sodium sulfonate; sodium sulfonate monoalkylmalate; sodium disulfonate alkylmalate; N-methylol acrylamide; acrylamide alkyl sulfonate alkali salt; N-vinylpyrrolidone; a derivative of N-vinylpyrrolidone; and the like. One of these resins may be used alone or two or more of them may be used in combination.

A water-soluble adhesive agent that contains a modified polyvinyl alcohol resin having an acetoacetyl group (acetoacetyl group-containing polyvinyl alcohol resin) is further preferably used as the water-soluble adhesive agent that contains a polyvinyl alcohol resin.

Examples of the acetoacetyl group-containing polyvinyl alcohol resin include "GOHSENOL Z" series (product name), "GOHSENOL NH" series (product name), and "GOHSEFIMER Z" series (product name), produced by Nippon Synthetic Chemical Industry Co., Ltd., and the like.

The acetoacetyl group-containing polyvinyl alcohol resin can be obtained by reacting a polyvinyl alcohol resin with diketene by any method. Examples of the aforementioned method are as follows: a method in which diketene is added to a dispersion element that is obtained by dispersing a polyvinyl alcohol resin in a solvent such as an acetic acid or the like; a method in which diketene is added to a solution that is obtained by dissolving a polyvinyl alcohol resin in a solvent such as dimethylformamide, dioxane, or the like; and a method in which gaseous diketene or liquid diketene is brought into contact with a polyvinyl alcohol resin directly.

The modification degree of the acetoacetyl group of the acetoacetyl group-containing polyvinyl alcohol resin is, for example, 0.1 mol % or more. By setting the modification degree of the acetoacetyl group in the aforementioned range, a polarizer further superior in water resistance can be obtained. The modification degree of the acetoacetyl group is preferably in the range from 0.1 mol % to 40 mol %, more preferably in the range from 1 mol % to 20 mol %, and further preferably in the range from 2 mol % to 7 mol %. The modification degree of the acetoacetyl group is, for example, a value measured by a nuclear magnetic resonance (NMR) method.

The average degree of polymerization of the polyvinyl alcohol resin is preferably in the range from 100 to 5000 and more preferably in the range from 1000 to 4000 in view of adhesiveness. The average degree of saponification of the polyvinyl alcohol resin is preferably in the range from 85 mol % to 100 mol % and more preferably in the range from 90 mol % to 100 mol % in view of adhesiveness.

The resin concentration of the adhesive agent is preferably in the range from 0.1% by mass to 15% by mass and more preferably in the range from 0.5% by mass to 10% by mass in view of coating properties, left stability, and the like.

The ratio by mass of the amount of the organic acid of formula (1) to the adhesive is preferably adhesive/organic acid of formula (1)=99/1 to 50/50, more preferably from 97/3 to 60/40, even more preferably from 95/5 to 70/30.

(Crosslinking Agent)

Preferably, the adhesive contains a crosslinking agent. In particular, the water-soluble adhesive containing a polyvinyl alcohol resin preferably contains a crosslinking agent from the viewpoint of more enhancing the waterproofness of the layer. Specifically in the polarizer of the third aspect of the invention, preferably, the polarizing element and the protective film to a polarizer are laminated with a water-soluble adhesive containing a polyvinyl alcohol resin.

Any appropriate cross-linking agents can be employed as the cross-linking agent. The cross-linking agent is preferably a compound having at least two functional groups that are responsive to the polyvinyl alcohol resin. Examples of the cross-linking agent include alkylene diamines having two alkylene groups and two amino groups (e.g. ethylenediamine, triethylenediamine, hexamethylenediamine, and the like), isocyanates (e.g., tolylene diisocyanate, tolylene diisocyanate hydride, trimethylolpropane tolylene diisocyanate adduct, triphenylmethane triisocyanate, methylenebis(4-phenyl) methane triisocyanate, isophorone diisocyanate, a ketoxime block or a phenol block thereof, and the like), epoxys (e.g., ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, diglycidyl aniline, diglycidyl amine, and the like), dialdehydes (e.g., monoaldehydes such as formaldehyde, acetaldehyde, propionaldehyde, butylaldehyde, and the like; glyoxal, malondialdehyde, succindialdehyde, glutardialdehyde, malleindialdehyde, phthaldialdehyde, and the like); amino-formaldehyde resins (e.g., methylolurea, methylolmelamine, alkylated methylolurea, alkylated methylolated melamine, acetoguanamine, a condensation product of benzoguanamine and formaldehyde, and the like), salts of monovalent, divalent, or trivalent metals (e.g., sodium, potassium, magnesium, calcium, aluminum, iron, nickel, and the like) and oxidation products of these metals. Among them, amino-formaldehyde resins and/or dialdehydes are preferable. As the amino-formaldehyde resin, a compound having a methylol group is preferable and methylol melamine is more preferable. As the dialdehyde, glyoxal is preferable and a compound having a methylol group is more preferable. Above all, the compound having a methylol group is preferable and methylol melamine is particularly preferable. Examples of the aldehyde compound include "GLYOXAL" (product name) produced by Nippon Synthetic Chemical Industry Co., Ltd., "SEQUAREZ 755" (product name) produced by OMNOVA Solutions Inc.; and the like. Examples of the amine compound include "META-XYLENEDIAMINE" (product name) produced by Mitsubishi Gas Chemical Co., Inc.; and the like. Examples of the methylol compound include "WATERSOL" series (product name) produced by Dainippon Ink and Chemicals, Inc.; and the like.

The amount of the cross-linking agent to be added is preferably in the range from 1 part by mass to 60 parts by mass relative to 100 parts by mass of the polyvinyl alcohol resin (preferably, the acetoacetyl group-containing polyvinyl alcohol resin). By setting the amount of the cross-linking agent to be added in the aforementioned range, an adhesive layer superior in transparency, adhesiveness, and water resistance can be formed. The upper limit of the amount of the cross-linking agent to be added is preferably 50 parts by mass. The lower limit of the amount of the cross-linking agent to be added is preferably 5 parts by mass, more preferably 10 parts by mass, and further preferably 20 parts by mass. It is to be noted that when the metal compound colloid that will be described later is also used, stability in a case where the amount of the cross-linking agent to be added is large can be further increased.

(Metal Compound Colloid)

Preferably, the adhesive contains a metal compound. In particular, the water-soluble adhesive containing a polyvinyl alcohol resin preferably contains a metal compound colloid from the viewpoint of enhancing the polarizing element durability in high-humidity environments. This is because the metal compound colloid may prevent local bent defects called "knick" from forming in the interface between the polarizing element and the protective film to a polarizer, and therefore, when the polarizer is tested in a durability test under high-humidity conditions, water derived from the environmental moisture may be prevented from flowing into the polarizing element.

Specifically in the polarizer of the third aspect of the invention, preferably, the polarizing element and the protective film to a polarizer are laminated via an adhesive containing a metal compound colloid, more preferably via a water-soluble adhesive containing a polyvinyl alcohol resin and containing a metal compound colloid. Further preferably, in the polarizer of the third aspect of the invention, the polarizing element and the protective film to a polarizer are laminated via an adhesive-containing polarizing element-neighboring layer formed of a water-soluble adhesive containing a polyvinyl alcohol resin and containing a metal compound colloid. Specifically, it is desirable that the adhesive-containing polarizing element-neighboring layer contains metal compound fine particles derived from a metal compound colloid.

The metal compound colloid may be made up of, for example, metal compound fine particles dispersed in a dispersion medium, and may be stabilized electrostatically owing to mutual repulsion of the same type of electric charge of the fine particles so that it remains stabile permanently. The average particle diameter of the fine particles forming the metal compound is not particularly limited, and preferably is in the range from 1 to 100 nm, more preferably from 1 to 50 nm, particularly preferably from 2 to 40 nm. This is because this allows the fine particles to be dispersed uniformly in the adhesive layer, whereby the formation of knicks can be prevented more favorably while maintaining the adhesiveness.

As the metal compound, any suitable compound can be employed. Examples of the metal compound include metal oxides such as alumina, silica, zirconia, and titania, metal salts such as aluminum silicate, calcium carbonate, magnesium silicate, zinc carbonate, barium carbonate, and calcium phosphate, and minerals such as cerite, talc, clay, and kaoline. Among these, alumina is preferable.

The metal compound colloid is present in the state of a colloid solution in which the metal compound is dispersed in a dispersion medium, for example. Examples of the dispersion medium include water and alcohols. The solid content in the colloid solution is in the range from 1 to 50% by mass, for example, preferably from 2 to 40% by mass, more preferably from 5 to 30% by mass. The colloid solution may contain an acid such as nitric acid, hydrochloric acid, and acetic acid as a stabilizer.

The blended amount of the metal compound colloid (the solid) is preferably not more than 200 parts by mass with respect to 100 parts by mass of the polyvinyl alcohol resin. By setting the blended amount in the above-described range, the formation of knicks can be prevented more favorably while maintaining the adhesiveness. It is more preferable that the blended amount is in the range from 1.0 to 200 parts by mass, still more preferably from 1.0 to 175 parts by mass, and particularly preferably from 1.5 to 150 parts by mass.

Any appropriate methods can be employed as the method for preparing the adhesive agent. Examples of the method for preparing the metal compound colloid-containing adhesive agent are as follows: a method in which the metal compound colloid is added to a solution prepared by preliminarily mixing the polyvinyl alcohol resin and the cross-linking agent to have an appropriate concentration, and a method in which the polyvinyl alcohol resin and the metal compound colloid are mixed and then the cross-linking agent is added thereto in consideration of time for using.

In the method where a metal compound colloid is added to a mixture previously prepared by mixing a polyvinyl alcohol resin and a crosslinking agent to have a suitable concentration, the amount of the aqueous solution of the metal compound colloid to be added is preferably from 1 to 50 parts by mass relative to 100 parts by mass of the polyvinyl alcohol resin, more preferably from 5 to 40 parts by mass, even more preferably from 10 to 20 parts by mass.

The pH of the adhesive agent is preferably in the range from 2 to 6, more preferably in the range from 2.5 to 5, further preferably in the range from 3 to 5, and particularly preferably in the range from 3.5 to 4.5. Generally, the surface charge of the metal compound colloid can be controlled by adjusting the pH of the adhesive agent. The surface charge is preferably a positive charge. When the surface charge is a positive charge, an occurrence of knick can be prevented more suitably and then the durability of the polarizer can be improved.

The total solid content concentration of the adhesive agent differs depending on solubility, coating viscosity, and wettability of the adhesive agent; a desired thickness of the adhesive agent layer; and the like. The total solid content concentration is preferably in the range from 2 parts by mass to 100 parts by mass relative to 100 parts by mass of a solvent. By setting the total solid content concentration in the aforementioned range, an adhesive agent layer having higher surface uniformity can be obtained. The total solid content concentration is more preferably in the range from 10 parts by mass to 50 parts by mass and further preferably in the range from 20 parts by mass to 40 parts by mass.

The viscosity of the adhesive agent is not particularly limited, however it is preferably in the range from 1 mPa·s to 50 mPa·s when the viscosity is measured at the shear velocity of 1000 (1/s) at 23° C. By setting the viscosity of the adhesive agent in the aforementioned range, an adhesive layer having higher surface uniformity can be obtained. The viscosity of the adhesive agent is more preferably in the range from 2 mPa·s to 30 mPa·s and further preferably in the range from 4 mPa·s to 20 mPa·s.

The glass-transition temperature (Tg) of the adhesive agent is not particularly limited, however is preferably in the range from 20° C. to 120° C., more preferably in the range from 40° C. to 100° C., and further preferably in the range from 50° C. to 90° C.

The glass-transition temperature can be measured by a differential scanning calorimetry (DSC) based on JIS K 7121 (1987 version).

The adhesive agent may further contain coupling agents such as a silane coupling agent, a titanium coupling agent, and the like; various tackifiers; ultraviolet absorbers; antioxidants; stabilizers such as a heat-resistant stabilizer, a hydrolysis resistance stabilizer, and the like; and the like.

The thickness of the adhesive agent layer is preferably in the range from 0.1 μm to 20 μm, although it is not particularly limited. By setting the thickness of the adhesive agent layer in the aforementioned range, a polarizer can be obtained that is superior in durability and does not cause pealing or floating of a polarizer even in hot and humid conditions. The thickness of the adhesive agent layer is more preferably in the range from 0.5 μm to 16 μm and further preferably in the range from 1 μm to 12 μm.

(B) UV Curable Adhesive:

As the adhesive layer in the polarizer of the invention, also preferred is use of an Ultraviolet curable (UV curable) adhesive layer. The UV curable adhesive enhances the adhesion strength between the protective film to a polarizer and the polarizing element. Specifically, in the polarizer of the invention, the layer that contains the organic acid of formula (1) in an amount of from 0.01 to 10 g/m² may be preferably a UV curable adhesive layer. In this description, the UV curable adhesive layer means a layer in which the UV curable adhesive is cured with UV rays.

(Composition of UV Curable Adhesive)

When classified by the curing mode thereof, the UV curable adhesive includes a radical polymerization adhesive and a cation polymerization adhesive; but when classified by the chemical species of the adhesive component therein, the adhesive includes an acrylic resin-based adhesive and an epoxy resin-based adhesive. In the invention, any of these may be used, and any two or more of these may be used as combined. From the viewpoint of easiness in handling and of the adhesion strength to be attained, preferred is use of a cation polymerization epoxy resin-based adhesive. The epoxy resin means a compound or a polymer which has at least two epoxy groups on average in the molecule and which cures through polymerization at the epoxy group. In accordance with the customary practice in the art, the compound of the type is referred to as an epoxy resin even though it is a monomer. The epoxy resin to be contained in the UV curable adhesive is preferably an epoxy resin not containing an aromatic ring in the molecule from the viewpoint of the weather resistance, the refractive index and the cation polymerizability thereof. The epoxy resin not containing an aromatic ring in the molecule includes a hydrogenated epoxy resin, an alicyclic epoxy resin, an aliphatic epoxy resin.

The hydrogenated epoxy resin may be prepared by selective nuclear hydrogenation under pressure of an aromatic epoxy resin in the presence of a catalyst. The aromatic epoxy resin includes, for example, bisphenol-type epoxy resins such as bisphenol A diglycidyl ether, bisphenol F diglycidyl ether, bisphenol S diglycidyl ether; novolak-type epoxy resins such as phenol-novolak epoxy resin, cresol-novolak epoxy resin, hydroxybenzaldehyde phenol-novolak epoxy resin; polyfunctional epoxy resins such as tetrahydroxyphenylmethane glycidyl ether, tetrahydroxybenzophenone glycidyl ether and epoxydated polyvinylphenol, etc. Above all, use of bisphenol A glycidyl ether as the hydrogenated epoxy resin is preferred.

The alicyclic epoxy resin means an epoxy resin having at least one epoxy group bonding to the alicyclic ring in the molecule. "Epoxy group bonding to the alicyclic ring" means a group derived from the structure shown by the following formula, by removing one or more hydrogen atoms from $(CH_2)_m$ in the structure. In the following formula, m indicates an integer of from 2 to 5.

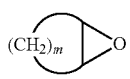

Accordingly, a compound in which a group derived from the structure of the above formula by removing one or more hydrogen atoms from $(CH_2)_m$ therein bond to the other chemical structure could be the alicyclic epoxy resin. One or more hydrogen atoms in $(CH_2)_m$ may be suitably substituted with a linear alkyl group such as a methyl group or an ethyl group. Of the alicyclic epoxy resin, preferred is use of an epoxy resin having an oxabicyclohexane ring (in the above formula, m=3) or an oxabicycloheptane ring (in the above formula, m=4), as providing an adhesive having an excellent adhesion strength between the polarizing element and the protective film to a polarizer. Examples of the alicyclic epoxy resin preferred fro use in the invention are shown below, to which, however, the invention should not be limited.

(a) Epoxycyclohexylmethyl epoxycyclohexanecarboxylates of the following formula (I):

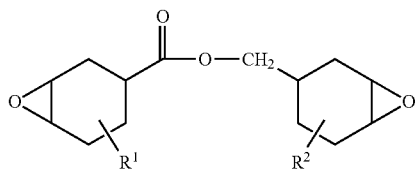

wherein $R^1$ and $R^2$ each independently represent a hydrogen atom or a linear alkyl group having from 1 to 5 carbon atoms.

(b) Alkanediol epoxycylohexanecarboxylates of the following formula (II):

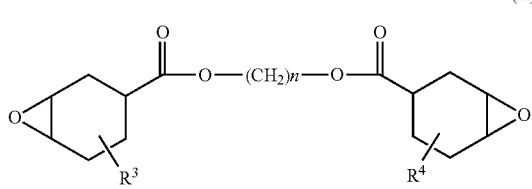

wherein $R^3$ and $R^4$ each independently represent a hydrogen atom or a linear alkyl group having from 1 to 5 carbon atoms, and n indicates an integer of from 2 to 20.

(c) Epoxycylohexylmethyl dicarboxylates of the following formula (III):

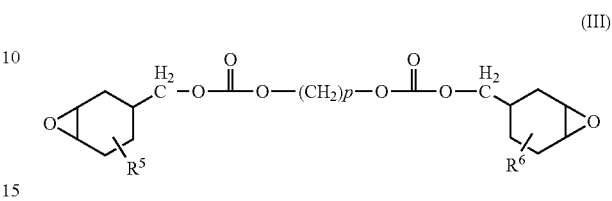

wherein $R^5$ and $R^6$ each independently represent a hydrogen atom or a linear alkyl group having from 1 to 5 carbon atoms, and p indicates an integer of from 2 to 20.

(d) Polyethylene glycol epoxycyclohexylmethyl ethers of the following formula (IV):

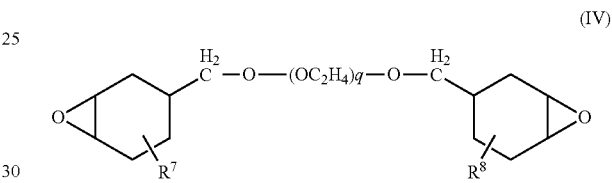

wherein $R^7$ and $R^8$ each independently represent a hydrogen atom or a linear alkyl group having from 1 to 5 carbon atoms, and q indicates an integer of from 2 to 10.

(e) Alkanediol epoxycyclohexylmethyl ethers of the following formula (V):

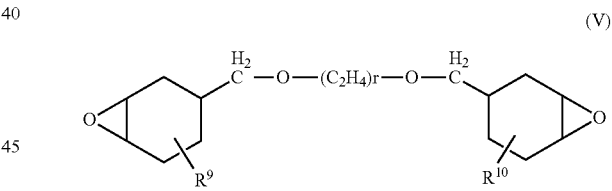

wherein $R^9$ and $R^{10}$ each independently represent a hydrogen atom or a linear alkyl group having from 1 to 5 carbon atoms, and r indicates an integer of from 2 to 20.

(f) Diepoxytrispiro compounds of the following formula (VI):

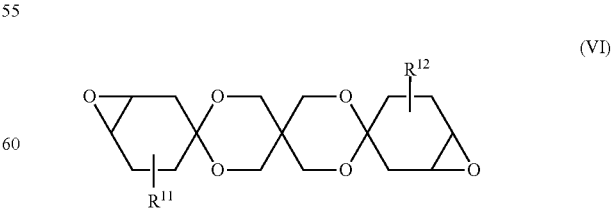

wherein $R^{11}$ and $R^{12}$ each independently represent a hydrogen atom or a linear alkyl group having from 1 to 5 carbon atoms.

(g) Diepoxymonospiro compounds of the following formula (VII):

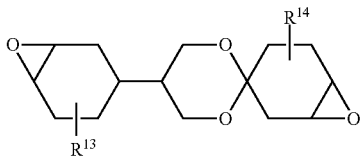

wherein $R^{13}$ and $R^{14}$ each independently represent a hydrogen atom or a linear alkyl group having from 1 to 5 carbon atoms.

(h) Vinylcylohexenediepoxides of the following formula (VIII):

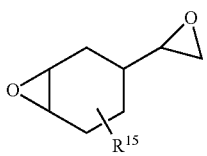

wherein $R^{15}$ represents a hydrogen atom or a linear alkyl group having from 1 to 5 carbon atoms.

(i) Epoxycyclopentyl ethers of the following formula (IX):

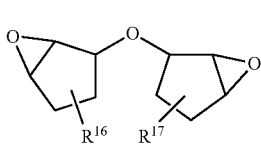

wherein $R^{16}$ and $R^{17}$ each independently—represent a hydrogen atom or a linear alkyl group having from 1 to 5 carbon atoms. (j) Diepoxytricyclodecanes of the following formula (X):

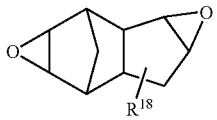

wherein $R^{18}$ represents a hydrogen atom or a linear alkyl group having from 1 to 5 carbon atoms.

Of the above-mentioned alicyclic epoxy resins, more preferred are the following alicyclic epoxy resins as they are sold on the market or as their analogues are relatively easily available.

(A) Ester of 7-oxabicyclo[4.1.0]heptane-3-carboxylic acid and (7-oxa-bicyclo[4.1.0]hept-3-yl)methanol (in formula (I), $R^1=R^2=H$), (B) Ester of 4-methyl-7-oxabicyclo[4.1.0]heptane-3-carboxylic acid and (4-methyl-7-oxa-bicyclo[4.1.0]hept-3-yl)methanol (in formula (I), $R^1=4-CH_3$ and $R^2=4-CH_3$), (C) Ester of 7-oxabicyclo[4.1.0]heptane-3-carboxylic acid and 1,2-ethanediol (in formula (II), $R^3=R^4=H$ and n=2), (D) Ester of (7-oxabicyclo[4.1.0]hept-3-yl)methanol and adipic acid (in formula (III), $R^5=R^6=H$ and p=4), (E) Ester of (4-methyl-7-oxabicyclo(4.1.0]hept-3-yl)methanol and adipic acid (in formula (III), $R^5=4-CH_3$, $R^6=4-CH_3$ and p=4), (F) Ether of (7-oxabicyclo[4.1.0]hept-3-yl)methanol and 1,2-ethanediol (in formula (V), $R^9=R^{10}=H$, r=2).

The aliphatic epoxy resin includes polyglycidyl ethers of aliphatic polyalcohols or their alkylene oxide adducts. More concretely, there may be mentioned 1,4-butanediol diglycidyl ether; 1,6-hexanediol diglycidyl ether; glycerin triglycidyl ether; trimethylolpropane triglycidyl ether; polyethylene glycol diglycidyl ether; propylene glycol diglycidyl ether; and polyether polyol polyglycidyl ethers to be obtained by adding one or more alkylene oxides (ethylene oxide or propylene oxide) to aliphatic polyalcohol such as ethylene glycol, propylene glycol or glycerin.

As the epoxy resin, more preferred is the hydrogenated epoxy resin.

In the invention, one or more of epoxy resins maybe used either singly or as combined.

The epoxy equivalent of the epoxy resin for use in the invention may be generally within a range of from 30 to 3,000 g/equivalent, preferably from 50 to 1,500 g/equivalent. When the epoxy equivalent is not lower than 30 g/equivalent, then the cured adhesive layer may have good flexibility and the adhesion strength thereof may increase. On the other hand, when not more than 3,000 g/equivalent, then the miscibility of the epoxy resin with the other components of the adhesive may be good.

In the invention, cationic polymerization is preferred as the curing reaction of the epoxy resin, as described above. For this, the UV curable adhesive preferably contains a optical cationic polymerization initiator. The optical cationic polymerization initiator generates a cation species or a Lewis acid through irradiation with UV rays, and initiates the polymerization at the epoxy group. Any type of cationic polymerization initiator may be used here, but one given a latent potency for polymerization initiation is preferred from the viewpoint of the operability with it.

The method of using an optical cationic polymerization initiator and curing the adhesive through irradiation with UV rays is advantageous in that it enables curing at room temperature and decreases the necessity of taking the heat resistance of the polarizing element and the deformation thereof by expansion into consideration, and that the protective film to a polarizer and the polarizing element can be well adhered to each other. The optical cationic polymerization initiator catalytically reacts with light, and therefore, even though it is mixed with an epoxy resin, the adhesive is still excellent in storage stability and workability.

The optical cationic polymerization initiator is not specifically defined, including, for example, onium salts such as aromatic diazonium salts, aromatic iodonium salts, aromatic sulfonium salts; and iron-arene complexes.

The aromatic diazonium salts include, for example, benzenediazonium hexafluoroantimonate, benzenediazonium hexafluorophosphate, and benzenediazonium hexafluoroborate.

The aromatic iodonium salts include, for example, diphenyliodinium tetrakis(pentafluorophenyl)borate, diphenyliodinium hexafluorophosphate, diphenyliodonium hexafluoroantimonate and di(4-nonylphenyl)iodonium hexafluorophosphate.

The aromatic sulfonium salts include, for example, triphenylsulfonium hexafluorophosphate, triphenylsulfonium hexafluoroantimonate, triphenylsulfonium tetrakis(pentafluorophenyl)borate,
4,4'-bis(diphenylsulfonio)diphenylsulfide bis(hexafluorophosphate),
4,4'-bis[di(β-hydroxyethoxy)phenylsulfonio]diphenylsulfide bis(hexafluoroantimonate),
4,4'-bis[di(β-hydroxyethoxy)phenylsulfonio]diphenylsulfide bis(hexafluorophosphate),
7-[di(p-toluyl)sulfonio]-2-isopropylthioxanthone hexafluoroantimonate,
7-[di(p-toluyl)sulfonio]-2-isopropylthioxanthone tetrakis(pentafluorophenyl)borate,
4-phenylcarbonyl-4'-diphenylsulfonio-diphenylsulfide hexafluorophosphate,
4-(p-tert-butylphenylcarbonyl)-4'-diphenylsulfonio-diphenyl sulfide hexafluoroantimonate, and
4-(p-tert-butylphenylcarbonyl)-4'-di(p-toluyl)sulfonio-diphenylsulfide tetrakis(pentafluorophenyl)borate.

The iron-arene complexes include, for example, xylene-cyclopentadienyl-iron(II) hexafluoroantimonate, cumene-cyclopentadienyl-iron(II) hexafluorophosphate, and xylene-cyclopentadienyl-iron(II) tris(trifluoromethylsulfonyl)methanide.

Commercial products of these optical cationic polymerization initiators are easily available, and for example, there are mentioned as their trade names, "Kayarad PCI-220", "Kayarad PCI-620" (both by Nippon Kayaku), "UVI-6990" (by Union Carbide), "Adeka Optomer SP-150, "Adeka Optomer SP-170" (both by ADEKA), "CI-5102", "CIT-1370", "CIT-1682", "CIP-1866S", "CIP-2048S", "CIP-2064S" (all by Nippon Soda), "DPI-101", "DPI-102", "DPI-103", "DPI-105", "MPI-103", "MPI-105", "BBI-101", "BBI-102", "BBI-103", "BBI-105", "TPS-101", "TPS-102", "TPS-103", "TPS-105", "MDS-103", "MDS-105", "DTS-102", "DTS-103" (all by Midori Chemical), "PI-2074" (by Rhodia). Above all, Nippon Soda's "CI-5102" is one of preferred optical cationic polymerization initiators.

One or more of the above optical cationic polymerization initiators may be used here either singly or as combined. Of the above, aromatic sulfonium salts are preferred as they have the ability to absorb UV rays even in a wavelength region of 300 nm or more and are excellent in curability, therefore capable of giving cured products having good mechanical strength and adhesion strength.

The amount of the optical cationic polymerization initiator to be added may be generally from 0.5 to 100 parts by mass relative to 100 parts by mass of epoxy resin, preferably 1 part by mass or more and preferably 50 parts by mass or less. When the amount of the optical cationic polymerization initiator is less than 0.5 parts by mass, then the curing may be insufficient and the mechanical strength and the adhesion strength of the cured product may lower. When the amount of the optical cationic polymerization initiator is at most 100 parts by mass, then the ionic substance in the cured product increases little and therefore the moisture absorbability of the cured product may not be too high and the durability of the polarizer does not lower.

In case where the optical cationic polymerization initiator is used therein, the UV curable adhesive may optionally further contain a photosensitizer. Using a photosensitizer therein, the cationic polymerization reactivity of the adhesive may further increase and the mechanical strength and the adhesion strength of the cured product may increase further. The photosensitizer includes, for example, carbonyl compounds, organic sulfur compounds, persulfides, redox compounds, azo and diazo compounds, halogen compounds, and photoreductive dyes. More concrete examples of the photosensitizer are benzoin derivatives such as benzoin methyl ether, benzoin isopropyl ether, α,α-dimethoxy-α-phenylacetophenone; benzophenone derivatives such as benzophenone, 2,4-dichlorobenzophenone, methyl o-benzoylbenzoate, 4,4'-bis(dimethylamino)benzophenone, 4,4'-bis(diethylamino)benzophenone; thioxanthone derivatives such as 2-chlorothioxanthone, 2-isopropylthioxanthone; anthraquinone derivatives such as 2-chloroanthraquinone, 2-methylanthraquinone; acridone derivatives such as N-methylacridone, N-butylacridone; and α,α-diethoxyacetophenone, benzyl, fluorenone, xanthone, uranyl compounds, halogen compounds. However, the invention is not limited to these examples. One or more such photosensitizers maybe used here either singly or as combined. Preferably, the photosensitizer is contained in the UV curable adhesive in an amount of from 0.1 to 20 parts by mass relative to 100 parts by mass of the adhesive.

The UV curable adhesive may further contain a compound that promotes cationic polymerization, such as oxetanes or polyols.

The oxetane is a compound having a 4-membered ring ether in the molecule. Examples of the oxetanes include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, phenol-novolak-oxetane. Commercial products of these oxetanes are easily available, and for example, there may be mentioned, as their trade names, "Aronoxetane OXT-101", "Aronoxetane OXT-121", "Aronoxetane OXT-211", "Aronoxetane OXT-221", "Aronoxetane OXT-212" (all by Toa Gosei). The oxetane is contained in the UV curable adhesive generally in an amount of from 5 to 95% by mass, preferably from 30 to 70% by mass.

Preferably, the polyols do not contain any other acidic group than a phenolic hydroxyl group. The polyols of the type include, for example, polyol compounds, polyester polyol compounds and polycaprolactone polyol compounds not having any other functional than a hydroxyl group, and polyol compounds and polycarbonate polyols having a phenolic hydroxyl group. The molecular weight of the polyols is generally at least 48, preferably at least 62, more preferably at least 100, and is preferably at most 1000. The polyol may be contained in the UV curable adhesive generally in an amount of at most 50% by mass, preferably at most 30% by mass.

Not detracting from the advantage of the invention, the UV curable adhesive may contain any other additive such as ion-trapping agent, antioxidant, chain transfer agent, sensitizer, tackifier, thermoplastic resin, filler, flow regulator, plasticizer, defoaming agent, etc. The ion-trapping agent includes, for example, powdery bismuth, antimony, magnesium, aluminium, calcium, titanium or the like inorganic compounds and their mixtures. The antioxidant includes, for example, hindered phenol-based antioxidants.

<Functionalization of Polarizer>
(Protective Film, Separate Film)

The polarizer of the third aspect of the invention preferably comprising a polarizing element and a protective film to a polarizer to protect both surfaces of the element, and is also preferably so designed that a protective film is attached to one surface of the polarizer and a separate film to the other surface thereof.

In this embodiment, the protective film and the separate film are to protect the polarizer in its shipping and acceptance inspection. In this case, the protective film is used for the purpose of protecting the surface thereof, and is attached to the side of the polarizer opposite to the side thereof to which a liquid crystal plate is stuck. The separate film is used for the purpose of covering the adhesive layer or the like of the polarizer via which the polarizer is stuck to a liquid crystal plate, and therefore, the separate film is attached to the side of the polarizer to which a liquid crystal plate is stuck.

Preferable embodiment of a functionalization of polarizer in the third aspect of the invention is the same as the preferable embodiment of a functionalization of polarizer in the second aspect of the invention.

<Configuration>

Regarding the configuration thereof, the polarizer of the third aspect of the invention includes not only those in the form of a sheet cut so as to be directly incorporated into liquid crystal display devices but also those in the form of a roll as wound up in continuous production (for example, a roll having a roll length of at least 2500 m or at least 3900 m). For application to large-panel liquid crystal display devices, the width of the polarizer is preferably at least 1470 mm.

<Method for Producing Polarizer>

Not contradictory to the scope and the sprit of the third aspect of the invention, the method for producing the polarizer of the third aspect of the invention is not specifically defined, for which is employable any known method.

(Method of Lamination of Polarizing Element and Protective Film to Polarizer)

The method for producing the polarizer of the third aspect of the invention includes laminating a layer containing an organic acid of formula (1) in an amount of from 0.01 to 10 $g/m^2$ between the polarizing element and the protective film to a polarizer.

In case where the organic acid is added, the time of the addition is not specifically defined so far as the acid may be added during film formation.

In the polarizer production method of the third aspect of the invention, preferably, the protective film to a polarizer is alkali-processed and then stuck to both surfaces of the polarizing element that is prepared by dipping and stretching a polyvinyl alcohol film in an iodine solution, using an aqueous solution of a completely-saponified polyvinyl alcohol, thereby producing the polarizer.

As described above, the polarizer of the third aspect of the invention may be produced by laminating the constitutive members with an adhesive.

In the polarizer production method of the third aspect of the invention, preferably, the polarizing element and the protective film to a polarizer are laminated, using a water-soluble adhesive of a polyvinyl alcohol resin that contains the above-mentioned metal compound colloid.

Any suitable method may be employed for application of the adhesive. The coating method includes, for example, a spin coating method, a roll coating method, a flow coating method, a dip coating method, a bar coating method.

For sticking the protective film to a polarizer to the polarizing element in the polarizer production method of the third aspect of the invention, preferably, the two are so stuck to each other that the transmission axis of the polarizing element could be substantially parallel to the slow axis of the protective film to a polarizer.

In this, "substantially parallel" means that the difference between the direction of the main refractive index nx of the organic acid-containing protective film to a polarizer and the direction of the transmission axis of the polarizing element is within a range of 5°, preferably within 1°, more preferably within 0.5°. When the difference is within 1°, then it is favorable since the polarizance of the polarizer hardly lowers under cross Nicol and light leakage hardly occurs.

(Polarizer Production Method Using UV curable Adhesive)

In case where the layer containing the organic acid of formula (1) in an amount of from 0.01 to 10 $g/m^2$ is a UV curable adhesive layer in the polarizer of the invention, preferably, the polarizer is produced according to the method comprising the process mentioned below.

(a) Adhesive Layer Forming Step:

The UV curable adhesive is an adhesive to be used for adhering the protective film to a polarizer and the polarizing element. The surface to which the UV curable adhesive is applied and on which the adhesive layer is formed may be any one or both of the surface of the protective film to be stuck to the polarizing element and the surface of the polarizing element to be stuck to the protective film to a polarizer. Preferably, the adhesive layer is formed on the surface of the protective film to a polarizer to be stuck to the polarizing element. The coating method with the UV curable adhesive is not specifically defined. For example, employable are various coating methods with a doctor blade, a wire bar, a die coater, a comma coater or a gravure coater. In these coating methods, there exists a most suitable viscosity range, and therefore a technology of using a solvent for controlling the viscosity of the adhesive is useful herein. As the solvent, preferred are those capable of well dissolving the adhesive not detracting from the optical performance of the polarizing element. The solvent is not specifically defined. For example, organic solvents are usable, including hydrocarbons such as toluene, and esters such as ethyl acetate.

The protective film to a polarizer may be stuck to one surface only of the polarizing element, or to both surfaces of the polarizing element. In case where the protective film to a polarizer is laminated on both surfaces of the polarizing element, preferably, the two adhesive layers are formed of the same UV curable adhesive.

In case where the protective film to a polarizer is laminated on one surface only of the polarizing element, an optically compensatory film may be laminated on the other surface of the polarizing element not having the protective film to a polarizer thereon. The adhesive for sticking the polarizing element and the optically compensatory film may differ from a UV curable adhesive such as a water-based adhesive that contains, as the adhesive ingredient, a polyvinyl alcohol resin or an urethane resin, or may be a UV curable adhesive. Using the same UV curable adhesive as that for use in sticking the polarizing element and the protective film to a polarizer is preferred, as enhancing the production efficiency and reducing the sorts of the starting materials.

The optically compensatory film includes those containing a cellulose resin such as triacetyl cellulose (TAC), an olefin resin such as polyethylene, polypropylene or polyvinyl chloride, a polyester resin such as polyethylene terephthalate or polyethylene naphthalate, a cycloolefin resin such as a norbornene resin, or an acrylic resin such as polyacrylate or polymethyl methacrylate.

The optically compensatory film containing a cellulose resin includes, for example, a film prepared by incorporating a compound having a retardation-regulating function in a cellulose resin film, a film prepared by applying a compound having a retardation-regulating function to the surface of a cellulose resin film, and a film prepared by monoaxially or biaxially stretching a cellulose resin film.

Not specifically defined, the thickness of the optically compensatory film containing a cellulose resin is preferably within a range of from 20 to 90 μm, more preferably from 30 to 90 μm. When the thickness is less than 20 μm, then the film will be difficult to handle. On the other hand, when the thickness is more than 90 μm, the workability of the film will be poor, and the thickness will be disadvantageous in reducing the thickness and the weight of the polarizer to be obtained.

The optically compensatory film containing a cycloolefin resin may be, for example, a monoaxially or biaxially stretched cycloolefin resin film.

The thickness of the stretched cycloolefin resin film is preferably not too thick from the viewpoint of the workability, the transparency and the thickness and the weight of the polarizer to be produced, and is more preferably from 20 to 80 µm or so.

Prior to forming the UV curable adhesive layer, the adhesive layer-forming surface of the protective film to a polarizer, the optically compensatory film and the polarizing element may be processed for easy adhesion treatment such as corona treatment, primer treatment or anchor coating treatment.

(b) Film Lamination:

This process is obtaining a laminate film by sticking the protective film to a polarizer and the polarizing element via the adhesive layer. The laminate film may have the protective film to a polarizer laminated on one surface or on both surfaces of the polarizing element. Otherwise the laminate film may have the protective film to a polarizer laminated on one surface of the polarizing element and the optically compensatory film laminated on the other surface of the polarizing element.

(c) UV Irradiation:

This process is irradiating the laminate film with UV rays. Irradiation with UV rays cures the UV curable adhesive-containing adhesive layer. The light source of UV rays is not specifically defined. For example, usable herein are low-pressure mercury lamps, middle-pressure mercury lamps, high-pressure mercury lamps, ultra-high-pressure mercury lamps, chemical lamps, black light lamps, microwave-excited mercury lamps or metal halide lamps having an emission spectrum at a wavelength 400 nm or less.

The intensity of the irradiation light to be given to the UV curable adhesive layer may be determined depending on the composition of the UV curable adhesive therein but is not specifically defined. Preferably, the irradiation intensity in the wavelength region effective for activating the polymerization initiator is from 0.1 to 100 mW/cm$^2$. When the light irradiation intensity is less than 0.1 mW/cm$^2$, then the reaction time may be too long; but when more than 100 mW/cm$^2$, the adhesive may yellow or the polarizing film may degrade owing to the heat radiated by the lamp or to the heat generated in polymerization of the UV curable adhesive. The light irradiation time for the UV curable adhesive layer may be controlled depending on the composition of the UV curable adhesive but is not specifically defined. Preferably, the integrated light quantity represented by the product of the irradiation intensity and the irradiation time is defined to be from 10 to 5000 mJ/cm$^2$. When the integrated light quantity to be given to the UV curable adhesive is less than 10 mJ/cm$^2$, then the generation of the active species from the polymerization initiator could not be sufficient and the curing of the adhesive layer may be insufficient; but when more than 5000 mJ/cm$^2$, then the irradiation time maybe too long and this is disadvantageous for improving the producibility.

Preferably, the adhesive layer is cured through irradiation with UV rays under the condition under which the functions of the polarizer, for example, the degree of polarization, the transmittance and the hue of the polarizing element and the transparency of the protective film to a polarizer and the optically compensatory film do not worsen. After cured, the thickness of the adhesive layer may be generally at most 50 µm, preferably at most 20 µm, more preferably at most 10 µm.

(d) Heating:

This process is heating at least one of the protective films to a polarizer or the UV curable adhesive. Preferably, the heating process (d) is attained in any stage before the above-mentioned UV irradiation process (c). Providing the heating process gives a polarizer excellent in the adhesiveness between the polarizing element and the protective film to a polarizer, especially remarkably improved in the adhesiveness between the protective film to a polarizer and the adhesive layer.

As the concrete embodiment of the heating process (d), preferably employed is any of the following process.

(d-1) Heating the thermoplastic resin-containing protective film to a polarizer.
(d-2) Heating the UV curable adhesive, and
(d-3) Heating the laminate of the protective film to a polarizer, the UV curable adhesive layer and the polarizing element laminated in that order.

In case where the (d-1) is employed, the polarizer production method of the invention preferably comprising the (d-1) of heating the thermoplastic resin-containing protective film to a polarizer, forming the adhesive layer by applying a UV curable adhesive onto one surface of the heated protective film to a polarizer (adhesive layer forming (a)), laminating the polarizing element on the adhesive layer to form a laminate film (film lamination (b)) and irradiating the laminate film with UV rays (UV irradiation (c)) in that order.

The method of heating the protective film to a polarizer is not specifically defined. For example, there may be mentioned a method of subsequently leading a long protective film unrolled from the roll thereof to pass through a unit of generating a radiation heat such as an IR heater; and a method of blowing a heated gas toward the long protective film by the use of a blower fan. The timing at which the protective film to a polarizer is heated is not specifically defined, and the film may be heated at any time before the adhesive layer is formed on one surface of the protective film to a polarizer. For example, the film may be heated before or after easy adhesion treatment such as corona treatment.

In case where the (d-2) is employed, the polarizer production method of the invention preferably comprising the (d-2) of heating a UV curable adhesive, forming the adhesive layer by applying the heated UV curable adhesive onto one surface of the protective film to a polarizer containing a thermoplastic resin (adhesive layer forming (a)), laminating the polarizing element on the adhesive layer to form a laminate film (film lamination (b)) and irradiating the laminate film with UV rays (UV irradiation (c)) in that order.

The method of heating the UV curable adhesive is not specifically defined. For example, there may be employed a method of previously heating the adhesive in a reservoir and keeping it under heat therein, and feeding the heated adhesive to a coating unit. In this case, the heated adhesive is applied onto the protective film to a polarizer while kept heated as such, thereby forming a heated adhesive layer on the protective film to a polarizer.

In case where the (d-3) is employed, the polarizer production method of the invention preferably comprising forming the adhesive layer by applying a UV curable adhesive onto one surface of the protective film to a polarizer containing a thermoplastic resin or the polarizing element containing a monoaxially-stretched polyvinyl alcohol resin film with iodine or a dichroic dye adsorbed and aligned thereon (adhesive layer forming (a)), laminating the protective film to a polarizer and the polarizing element via the adhesive layer to give a laminate film (film lamination (b)), the (d-3) of heating the laminate film and irradiating the heated laminate film with UV rays (UV irradiation (c)) in that order.

The method of heating the laminate film is not specifically defined. For example, there may be employed a method of subsequently leading the obtained laminate film to pass through a unit of generating a radiation heat such as an IR heater; and a method of blowing a heated gas toward the laminate film by the use of a blower fan.

In any case of employing any of the above-mentioned (d-1) to (d-3), the temperature at which the protective film to a polarizer, the UV curable adhesive or the laminate film is heated is preferably from 30 to 80° C., more preferably from 40 to 60° C. When the heating temperature is at most 80° C., then the protective film to a polarizer, the UV curable resin or the polarizing element is hardly degraded by heat. On the other hand, when the heating temperature is at least 30° C., then the effect of improving the adhesiveness of the protective film to a polarizer and the polarizing element is enough.

In any case of employing any of the above-mentioned (d-1) to (d-3) in the polarizer production method of the invention, preferably, the UV curable adhesive layer is laminated on the protective film to a polarizer, and at least one of the protective film to a polarizer and the adhesive layer is heated within the above-mentioned temperature range. With that, a polarizer can be obtained which is excellent in the adhesiveness between the protective film to a polarizer and the polarizing element, especially in the adhesiveness between the protective film to a polarizer and the adhesive layer. Preferably, the time for which the state is maintained is from 0.2 second to 1 hour, more preferably from 1 second to 10 minutes. When the time is at least 0.2 second, the effect of improving the adhesiveness between the protective film to a polarizer and the polarizing element, especially the adhesiveness between the protective film to a polarizer and the adhesive layer is enough. When the time for which the state is maintained is at most 1 hour, then the protective film to a polarizer, the UV curable adhesive or the polarizing element is hardly degraded by heat.

More concretely, in case where the (d-1) is employed, preferably, the protective film to a polarizer is heated within the above-mentioned temperature range, and while the temperature range is kept as such, the adhesive layer is formed on one surface of the protective film to a polarizer. In this case, preferably, the state where the protective film to a polarizer and the adhesive layer are kept in contact with each other within the above-mentioned temperature range is secured for a period of from 0.2 second to 1 hour until the UV irradiation (c).

In case where the (d-2) is employed, preferably, the UV curable adhesive is heated within the above-mentioned temperature range, and while the temperature range is kept as such, the heated adhesive layer is formed on one surface of the protective film. In this case, preferably, the state where the protective film is kept in contact with the adhesive layer heated within the above-mentioned temperature range is secured for a period of from 0.2 second to 1 hour until the UV irradiation n the above-mentioned temperature range for a period of from 0.2 second to 1 hour until the UV irradiation (c).

In case where the (d-3) is employed, preferably, the laminated film is heated for a period of from 0.2 second to 1 hour until the UV irradiation (c).

The polarizer production method of the invention may comprising any two or more of the above (d-1) to (d-3).

[Liquid Crystal Display Devise]

Next, the liquid crystal display of the third aspect of the invention is described.

The liquid crystal display of the third aspect of the invention is characterized by including at least one polarizer of the second aspect of the invention.

Preferable embodiment of the liquid crystal display of the third aspect of the invention is the same as the preferable embodiment of the liquid crystal display of the first aspect of the invention.

EXAMPLES

The characteristics of the invention are described more concretely with reference to the following Examples. In the following Examples, the material and agents used, its amount and the ratio, the details of the treatment process may be suitably modified or changed without not overstepping the purpose of the invention. Accordingly, the invention should not be limitatively interpreted by the Examples mentioned below.

[[First Aspect of the Invention]]

Example 1

<Manufacturing Protective Film of Polarizer]
(Preparation of Cellulose Acylate Solution)

The following composition was put into a mixing tank and stirred to dissolve the ingredients to prepare cellulose acylate solution 1.

| Composition of Cellulose Acylate Solution 1 | |
|---|---|
| Cellulose acylate (acetyl substitution degree is 2.42, degree of polymerization is 400) | 100.0 mas. pts. |
| Additive A | 4.0 mas. pts. |
| Methylene chloride (first solvent) | 402.0 mas. pts. |
| Methanol (second solvent) | 60.0 mas. pts. |

(Additive)

The following additives were used in the invention. The additives may be commercially available, or may be produced in known methods. The following additives A to D, F and G were commercial products, and the following additive E was synthesized here.

Additive A:
 Fuso Chemical's MDEC (concretely, citric acid half ethyl ester compound)
Additive B:
 Riken Vitamin's Poem K-37V
Additive C:
 Tokyo Chemical Industry's o-sulfobenzimide
Additive D:
 Wako Pure Chemical Industries' citric anhydride
Additive E:
 Polycondensate polyester mentioned below (weight-average molecular weight, 1200)

-continued

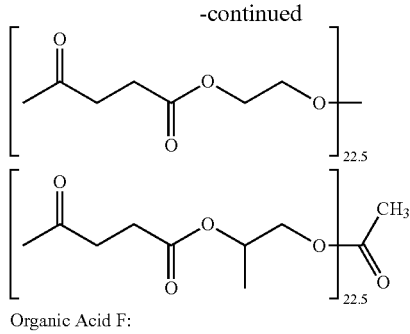

Organic Acid F:

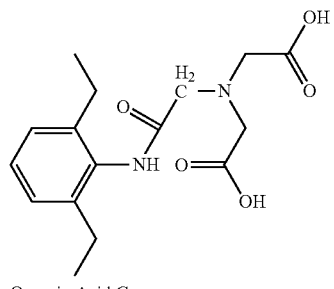

Organic Acid G:

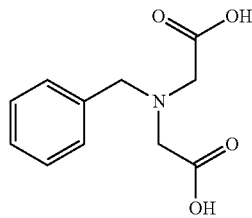

(Preparation of Mat Agent Solution 2)
The following composition was put into a disperser and dispersed to prepare a mat agent solution 2.

| Composition of Mat Agent Solution 2 | |
|---|---|
| Silica particles having a mean particle size of 20 nm (Aerosil R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 1 | 10.3 mas. pts. |

1.3 Parts by mass of Matting Agent Solution 2 and 98.7 parts by mass of Cellulose Acylate Solution 1 were mixed using an in-line mixer. The mixture was then cast using a band casting machine, and the film was dried at 80° C. until reaching a residual solvent content of 30% and then peeled off. The peeled-off film was stretched at a stretch ratio of 30% in the cross direction of machine direction by using a tenter at an ambient temperature of 145° C. Then, the stretched film was dried at 140° C. for 20 minutes to form the protective film to a polarizer of Example 1. The produced film had a thickness of 55 μm.

{Saponification Treatment (1) of Protective Film of Polarizer}

The protective film to a polarizer of Example 1 produced was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the protective film to a polarizer of Example 1 was saponified.

{Production of Polarizer}
Iodine was adsorbed by the stretched polyvinyl alcohol film to prepare a polarizing element.

The saponificated protective film to a polarizer of Example 1 was stuck to one surface of the polarizing element, using a polyvinyl alcohol adhesive. A commercial cellulose triacetate film (Fujitac TD80UF, by FUJIFILM Corporation) was saponified in the same method, and the saponificated cellulose triacetate film was stuck to the other side of the polarizing element, using a polyvinyl alcohol adhesive.

The films were so stuck to the polarizing element that the transmission axis of the polarizing element could be parallel to the slow axis of the protective film to a polarizer produced in Example 1 and that the transmission axis of the polarizing element could be perpendicular to the slow axis of the commercial cellulose triacetate film.

Thus, the polarizer of Example 1 was manufactured.

Example 2 to 13 and Comparative Example 1 to 8

Protective films to a polarizer of Example 2 to 13 and Comparative Example 1 to 8 were manufactured in the same way as in Example 1 but changing the type and acyl substitution degree of cellulose acylate, the type and the addition amount of the additives, the type of the protective film to a polarizer the aerial side as listed in the following Tables 3.

[Saponification of Protective Film to Polarizer (2)]
In Example 6, the additive was not added but the film surface pH was controlled by washing with water. Concretely, the prepared, protective film to a polarizer not containing an acidic compound of Example 6 was dipped in an aqueous solution of 2.3 mol/L sodium hydroxide at 55° C. for 3 minutes. This was washed in a water bath at room temperature, and sprayed with hot water at 50° C. at a rate of 10 L/m²·min for 1 minute. Further, this was led to pass through a 0.2 N sulfuric acid solution, and then dried with hot air at 100° C. In that manner, the surface of the protective film to a polarizer of Example 6 was saponified.

In the following Table 3, the amount of the additive is in terms of part by mass relative to 100 parts by mass of cellulose acylate. In the following Table 3, the alicyclic structure-having polymer resin film was prepared according to Production Example 2 in JP-A-2006-58322; the acrylic resin film was prepared according to the method for producing the transparent protective film 1 in Examples in JP-A-2009-122664; and the cellulose acylate resin/acrylic resin mixed resin film was prepared according to the method for producing the optical film 1 in Examples in JP-A-2009-299075.

<Evaluation>
(Measurement of Moisture Permeability of Protective Film to Polarizer)

According to the moisture permeability test (cup method) of JIS Z0208, the weight (g) of the water vapor passing through the sample having an area of 1 m² in an atmosphere at a temperature of 60° C. and a relative humidity of 95% for 24 hours was measured.

The results are shown in the following Table 3.
(Measurement of Water Content of Protective Film to Polarizer)

The protective film to a polarizer of 24 mm x 35 mm conditioned at 25° C. and 80% RH for at least 2 hours was analyzed, using a water content measuring unit and a sample drying unit (CA-03, VA-05, both by Mitsubishi Chemical) according to the Karl-Fischer moisture titration method. The amount of water (g) was divided by the weight of the sample (g) to give the water content of the sample.

The results are shown in the following Table 3.

(Measurement of Film Surface pH of Protective Film to a Polarizer)

50 μl of decarbonated water prepared by bubbling pure water with nitrogen for at least 15 minutes was dropwise applied onto the film, and after 10 minutes, a flat glass pH electrode was kept in contact with the film surface to measure the pH of the decarbonated water. The pH electrode used here is Toa DKK's GST-57235.

The results are shown in the following Table 3.

(Dryability in Working of Polarizer)

The dryability in working of the polarizer was determined according to the method mentioned below, and evaluated according to the criteria mentioned below.

The polarizer was dried at 70° C., and the time taken until the water content of the polarizing element could be at most 9% by mass was reckoned. The dryability of the polarizer was evaluated as follows:

A: The time is less than 10 minutes.
B: The time is from 10 minutes to less than 20 minutes.
C: The time is 20 minutes or more.

The results are shown in the following Table 3.

(Evaluation of Polarizer Durability)

A cross transmittance CT in the wavelength of 410 nm of each polarizer of Examples and Comparative Examples manufactured above was measured using an automatic polarizing film analyzer VAP-7070 (manufactured by JASCO Corporation), and the CT was measured 10 times and the average value of measurement was used.

Then, a cross transmittance of each polarizer was measured in the same manner described above after preserved under 60° C. and relative humidity 95% for 96 hours. The cross transmittance variation of the polarizer before and after the preservation was calculated and the result was shown in Tables 3 as polarizer durability. In addition, the relative humidity under environment without humidity control was fall within the range of 0% to 20%.

(Evaluation of Corrosion Resistance of Organic Acid containing Solution)

20 g of the cellulose acylate solution 1 prepared in Example 1 was weighed in an autoclave, and a SUS316 test piece having a thickness of 0.5 cm, as cut to have a width of 2 cm and a length of 3 cm, was dipped therein. The autoclave was closed, and kept at 90° C. for 72 hours, then the autoclave was opened, and the SUS316 test piece therein was checked for corrosion, and the change, if any, in the cellulose acylate solution to be caused by the corrosion was observed and evaluated according to the following criteria.

A: There was no change in the smoothness of the surface of the test piece, and the cellulose acylate solution was colorless and transparent.
B: The change in the smoothness of the surface of the test piece was small, but the cellulose acylate solution yellowed.
C: The surface of the test piece was roughened partly, and the cellulose acylate solution yellowed.
D: The surface of the test piece was roughened, and the cellulose acylate solution was brownish red and was cloudy.

The cellulose acylate solution each prepared in the other Examples and Comparative Examples were evaluated in the same manner, and then the results were shown in below Table 3.

TABLE 3

| | Glass Side Protective Film | | | | | | | | | | | | | | | Polarizer | | SUS Corrosion by Additive-Containing Solution |
|---|---|---|---|---|---|---|---|---|---|---|---|---|---|---|---|---|---|---|
| | Cellulose Acylate | | | | Amount of additive (parts by mass) | | | | | | | Moisture Permeability [g/m²·day] | Water Content [%] | Film Surface pH | Air Side Protective Film | Dryability In Working | Cross-Transmittance Change | |
| | type | degree of Ac substitution | degree of Pr substitution | total degree of substitution | A | B | C | D | E | F | G | | | | | | | |
| Example 1 | TAC | 2.42 | 0 | 2.42 | 4 | | | | | | | 2940 | 6.6 | 4.3 | Fujitac TD80UF | A | 0.001 | C |
| Example 2 | TAC | 2.42 | 0 | 2.42 | | 4 | | | | | | 3350 | 6.5 | 5.2 | Fujitac TD80UF | A | 0.010 | A |
| Example 3 | TAC | 2.42 | 0 | 2.42 | | | 4 | | | | | 2900 | 6.3 | 3.2 | Fujitac TD80UF | A | 0.001 | B |
| Example 4 | TAC | 2.42 | 0 | 2.42 | | | | 4 | | | | 3260 | 7.2 | 3.2 | Fujitac TD80UF | A | 0.001 | D |
| Example 5 | TAC | 2.42 | 0 | 2.42 | 3 | | | | | | | 2600 | 5.6 | 4.5 | Fujitac TD80UF | A | 0.002 | C |
| Example 6 | TAC | 2.42 | 0 | 2.42 | | | | | 6 | | | 3400 | 6.6 | 5.4 | Fujitac TD80UF | A | 0.025 | B |
| Example 12 | TAC | 2.42 | 0 | 2.42 | | | | | | | 4 | 3150 | 6.6 | 4.2 | Fujitac TD80UF | A | 0.001 | A |
| Example 13 | TAC | 2.42 | 0 | 2.42 | no (pH controlled by washing with water) | | | | | | | 3080 | 6.5 | 4.1 | Fujitac TD80UF | A | 0.002 | A |
| Comparative Example 1 | TAC | 2.42 | 0 | 2.42 | | | | | | 4 | | 3200 | 7.0 | 6.2 | Fujitac TD80UF | A | 0.070 | B |
| Comparative Example 2 | TAC | 2.42 | 0 | 2.42 | | | | | 19 | | | 1800 | 3.8 | 6.2 | Fujitac TD80UF | B | 0.069 | B |
| Comparative Example 3 | TAC | 2.42 | 0 | 2.42 | 2 | | | | 19 | | | 1880 | 4.2 | 5.2 | Fujitac TD80UF | B | 0.042 | C |
| Example 7 | TAC | 2.16 | 0 | 2.16 | | 4 | | | | | | 4500 | 9.8 | 4.9 | Fujitac TD80UF | A | 0.015 | B |
| Example 8 | CAP | 0.1 | 1.2 | 1.3 | | 4 | | | | | | 4200 | 6.8 | 5.1 | Fujitac TD80UF | A | 0.015 | A |
| Comparative Example 4 | TAC | 2.16 | 0 | 2.16 | | | | | | | | 4434 | 9.7 | 6.2 | Fujitac TD80UF | A | 0.090 | A |
| Comparative Example 5 | CAP | 0.1 | 1.2 | 1.3 | | | | | | | | 4160 | 6.8 | 6.2 | Fujitac TD80UF | A | 0.100 | B |
| Example 9 | TAC | 2.42 | 0 | 2.42 | | 4 | | | | | | 3350 | 6.5 | 5.2 | alicyclic structure-having polymer resin film | B | 0.008 | A |
| Example 10 | TAC | 2.42 | 0 | 2.42 | | 4 | | | | | | 3350 | 6.5 | 5.2 | acrylic resin film | A | 0.006 | A |
| Example 11 | TAC | 2.42 | 0 | 2.42 | | 4 | | | | | | 3350 | 6.5 | 5.2 | cellulose acylate resin/acrylic resin mixed resin film | A | 0.009 | A |
| Comparative Example 6 | TAC | 2.42 | 0 | 2.42 | | | | | | | | 3200 | 7.0 | 6.2 | alicyclic structure-having polymer resin film | B | 0.060 | B |
| Comparative Example 7 | TAC | 2.42 | 0 | 2.42 | | | | | | | | 3200 | 7.0 | 6.2 | acrylic resin film | A | 0.050 | B |
| Comparative Example 8 | TAC | 2.42 | 0 | 2.42 | | | | | | | | 3200 | 7.0 | 6.2 | cellulose acylate resin/acrylic resin mixed resin film | A | 0.070 | B |

From Table 3, it is known that the protective film to a polarizers of Examples 1 to 13 all have, when incorporated in a polarizer, a small cross-transmittance change after aged in high-temperature and high-humidity environments, and the polarizers of Examples 1 to 13 all have high polarizing element durability when aged in high-temperature and high-humidity environments.

In addition, it is known that, when the composition containing the additive A, C or D was formed on a casting support with washing the support, then the casting support was not corroded and the formed protective film to a polarizer was free from failure of discoloration or surface defects.

(Manufacture of Liquid Crystal Display Device)

After peeling off two polarizers of a commercially available liquid crystal television set (BRAVIA J5000, manufactured by SONY Corp.), polarizers of the first aspect of the invention which the protective film to a polarizer of Each Examples were used were laminated to the viewer side and the backlight side one by one, respectively, through a adhesive agent such that the protective film to a polarizer of the invention came to the liquid crystal cell side. These polarizers were disposed in a cross-Nicol arrangement where the transmission axis of the polarizer on the viewer side ran in the up/down direction and the transmission axis of the polarizer on the backlight side ran in the right/left direction. When the thus-produced liquid crystal display device of the first aspect of the invention was observed from the oblique direction, small contrast change and small color tint change were advantageously obtained in case where the atmosphere humidity was changed; and reduction of contrast was small in case where the liquid crystal display device of the first aspect of the invention was used for a long time under the high temperature and high humidity condition; each as compared with the commercially available liquid crystal television set.

[[Second Aspect of the Invention]]

Example 101

<Manufacturing Protective Film of Polarizer>

(Preparation of Cellulose Acylate Solution)

The following composition was put into a mixing tank and stirred to dissolve the ingredients to prepare cellulose acylate solution 11.

| Composition of Cellulose Acylate Solution 11 | |
|---|---|
| Cellulose acylate (acetyl substitution degree is 2.40, degree of polymerization is 400) | 100.0 mas.pts. |
| Polycondensed ester A having weight average molecular weight of 1000 | 17.0 mas.pts. |
| Organic acid A | 2.0 mas.pts. |
| Methylene chloride (first solvent) | 402.0 mas.pts. |
| Methanol (second solvent) | 60.0 mas.pts. |

Polycondensed ester A

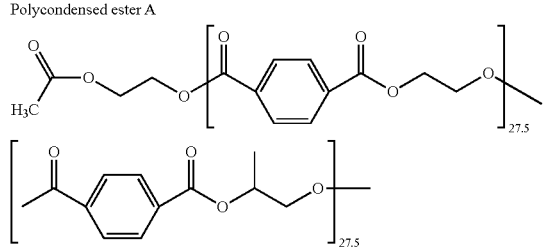

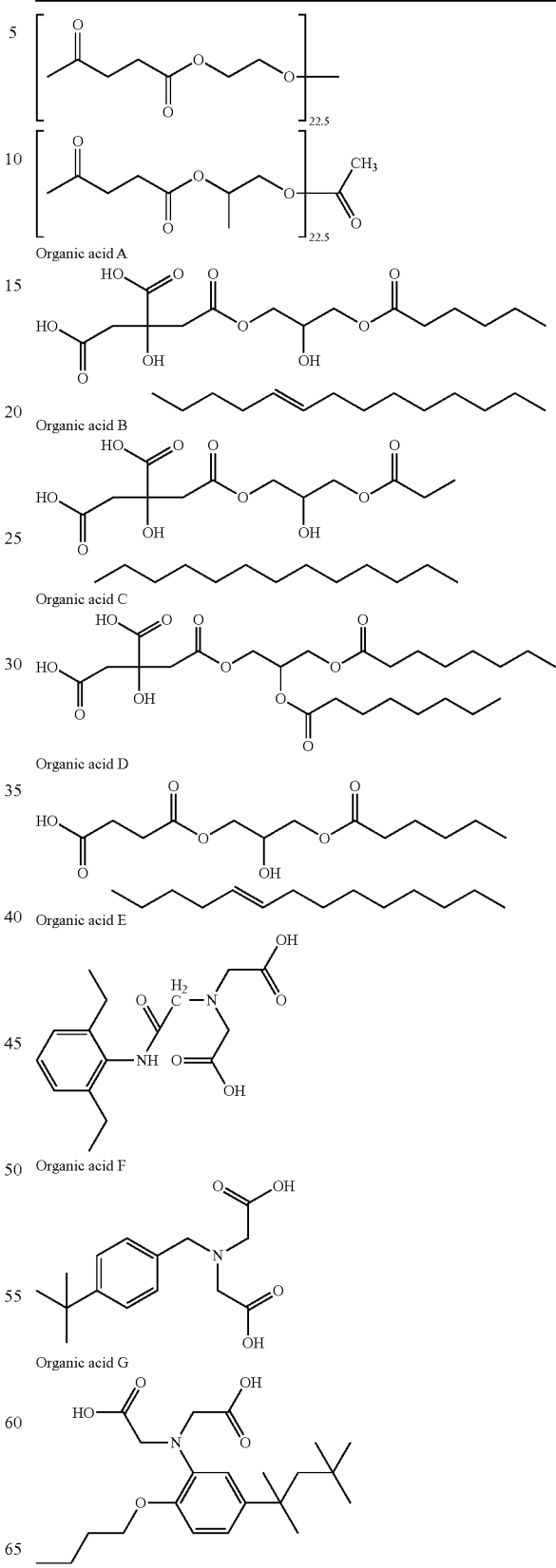

(Preparation of Mat Agent Solution 12)

The following composition was put into a disperser and dispersed to prepare a mat agent solution 12.

| Composition of Mat Agent Solution 12 | |
|---|---|
| Silica particles having a mean particle size of 20 nm (Aerosil R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 1 | 10.3 mas. pts. |

1.3 Parts by mass of Matting Agent Solution 12 and 98.7 parts by mass of Cellulose Acylate Solution 11 were mixed using an in-line mixer. The mixture was then cast using a band casting machine, and the film was dried at 80° C. until reaching a residual solvent content of 30% and then peeled off. The peeled-off film was stretched at a stretch ratio of 30% in the cross direction of machine direction by using a tenter at an ambient temperature of 145° C. Then, the stretched film was dried at 140° C. for 20 minutes to form the protective film to a polarizer of Example 101. The produced film had a thickness of 55 μm.

{Saponification Treatment of Protective Film of Polarizer}

The protective film to a polarizer of Example 101 produced was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the protective film to a polarizer of Example 101 was saponified.

[Production of Polarizer]

Iodine was adsorbed by the stretched polyvinyl alcohol film to produce a polarizing element according to the method described in JP-A-2005-62548. In this, the polarizing element was crosslinked only with boric acid solution having pH of around 4.3, and was not processed at all with any other acidic solution.

The saponificated protective film to a polarizer of Example 101 was stuck to one surface of the polarizing element, using a polyvinyl alcohol adhesive. A commercial cellulose triacetate film (Fujitac TD80UF, by FUJIFILM Corporation) was saponified in the same method, and the saponificated cellulose triacetate film was stuck to the other side of the polarizing element, using a polyvinyl alcohol adhesive. In addition, the commercial cellulose triacetate film which does not contain organic acid is 80 μm of film thickness, and water-vapor-permeability of 400 g/m²·day The films were so stuck to the polarizing element that the transmission axis of the polarizing element could be parallel to the slow axis of the protective film to a polarizer produced in Example 1 and that the transmission axis of the polarizing element could be perpendicular to the slow axis of the commercial cellulose triacetate film.

Thus, the polarizer of Example 101 was manufactured.

Example 102 to 110 and Comparative Example 201 to 207

Protective film of polarizers of Example 102 to 110 and Comparative Example 201 to 207 were manufactured in the same way as in Example 101 but changing the acyl substitution degree of cellulose acylate, the type and the addition amount of the additives, and film thickness as listed in the following Tables 4.

In the following table 4, the amount of the organic acid was shown to 100 mass part of a cellulose acylate (a mass part, mmol), respectively.

Citric acid used in Comparative Example 201 is the compound listed in Japanese Patent 4136054, and this comparative example is to confirm the effect of the compound described in the patent reference. Comparative Example 207 is to confirm the effect of Example 5 in JP-A-2005-62458.

[Sponification of Protective Film of Polarizer and Production of Polarizer]

Protective film of polarizers of Example 102 to 110 and Comparative Example 201 to 207 were each sponificated and then the polarizers of Examples and comparative Examples were manufactured in the same way as in Example 101.

[Evaluation]

(Evaluation of Polarizer Durability)

A cross transmittance CT in the wavelength of 410 nm of each polarizer of Examples and Comparative Examples manufactured above was measured in the invention.

Then, a cross transmittance of each polarizer was measured in the same manner described above after preserved under 60° C. and relative humidity 95% for 500 hours and under 80° C. without humidity control for 500 hours. The cross transmittance variation of the polarizer before and after the preservation was calculated and the result was shown in Tables 4 as polarizer durability. In addition, the relative humidity under environment without humidity control was fall within the range of 0% to 20%.

(Measurement of pH of Aqueous Solution of Polarizing Element)

The pH of the aqueous solution of the polarizing element was measured according to the following method.

The polarizer produced in Examples and Comparative Examples was cut to give a sample piece of 4 cm×4 cm, which was dipped in 100 cc of methylene chloride for 3 hours and then in 100 cc of acetone for 3 hours to dissolve and remove the protective film to a polarizer. The remaining polarizing element (PVA) was taken out and put into a screw-top bottle filled with 15 cc of ion-exchanged water. The screw-top bottle was closed, dipped in a boiling bath, and heated therein for 2 hours to dissolve the polarizing element (PVA). Using Shin-Dengen Electric Manufacturing's ISFET pH Meter pH BOYKS501, the pH of the dissolved aqueous PVA solution was measured.

After the polarizer was stored at 60° C. and a relative humidity of 95% for 500 hours, the pH of the aqueous solution of the polarizing element was measured in the same manner as above. The results, and the pH change indicating the pH difference between the two are shown in the following Table 4.

TABLE 4

| | Protective Film to Polarizer | | | | | | | | | |
|---|---|---|---|---|---|---|---|---|---|---|
| | Degree of Acyl Substitution of Cellulose Acylate | | | Organic Acid | | | | | | Polarizing Element |
| | acetyl | propionyl | total acyl | type | molecular weight | log P | amount (mas. pt.) | (mmol) | Thickness (μm) | Other Acid than Boric Acid |
| Example 101 | 2.40 | 0 | 2.40 | A | 531 | 4.4 | 2.0 | 3.8 | 55 | no |
| Example 102 | 2.40 | 0 | 2.40 | A | 531 | 4.4 | 4.0 | 7.5 | 60 | no |

TABLE 4-continued

| | | | | | | | | | | |
|---|---|---|---|---|---|---|---|---|---|---|
| Example 103 | 2.40 | 0 | 2.40 | A | 531 | 4.4 | 1.0 | 1.9 | 60 | no |
| Example 104 | 2.40 | 0 | 2.40 | B | 477 | 3.0 | 1.8 | 3.8 | 60 | no |
| Example 105 | 2.40 | 0 | 2.40 | C | 519 | 3.5 | 1.6 | 3.1 | 60 | no |
| Example 106 | 2.40 | 0 | 2.40 | D | 457 | 5.4 | 4.0 | 8.8 | 60 | no |
| Example 108 | 2.40 | 0 | 2.40 | E | 322 | 1.1 | 2.0 | 6.2 | 60 | no |
| Example 109 | 2.40 | 0 | 2.40 | F | 279 | 2.2 | 2.0 | 7.2 | 60 | no |
| Example 110 | 2.40 | 0 | 2.40 | G | 394 | 5.1 | 4.0 | 10.2 | 60 | no |
| Comparative Example 201 | 2.40 | 0 | 2.40 | citric acid | 192 | −1.7 | 0.72 | 3.8 | 60 | no |
| Comparative Example 202 | 2.40 | 0 | 2.40 | naphthoic acid | 172 | 2.6 | 0.65 | 3.8 | 60 | no |
| Comparative Example 203 | 2.43 | 0 | 2.43 | cinnamic acid | 148 | 1.9 | 0.56 | 3.8 | 60 | no |
| Comparative Example 204 | 2.43 | 0 | 2.43 | no | — | — | — | — | 60 | no |
| Comparative Example 207 | 2.85 | 0 | 2.85 | no | — | — | — | — | 80 | hydrochloric acid |
| Example 107 | 1.50 | 0.70 | 2.20 | A | 531 | 4.4 | 2.5 | 4.7 | 40 | no |
| Comparative Example 205 | 1.50 | 0.70 | 2.20 | citric acid | 192 | −1.7 | 0.90 | 4.7 | 40 | no |
| Comparative Example 206 | 1.50 | 0.70 | 2.20 | no | — | — | — | — | 40 | no |

| | Properties of Polarizer | | | | | |
|---|---|---|---|---|---|---|
| | pH of Aqueous Solution of Polarizing Element before and after aged at 60° C. and relative humidity of 95% | | | Cross-Transmittance at | Polarizing Element Durability: Cross-Transmittance Change (%) | |
| | before aged | after aged | pH change | wavelength of 410 nm (%) | 60° C. 95% 500 hours | 80° C. dry 500 hours |
| Example 101 | 4.8 | 4.9 | 0.1 | 0.17 | 0.40 | 0.11 |
| Example 102 | 4.7 | 4.7 | 0.0 | 0.16 | 0.23 | 0.12 |
| Example 103 | 4.8 | 5.0 | 0.2 | 0.19 | 0.56 | 0.10 |
| Example 104 | 4.6 | 4.8 | 0.2 | 0.20 | 0.41 | 0.11 |
| Example 105 | 4.7 | 4.8 | 0.1 | 0.18 | 0.48 | 0.12 |
| Example 106 | 4.8 | 4.9 | 0.1 | 0.19 | 0.19 | 0.11 |
| Example 108 | 4.7 | 4.7 | 0.0 | 0.15 | 0.21 | 0.11 |
| Example 109 | 4.7 | 4.7 | 0.0 | 0.16 | 0.24 | 0.13 |
| Example 110 | 4.7 | 4.7 | 0.0 | 0.17 | 0.26 | 0.11 |
| Comparative Example 201 | 3.6 | 4.1 | 0.5 | 0.20 | 0.30 | 0.22 |
| Comparative Example 202 | 4.3 | 4.7 | 0.4 | 0.21 | 0.66 | 0.14 |
| Comparative Example 203 | 4.5 | 5.0 | 0.5 | 0.21 | 0.73 | 0.13 |
| Comparative Example 204 | 4.9 | 5.6 | 0.7 | 0.25 | 0.82 | 0.10 |
| Comparative Example 207 | 4.8 | 5.5 | 0.7 | 0.24 | 1.20 | 0.19 |
| Example 107 | 4.7 | 4.9 | 0.1 | 0.18 | 0.51 | 0.11 |
| Comparative Example 205 | 3.7 | 4.1 | 0.4 | 0.21 | 0.62 | 0.21 |
| Comparative Example 206 | 4.9 | 5.5 | 0.6 | 0.21 | 0.98 | 0.11 |

From the results in Table 4, it is known that, in the polarizer of the second aspect of the invention, of which the pH of the aqueous solution of the polarizing element is from 4 to 7 before aged in high-temperature environments and the pH change before and after aged at 60° C. and a relative humidity of 95% for 500 hours is less than 0.4, the polarizing element hardly degraded both after aged in high-temperature and high-humidity environments and after aged in high-temperature and low-humidity environments.

On the other hand, it is known that, in the polarizer of Comparative Example 201, of which the pH of the aqueous solution of the polarizing element is less than 4 before aged in high-temperature environments and the pH change before and after aged at 60° C. and a relative humidity of 95% for 500 hours is not less than 0.4, the polarizing element greatly degraded after aged in high-temperature and low-humidity environments. It is also known that, in the polarizer of Comparative Examples 202 to 204, of which the pH change in the solution of the polarizing element before and after aged at 60° C. and a relative humidity of 95% for 500 hours is not less than 0.4, the polarizing element greatly degraded after aged in high-temperature and high-humidity environments.

It is known that, in the polarizer of Comparative Example 205 using cellulose acetate propionate, of which the pH of the aqueous solution of the polarizing element is less than 4 before aged in high-temperature environments and the pH change before and after aged at 60° C. and a relative humidity of 95% for 500 hours is not less than 0.4, the polarizing element greatly degraded both after aged in high-temperature and high-humidity environments and after aged in high-temperature and low-humidity environments. Similarly, it is known that, in the polarizer of Comparative Example 205 using cellulose acetate propionate, of which the pH change before and after aged at 60° C. and a relative humidity of 95% for 500 hours is not less than 0.4, the polarizing element greatly degraded both after aged in high-temperature and high-humidity environments and after aged in high-temperature and low-humidity environments.

From the results in Table 4, it is known that, when an organic acid having log P of at least 3 is added to the protective film to a polarizer, then the pH of the aqueous solution of the polarizing element in the polarizer and the pH change thereof can be controlled to fall within the scope of the second aspect of the invention. On the other hand, when an organic acid having log P of less than 3 is added to the protective film to a polarizer or when an acid is not added thereto, then the pH of the aqueous solution of the polarizing element in the polarizer and the pH change thereof do not fall within the scope of the second aspect of the invention, and in such cases, the polarizer of the second aspect of the invention could not produced.

Example 301

(Manufacture of Liquid Crystal Display Device)

After peeling off two polarizers of a commercially available liquid crystal television set (BRAVIA J5000, manufactured by SONY Corp.), polarizers of the second aspect of the invention which the protective film to a polarizer of Each Examples were used were laminated to the viewer side and the backlight side one by one, respectively, through a adhesive agent such that the protective film to a polarizer of the invention came to the liquid crystal cell side. These polarizers were disposed in a cross-Nicol arrangement where the transmission axis of the polarizer on the viewer side ran in the up/down direction and the transmission axis of the polarizer on the backlight side ran in the right/left direction. When the thus-produced liquid crystal display device of the second aspect of the invention was observed from the oblique direction, small contrast change and small color tint change were advantageously obtained in case where the atmosphere humidity was changed; and reduction of contrast was small in case where the liquid crystal display device of the second aspect of the invention was used for a long time under the high temperature and high humidity condition; each as compared with the commercially available liquid crystal television set.

[[Third Aspect of the Invention]]
{Preparation of Protective Film to Polarizer}
[Reference Example 1]

A TAC film having a thickness of 80 μm (FUJIFILM's trade name "TD80UL"), a TAC film having a thickness of 60 μm (FUJIFILM's trade name "TDS60") and a TAC film having a thickness of 40 μm (FUJIFILM's trade name "TDS40") were prepared. The film was incorporated into a liquid crystal display device and used therein as the protective film to a polarizer on the airside of the device (on the side of the liquid crystal cell opposite to the side thereof facing the glass substrate).

[Reference Example 2]

Using a tenter stretcher, a polymer film containing a norbornane resin and having a thickness of 140 μm (JSR's trade name "ARTON") was stretched by 2.8 times according to a side-fixed lateral monoaxial stretching method (the film is fixed in the machine direction and stretched in the lateral direction) in an air-circulating constant-temperature oven at 155° C. thereby preparing a protective film to a polarizer of norbornane resin of Reference Example 2.

[Reference Example 3]
{Manufacturing Protective Film of Polarizer}
(Preparation of Cellulose Acylate Solution)

The following composition was put into a mixing tank and stirred to dissolve the ingredients to prepare cellulose acylate solution 21.

| Composition of Cellulose Acylate Solution 21 | |
| --- | --- |
| Cellulose acylate (acetyl substitution degree is 2.40, degree of polymerization is 400) | 100.0 mas. pts. |
| Methylene chloride (first solvent) | 402.0 mas. pts. |
| Methanol (second solvent) | 60.0 mas. pts. |

(Preparation of Mat Agent Solution 22)

The following composition was put into a disperser and dispersed to prepare a mat agent solution 22.

| Composition of Mat Agent Solution 22 | |
| --- | --- |
| Silica particles having a mean particle size of 20 nm (Aerosil R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 1 | 10.3 mas. pts. |

1.3 Parts by mass of Matting Agent Solution 22 and 98.7 parts by mass of Cellulose Acylate Solution 21 were mixed using an in-line mixer. The mixture was then cast using a band casting machine, and the film was dried at 80° C. until reaching a residual solvent content of 30% and then peeled off. The peeled-off film was stretched at a stretch ratio of 30% in the cross direction of machine direction by using a tenter at an ambient temperature of 145° C. Then, the stretched film was dried at 140° C. for 20 minutes to form the protective film to a polarizer of Reference Example 3.

Reference Examples 4 to 6

According to the method for Film No. 119 in Example 1 in WO2007-125764, a cellulose acetate propionate film of Reference Example 4 was prepared.

According to the method for the transparent protective film 1 in Examples in JP-A-2009-122664, an acrylic resin film of Reference Example 5 was prepared.

Further, according to the method of No. 1 in Examples in WO2009-096071, an acrylic/cellulose acylate mixed resin film of Reference Example 6 was prepared.

{Manufacturing Polarizing Element}
[Reference Example 7]

A 75 μm thick polymer film containing a polyvinyl alcohol resin as a main component (Kuraray Co., Ltd., trade name "VF-PS#7500") was immersed in five baths in the conditions described in [1] to [5] below with a tensile force being applied in the longitudinal direction of the film, whereby the film was stretched so that the final stretch ratio would be 6.2 times its original length. This stretched film was dried in an air circulation oven at 40° C. for 1 minute. Thus, a polarizing element was produced.

<Conditions>
[1] Swelling bath: pure water at 30° C.;
[2] Dye bath: an aqueous solution at 30° C. containing 0.032 parts by mass of iodine and 0.2 parts by mass of potassium iodide with respect to 100 parts by mass of water;
[3] First crosslinking bath: an aqueous solution at 40° C. containing 3% by mass potassium iodide and 3% by mass boric acid;

[4] Second crosslinking bath: an aqueous solution at 60° C. containing 5% by mass potassium iodide and 4% by mass boric acid;

[5] Washing bath: an aqueous solution at 25° C. containing 3% by mass potassium iodide;

[Reference Example 8]

{Saponification of Protective Film to Polarizer}

The protective film to a polarizer of Reference Example 1 was dipped in an aqueous solution of 2.3 mol/L sodium hydroxide, at 55° C. for 3 minutes. After washed with water in a washing tank at room temperature, this was neutralized with 0.05 mol/L sulfuric acid at 30° C. Again washed with water in a washing tank at room temperature, this was dried with hot air at 100° C.

Further, the protective films to a polarizer of Reference Examples 3 to 6 were saponified in the same manner as that for the protective film to a polarizer of Reference Example 1, and used in production of polarizers.

Production Example 1 water-Soluble Adhesive Containing Polyvinyl Alcohol Resin and Containing Organic Acid and Metal Compound Colloid 100 parts by mass of an acetoacetyl group-having polyvinyl alcohol resin (Nippon Synthetic Chemical Industry's trade name "Gohsefimer Z200", mean degree of polymerization 1200, degree of saponification 98.5 mol %, degree of acetacetylation 5 mol %) and 50 parts by mass of methylolmelamine were dissolved in pure water at 30° C. to prepare an aqueous solution having a controlled solid concentration of 3.7%. To 100 parts by mass of the aqueous solution, added were 18 parts by mass of an aqueous alumina colloid (mean particle size 15 nm, solid concentration 10%, positively charged), and 1.0 part by mass of the following organic acid A (citric acid monoglyceride, Riken Vitamin's trade name "Poem K37V") to prepare a water-soluble adhesive. The pH of the water-soluble adhesive was from 3.5 to 4.0, the viscosity thereof was 10 mPa·s, the glass transition temperature (Tg) thereof was 70° C., and the total solid content thereof was 30 parts by mass.

Example 401

{Production of Polarizer}

The protective film to a polarizer of Reference Example 2 was stuck to one side of the polarizing element of Reference Example 7 via the water-soluble adhesive produced in Production Example 1 in such a manner that the slow axis of the protective film to a polarizer of Reference Example 2 could be perpendicular to the absorption axis of the polarizing element. Next, the protective film to a polarizer of Reference Example 1 was stuck to the other side of the polarizing element via the water-soluble adhesive produced in Production Example 1. Thus produced, the laminate was dried in an oven (by Okazaki Machinery Industry) at 60 to 90° C. for 5 minutes.

After dried, the laminate was heat-treated (annealed) by leading it to pass through an oven (by Okazaki Machinery Industry) at 80° C., taking 10 minutes. In this stage, the thickness of the thus-formed, adhesive-containing layer containing the organic acid of formula (1) is shown in the following Table 5. The process gave a polarizer of Example 401.

Examples 402 to 410

Polarizers of Examples 402 to 410 were produced in the same manner as in Example 1, for which, however, the type and the amount of the organic acid, and the type of the protective film to a polarizer were changed to those in Table 5.

Comparative Examples 401 to 403

Polarizers of Comparative Examples 401 to 403 were produced in the same manner as in Example 401, for which, however, the type and the amount of the organic acid, and the type of the protective film to a polarizer were changed to those in Table 5.

(Evaluation of Polarizing Element Durability)

The polarizers of Examples and Comparative Examples were analyzed for the cross-transmittance of the polarizing element therein at a wavelength of 410 nm and 680 nm, according to the method described herein.

Subsequently, the polarizers were stored at 60° C. and a relative humidity of 95% for 500 hours, and stored at 80° C. with no humidity conditioning (dry) for 500 hours; and these were analyzed for the cross-transmittance in the same manner as above. The cross-transmittance change before and after aging was determined in these polarizers, and this is shown in the following Table 5 as the polarizing element durability. The relative humidity in the non-conditioning environment was within a range of from 0% to 20%.

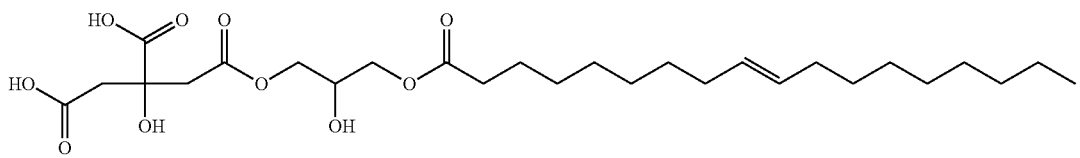

Organic acid A

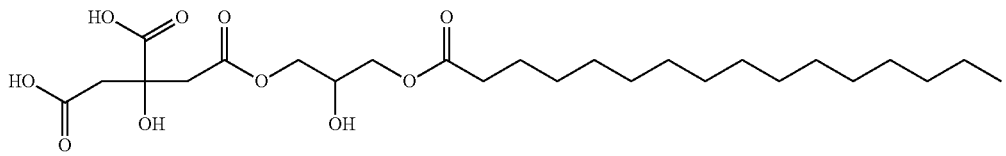

Organic acid B

-continued

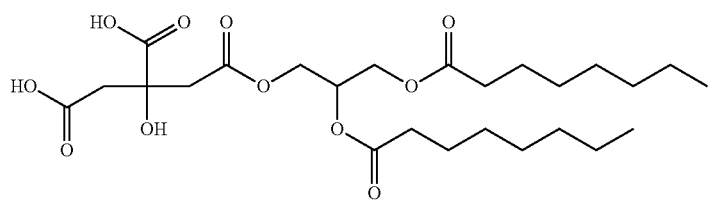 [SMILES: CCCCCCCC(=O)OCC(COC(=O)CC(O)(CC(=O)O)C(=O)O)OC(=O)CCCCCCC]
Organic acid C

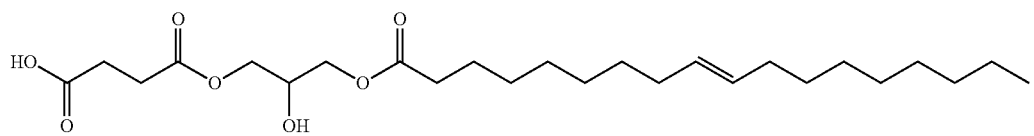
Organic acid D

TABLE 5

| | Adhesive Layer | | | | | | Protective Film to Polarizer | | | |
| | Organic Acid | | | | Metal | | Glass Side | | | |
| | | | | amount added | | | | | | |
| | type | molecular weight | log P | g/m² | mmol/m² | Fine Particles | Thickness (μm) | type | thickness (μm) | Re (nm) | Rth (nm) |
|---|---|---|---|---|---|---|---|---|---|---|---|
| Example 401 | A | 591 | 4.4 | 1.54 | 2.61 | alumina | 5 | Reference Example 2 | 40 | 119 | 159 |
| Example 402 | A | 591 | 4.4 | 0.31 | 0.52 | alumina | 1 | Reference Example 2 | 40 | 119 | 159 |
| Example 403 | A | 591 | 4.4 | 6.16 | 10.42 | alumina | 10 | Reference Example 2 | 40 | 119 | 159 |
| Example 404 | B | 477 | 3.0 | 1.23 | 2.58 | alumina | 5 | Reference Example 2 | 40 | 119 | 159 |
| Example 405 | C | 519 | 3.5 | 1.20 | 2.31 | alumina | 5 | Reference Example 2 | 40 | 119 | 159 |
| Example 406 | D | 457 | 5.4 | 1.20 | 2.63 | alumina | 5 | Reference Example 2 | 40 | 119 | 159 |
| Example 407 | A | 591 | 4.4 | 1.54 | 2.61 | alumina | 5 | Reference Example 3 | 50 | 52 | 113 |
| Example 408 | A | 591 | 4.4 | 1.54 | 2.61 | alumina | 5 | Reference Example 4 | 80 | 70 | 230 |
| Example 409 | A | 591 | 4.4 | 1.54 | 2.61 | alumina | 5 | Reference Example 5 | 35 | 1 | 2 |
| Example 410 | A | 591 | 4.4 | 1.54 | 2.61 | alumina | 5 | Reference Example 6 | 50 | 1 | 2 |
| Comparative Example 401 | NO | — | — | — | — | alumina | 5 | Reference Example 2 | 40 | 119 | 159 |
| Comparative Example 402 | citric acid | 192 | −1.7 | 0.31 | 1.61 | alumina | 1 | Reference Example 2 | 40 | 119 | 159 |
| Comparative Example 403 | L-lactic acid | 90 | −0.7 | 0.31 | 3.44 | alumina | 1 | Reference Example 2 | 40 | 119 | 159 |

| | Protective Film to Polarizer Air Side | | | | Polarizing Element Durability | |
| | | | | | Cross-Transmittance Change at 410 nm 60° C. 95% | Cross-Transmittance Change at 680 nm 80° C. dry |
| | type | thickness (μm) | Re (nm) | Rth (nm) | 500 hours (%) | 500 hours (%) |
|---|---|---|---|---|---|---|
| Example 401 | TD80UL | 80 | 2 | 40 | 0.17 | 0.05 |
| Example 402 | TD80UL | 80 | 2 | 40 | 0.32 | 0.04 |
| Example 403 | TD80UL | 80 | 2 | 40 | 0.10 | 0.05 |
| Example 404 | TD80UL | 80 | 2 | 40 | 0.19 | 0.04 |
| Example 405 | TD80UL | 80 | 2 | 40 | 0.20 | 0.05 |
| Example 406 | TD80UL | 80 | 2 | 40 | 0.19 | 0.04 |
| Example 407 | TDS60 | 60 | 2 | 41 | 0.24 | 0.04 |
| Example 408 | TDS60 | 60 | 2 | 41 | 0.25 | 0.04 |
| Example 409 | TDS40 | 40 | 1 | 36 | 0.17 | 0.05 |
| Example 410 | TDS40 | 40 | 1 | 36 | 0.18 | 0.05 |

TABLE 5-continued

| | | | | | | |
|---|---|---|---|---|---|---|
| Comparative Example 401 | TD80UL | 80 | 2 | 40 | 0.62 | 0.05 |
| Comparative Example 402 | TD80UL | 80 | 2 | 40 | 0.28 | 0.17 |
| Comparative Example 403 | TD80UL | 80 | 2 | 40 | 0.29 | 0.14 |

From the results in Table 5, it is known that the polarizer of the third aspect of the invention, in which the organic acid of formula (1) is added to the polarizing element-neighboring layer containing an adhesive, is favorable since the polarizing element therein hardly degrades both after aged in high-temperature and high-humidity environments and after aged in high-temperature and low-humidity environments.

On the other hand, it is known that, in the polarizer of Comparative Example 401 not having the layer containing the organic acid satisfying the formula (1), the polarizing element remarkably degrades after aged in high-temperature and high-humidity environments. It is also known that, in the polarizer of Comparative Examples 402 and 403 in which an organic acid not satisfying the formula (1) such as citric acid used in Japanese Patent 4136057 or L-lactic acid used in Japanese Patent 3977064 is added to *the adhesive-containing polarizing element-neighboring layer, the polarizing element remarkably degrades after aged in high-temperature and low-humidity environments.

(Manufacture of Liquid Crystal Display Device)

After peeling off two polarizers of a commercially available liquid crystal television set (BRAVIA J5000, manufactured by SONY Corp.), polarizers of Example 401 was laminated to the viewer side and the backlight side one by one, respectively, through a adhesive agent such that the protective film to a polarizer of the glass side came to the liquid crystal cell side. These polarizers were disposed in a cross-Nicol arrangement where the transmission axis of the polarizer on the viewer side ran in the up/down direction and the transmission axis of the polarizer on the backlight side ran in the right/left direction. When the thus-produced liquid crystal display device of the third aspect of the invention was observed from the oblique direction, small contrast change and small color tint change were advantageously obtained in case where the atmosphere humidity was changed; and reduction of contrast was small in case where the liquid crystal display device of the first aspect of the invention was used for a long time under the high temperature and high humidity condition; each as compared with the commercially available liquid crystal television set.

(Reference Example 9)
Production of Polarizing Element

A polyvinyl alcohol film having a thickness of 75 μm of a polyvinyl alcohol having a mean degree of polymerization of about 2400 and a degree of saponification of at least 99.9 mol % was dipped in pure water at 30° C. and then in an aqueous solution of iodine/potassium iodide/water in a ratio by mass of 0.02/2/100 at 30° C. Next, this was dipped in an aqueous solution of potassium iodide/boric acid/water in a ratio by mass of 12/5/100 at 56.5° C. Subsequently, this was washed with pure water at 8° C. and then dried at 65° C. to give a polarizing element of Reference Example 9 in which iodine was adsorbed and aligned in the polyvinyl alcohol. This was stretched mainly in dyeing with iodine and processing with boric acid, and the total draw ratio was 5.3 times.

Production Example 2

Production of UV Curable Adhesive 10.0 g of a hydrogenated epoxy resin, Japan Epoxy Resin's trade name "Epikote YX8000" (diglycidyl ether of nuclear hydrogenated bisphenol A, having an epoxy equivalent of about 205 g/equivalent), 4.0 g of an optical cationic polymerization initiator, Nippon Soda's trade name "C15102", 1.0 g of a photosensitizer, Nippon Soda's trade name "CS7001", and 2.5 g of the above-mentioned organic acid A were weighed out into a 100-ml disposable cup, mixed and defoamed therein to prepare an epoxy resin-containing curable resin composition, a UV curable adhesive.

Example 502

The protective film to a polarizer produced in Reference Example 3 was put in an IR heater set at 60° C., and heated therein for 5 seconds. Subsequently, the UV curable adhesive was produced in Production Example 2 was applied onto one surface of the heated protective film to a polarizer thereby forming an adhesive layer thereon. Simultaneously with this, the UV curable adhesive produced in Production Example 2 was applied onto one surface of a norbornene resin film (Optes' "Zeonoa Film") thereby forming an adhesive layer thereon. The thickness of the adhesive layer was 3 μm in both cases. The amount of the organic acid A added to the adhesive layer was 0.7 g/m² in both cases.

Subsequently, at 23° C., the protective film to a polarizer and the norbornene resin film each having the adhesive layer formed thereon were stuck to both surfaces of the polarizing element obtained in Reference Example 9 via the adhesive layer, thereby forming a laminate film of protective film/adhesive layer/polarizing element/adhesive layer/norbornene resin film. The laminate film was irradiated with UV rays from the side of the norbornene resin film, thereby giving a polarizer of Example 502. Before irradiation of the laminate film with UV rays, the period of time for which the adhesive layer was laminated on the heated protective film to a polarizer and the protective film to a polarizer was kept within a temperature range of from 40 to 60° C. was about 1 second.

Production Example 3

A comparative UV curable adhesive was produced in the same manner as in Production Example 2, to which, however, the organic acid A was not added.

Comparative Example 501

A polarizer of Comparative Example 501 was produced in the same manner as in Example 502, in which, however, the UV curable adhesive produced in Production Example 3 was used.

Example 503 and Comparative Example 502

{Production of Liquid Crystal Display Device}

Two polarizers were peeled from a commercially-available liquid crystal TV (Sony's BRAVIA J5000), and the polarizer of Example 502 was stuck to the viewer's side and to the backlight side with an adhesive in such a manner that the norbornene resin film could face the liquid crystal cell side, thereby producing a liquid crystal display device of Example 503, in which the number of the polarizer stuck to both sides was one each. The two polarizers were so positioned that the transmission axis of the polarizer on the viewer's side could run vertically, and the transmission axis of the polarizer on the backlight side could run horizontally, or that is, in cross-Nicol configuration. The polarizer of Comparative Example 501 was similarly stuck via an adhesive, each one on the viewer's side and on the backlight side, thereby producing a liquid crystal display device of Comparative Example 502. The thus-produced liquid crystal display device of Example 503 comprising the polarizers of Example 502 was better than the liquid crystal display device of Comparative Example 502 comprising the polarizers of Comparative Example 501 in that the contrast depression in the former after long-term use in high-temperature and high-humidity environments was smaller than in the latter.

The present disclosure relates to the subject matter contained in Japanese Patent Application No. 101413/2010 filed on Mar. 26, 2010, Japanese Patent Application No. 101717/2010 filed on Mar. 27, 2010, Japanese Patent Application No. 128747/2010 filed on Jun. 4, 2010, Japanese Patent Application No. 87144/2011 filed on Apr. 11, 2011, Japanese Patent Application No. 87145/2011 filed on Apr. 11, 2011 and Japanese Patent Application No. 91092/2011 filed on Apr. 15, 2011, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A protective film to a polarizer containing a cellulose acylate and an organic acid having an octanol/water partition coefficient of at least 3.0 and satisfying one of the following requirements:

(1): The surface of the film has a pH of from 3.0 to 4.5; or (2): The surface of the film has a pH of more than 4.5 and at most 6.0, and wherein the film has a moisture permeability of at least 2800 g/m² ·day, the protective film to a polarizer comprising an organic acid represented by the following formula (1), wherein the ratio of the organic acid to the cellulose acylate is from 0.01 to 10% by mass:

$$X\text{-}L\text{-}(R^1)_n \quad \text{Formula (1)}$$

wherein:

X represents an acid group wherein the acid dissociation constant is 5.5 or less;

L represents a single bond, or a di- or more valent linking group;

R¹ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;

n represents 1 when L is a single bond, or represents the number expressed by:

(the valent number of L)−1 when L is a di- or more valent linking group.

2. The protective film to a polarizer according to claim 1, of which the film surface pH is from 3.0 to 4.5.

3. The protective film to a polarizer according to claim 1, wherein on condition that the surface of the film has a pH of from 3.0 to 4.5, the film has a moisture permeability of at least 2800 g/m²·day.

4. The protective film to a polarizer according to claim 1, which has a water content of at least 4.0%.

5. The protective film to a polarizer according to claim 1, wherein the organic acid represented by the formula (1) is a carboxylic acid derivative represented by the following formula (2):

Formula (2)

wherein:

s and t each independently represent 1, 2 or 3;

R⁴ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that R⁴ includes the moiety of R¹ in the formula (1).

6. The protective film to a polarizer according to claim 1, wherein a total acyl substitution degree of the cellulose acylate is at least 1.0 and less than 2.6.

7. The protective film to a polarizer according to claim 1, which is saponificated.

8. A polarizer produced by the method for producing a polarizer comprising alkali-saponifying a protective film to a polarizer containing a cellulose acylate and an organic acid having an octanol/water partition coefficient of at least 3.0 and satisfying one of the following requirements:

(1): The surface of the film has a pH of from 3.0 to 4.5; or (2): The surface of the film has a pH of more than 4.5 and at most 6.0, and wherein the film has a moisture permeability of at least 2800 g/m² ·day, and including washing the alkali-saponified protective film to a polarizer with water, and laminating the washed protective film to a polarizer on at least one surface of a polarizing element, the protective film to a polarizer comprising an organic acid represented by the following formula (1), wherein the ratio of the organic acid to the cellulose acylate is from 0.01 to 10% by mass:

$$X\text{-}L\text{-}(R^1)_n \qquad \text{Formula (1)}$$

wherein:
X represents an acid group wherein the acid dissociation constant is 5.5 or less;
L represents a single bond, or a di- or more valent linking group;
R¹ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by:
(the valent number of L)-1
when L is a di- or more valent linking group.

9. A polarizer comprising a polarizing element and at least one sheet of a protective film to a polarizer containing a cellulose acylate and an organic acid having an octanol/water partition coefficient of at least 3.0 and satisfying one of the following requirements:
(1): The surface of the film has a pH of from 3.0 to 4.5; or
(2): The surface of the film has a pH of more than 4.5 and at most 6.0, and
wherein the film has a moisture permeability of at least 2800 g/m² ·day,
the protective film to a polarizer comprising an organic acid represented by the following formula (1), wherein the ratio of the organic acid to the cellulose acylate is from 0.01 to 10% by mass:

$$X\text{-}L\text{-}(R^1)_n \qquad \text{Formula (1)}$$

wherein:
X represents an acid group wherein the acid dissociation constant is 5.5 or less;
L represents a single bond, or a di- or more valent linking group;
R¹ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by:
(the valent number of L)-1
when L is a di- or more valent linking group.

10. A liquid crystal display device comprising at least one sheet of a protective film to a polarizer containing a cellulose acylate and an organic acid having an octanol/water partition coefficient of at least 3.0 and satisfying one of the following requirements:
(1): The surface of the film has a pH of from 3.0 to 4.5; or
(2): The surface of the film has a pH of more than 4.5 and at most 6.0, and
wherein the film has a moisture permeability of at least 2800 g/m² ·day,
the protective film to a polarizer comprising an organic acid represented by the following formula (1), wherein the ratio of the organic acid to the cellulose acylate is from 0.01 to 10% by mass:

$$X\text{-}L\text{-}(R^1)_n \qquad \text{Formula (1)}$$

wherein:
X represents an acid group wherein the acid dissociation constant is 5.5 or less;
L represents a single bond, or a di- or more valent linking group;
R¹ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by:
(the valent number of L)-1
when L is a di- or more valent linking group.

11. A polarizer comprising:
a polarizing element and two protective films to a polarizer disposed on both sides of the polarizing element,
wherein the pH of the aqueous solution of the polarizing element, as measured according to the following method (1), is from 4 to 7, and before and after aged at 60° C. and a relative humidity of 95% for 500 hours, the pH change in the aqueous solution of the polarizing element, as measured according to the following method (1), is less than 0.4, and
wherein at least one protective film to the polarizer contains an organic acid having an octanol/water partition coefficient of at least 3.0,
Method (1): 40 mg of the polarizing element is dipped in 15 ml of pure water and heated at 100° C. for 2 hours, and then the pH of the aqueous solution is measured,
wherein the organic acid is a compound represented by the following formula (1):

$$X\text{-}L\text{-}(R^1)_n \qquad \text{Formula (1)}$$

wherein:
X represents an acid group wherein the acid dissociation constant is 5.5 or less;
L represents a single bond, or a di- or more valent linking group;
R¹ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by:
(the valent number of L)-1
when L is a di- or more valent linking group.

12. The polarizer according to claim 11, wherein at least one protective film to a polarizer contains a resin and the organic acid in an amount of from 0.1 to 20 parts by mass relative to 100 parts by mass of the resin.

13. The polarizer according to claim 11, wherein X in the formula (1) represents a carboxyl group, a sulfonic acid group, a sulfinic acid group, a phosphate group, a sulfonimide group or an ascorbic acid group.

14. The polarizer according to claim 11, wherein L in the formula (1) represents a single bond or a di- or more valent linking group selected from the following units, or a di- or more valent linking group formed by combining any of these units:
Unit: —O—, —CO—, —N(R²)— wherein R² represents an alkyl group having from 1 to 5 carbon atoms, —CH(OH)—, —CH₂—, —CH=CH—, —SO₂—.

15. The polarizer according to claim 11, wherein the organic acid represented by the formula (1) comprising a structure in which one molecule of a fatty acid and one molecule of a poly carboxylic acid bond to one molecule of a polyalcohol by ester bond, and the structure has at least one unsubstituted carboxyl group derived from the poly carboxylic acid.

16. The polarizer according to claim 11, wherein the organic acid represented by the formula (1) is a carboxylic acid derivative represented by the following formula (2):

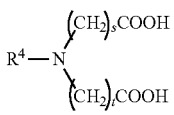

Formula (2)

wherein:
s and t each independently represent 1, 2 or 3;
$R^4$ represents a hydrogen atom, an alkyl group, an alkenyl group, an aryl group, an acyl group, an alkoxycarboxyl group, a carbamoyl group, an alkylsulfonyl group, an aryl sulfonyl group or a heterocyclic group, and each group may have a substituent, with the proviso that $R^4$ includes the moiety of $R^1$ in the formula (1).

17. The polarizer according to claim 11, wherein the protective film to a polarizer comprising cellulose acylate.

18. The polarizer according to claim 17, wherein a total acyl substitution degree of the cellulose acylate is from 2.0 to 2.97.

19. A liquid crystal display device comprising:
at least one of the polarizer, having a polarizing element and two protective films to a polarizer disposed on both sides of the polarizing element,
wherein the pH of the aqueous solution of the polarizing element, as measured according to the following method (1), is from 4 to 7, and before and after aged at 60° C. and a relative humidity of 95% for 500 hours, the pH change in the aqueous solution of the polarizing element, as measured according to the following method (1), is less than 0.4, and
wherein at least one protective film to the polarizer contains an organic acid having an octanol/water partition coefficient of at least 3.0,
Method (1): 40 mg of the polarizing element is dipped in 15 ml of pure water and heated at 100° C. for 2 hours, and then the pH of the aqueous solution is measured,
wherein the organic acid is a compound represented by the following formula (1):

$X\text{-}L\text{-}(R^1)_n$  Formula (1)

wherein:
X represents an acid group wherein the acid dissociation constant is 5.5 or less:
L represents a single bond, or a di- or more valent linking group:
$R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent:
n represents 1 when L is a single bond, or represents the number expressed by:
(the valent number of L)-1
when L is a di- or more valent linking group.

20. A polarizer comprising:
a polarizing element and at least one protective film to a polarizer and having, between the polarizing element and the protective film to a polarizer, a layer containing an organic acid of the following formula (1) in an amount of from 0.01 to 10 g/m$^2$,
wherein at least one protective film to the polarizer contains an organic acid having an octanol/water partition coefficient of at least 3.0, $X\text{-}L\text{-}(R^1)_n$  Formula (1)

wherein:
X represents an acid group wherein the acid dissociation constant is 5.5 or less;
L represents a single bond, or a di- or more valent linking group;
$R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by:
(the valent number of L)-1
when L is a di- or more valent linking group.

21. The polarizer according to claim 20, wherein $R^1$ in the formula (1) represents a an alkyl group having from 8 to 24 carbon atoms, an alkenyl group having from 8 to 24 carbon atoms or an alkynyl group having from 8 to 24 carbon atoms, and each group may have a substituent.

22. The polarizer according to claim 20, wherein $R^1$ in the formula (1) represents a straight chain alkyl group having from 10 to 24 carbon atoms, a straight chain alkenyl group having from 10 to 24 carbon atoms.

23. The polarizer according to claim 20, wherein X in the formula (1) represents a carboxyl group, a sulfonic acid group, a sulfinic acid group, a phosphate group, a sulfonimide group or an ascorbic acid group.

24. The polarizer according to claim 20, wherein L in the formula (1) represents a single bond or a di- or more valent linking group selected from the following units, or a di- or more valent linking group formed by combining any of these units:
Unit: —O—, —CO—, —N(R$^2$)— wherein R$^2$ represents an alkyl group having from 1 to 5 carbon atoms, —CH(OH)—, —CH$_2$—, —CH=CH—, —SO$_2$—.

25. The polarizer according to claim 20, wherein the organic acid represented by the formula (1) comprising a structure in which one molecule of a fatty acid and one molecule of a poly carboxylic acid bond to one molecule of a polyalcohol by ester bond, and the structure has at least one unsubstituted carboxyl group derived from the poly carboxylic acid.

26. The polarizer according to claim 20, wherein the molecular weight of the organic acid is from 200 to 1000.

27. The polarizer according to claim 20, wherein the layer containing an organic acid of formula (1) in an amount of 0.01 to 10 g/m$^2$ is an adhesive layer containing fine particles of a metal compound.

28. The polarizer according to claim 27, wherein the fine particles of a metal compound are of metal oxides.

29. The polarizer according to claim 20, wherein the layer containing an organic acid of formula (1) in an amount of 0.01 to 10 g/m$^2$ is an ultraviolet curable adhesive layer.

30. A liquid crystal display device comprising:
at least one of the polarizer having at least one protective film to a polarizer and having, between the polarizing element and the protective film to a polarizer, a layer containing an organic acid of the following formula (1) in an amount of from 0.01 to 10 g/m$^2$,
wherein at least one protective film to the polarizer contains an organic acid having an octanol/water partition coefficient of at least 3.0, $$X\text{-}L\text{-}(R^1)_n \qquad \text{Formula (1)}$$

wherein:
X represents an acid group wherein the acid dissociation constant is 5.5 or less;
L represents a single bond, or a di- or more valent linking group;
$R^1$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a substituent;
n represents 1 when L is a single bond, or represents the number expressed by :
(the valent number of L)-1
when L is a di- or more valent linking group.

* * * * *